(12) United States Patent
Takano et al.

(10) Patent No.: US 8,179,610 B2
(45) Date of Patent: May 15, 2012

(54) ZOOM LENS AND INFORMATION DEVICE

(75) Inventors: Yohei Takano, Yokohama (JP);
Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 94 days.

(21) Appl. No.: 12/828,648

(22) Filed: Jul. 1, 2010

(65) Prior Publication Data

US 2011/0002048 A1 Jan. 6, 2011

(30) Foreign Application Priority Data

Jul. 6, 2009 (JP) ................................ 2009-160297
Jul. 6, 2009 (JP) ................................ 2009-160299
Sep. 10, 2009 (JP) ................................ 2009-209864

(51) Int. Cl.
*G02B 15/14* (2006.01)
*H04N 5/225* (2006.01)

(52) U.S. Cl. ......................... 359/687; 348/340

(58) Field of Classification Search .................. 348/340; 359/686, 687
See application file for complete search history.

(56) References Cited

U.S. PATENT DOCUMENTS

| | | | |
|---|---|---|---|
| 7,616,384 B2 | 11/2009 | Atsuumi | |
| 7,636,201 B2 | 12/2009 | Sudoh et al. | |
| 7,719,773 B2 | 5/2010 | Atsuumi et al. | |
| 7,933,074 B2 * | 4/2011 | Takano et al. | 359/687 |
| 8,054,559 B2 * | 11/2011 | Takano et al. | 359/687 |
| 2009/0147375 A1 | 6/2009 | Sudoh et al. | |
| 2010/0271710 A1* | 10/2010 | Ohashi | 359/687 |
| 2011/0228408 A1* | 9/2011 | Sudoh | 359/687 |

FOREIGN PATENT DOCUMENTS

| | | |
|---|---|---|
| EP | 2273299 A1 * | 1/2011 |
| JP | 2004-199000 | 7/2004 |
| JP | 2005-326743 | 11/2005 |
| JP | 2006-189598 | 7/2006 |
| JP | 2008-26837 | 2/2008 |
| JP | 2008-76493 | 4/2008 |
| JP | 2008-96924 | 4/2008 |
| JP | 2008-107559 | 5/2008 |

(Continued)

OTHER PUBLICATIONS

U.S. Appl. No. 12/822,807, filed Jun. 24, 2010, Takano, et al.
Extended European Search Report issued Oct. 6, 2010, in Application No. 10251195.3-2217.

(Continued)

*Primary Examiner* — David N Spector
(74) *Attorney, Agent, or Firm* — Oblon, Spivak, McClelland, Maier & Neustadt, L.L.P.

(57) ABSTRACT

A zoom lens includes a first lens group having a positive refractive power, a second lens group having a negative refractive power, a third lens group having a positive refractive power, and a fourth lens group having a positive refractive power, which are disposed in order from an object side, and an aperture stop disposed at an object side of the third lens group. When changing the magnification from a wide angle end to a telephoto end, an interval between the first and second lens groups increases, an interval between the second and third lens groups decreases, and an interval between the third and fourth lens groups increases. The first lens group includes a negative lens, a positive lens, and a positive lens, in order from the object side. Predetermined conditions of a refractive index of the negative lens E1 for a d line, an Abbe number for d line, and a relative partial dispersion are satisfied.

18 Claims, 31 Drawing Sheets

FOREIGN PATENT DOCUMENTS

| | | |
|---|---|---|
| JP | 2008-112013 | 5/2008 |
| JP | 2008-146016 | 6/2008 |
| JP | 2008-225328 | 9/2008 |
| JP | 2009-98585 | 5/2009 |

OTHER PUBLICATIONS

Warren J. Smith, "Modern Lens Desing", (A Resource Manual), Mc Graw Hill, XP-002600293, Jan. 1, 1992, pp. 72-75.

* cited by examiner

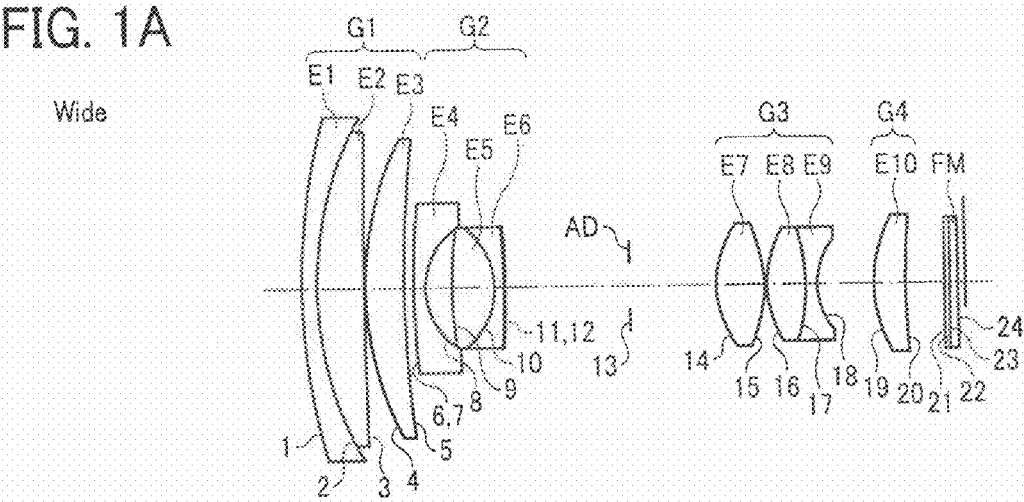
FIG. 1A Wide
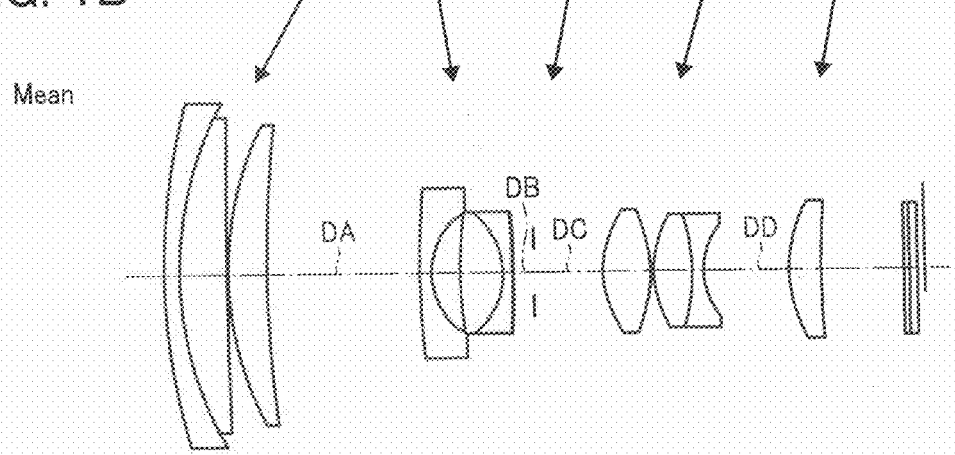
FIG. 1B Mean
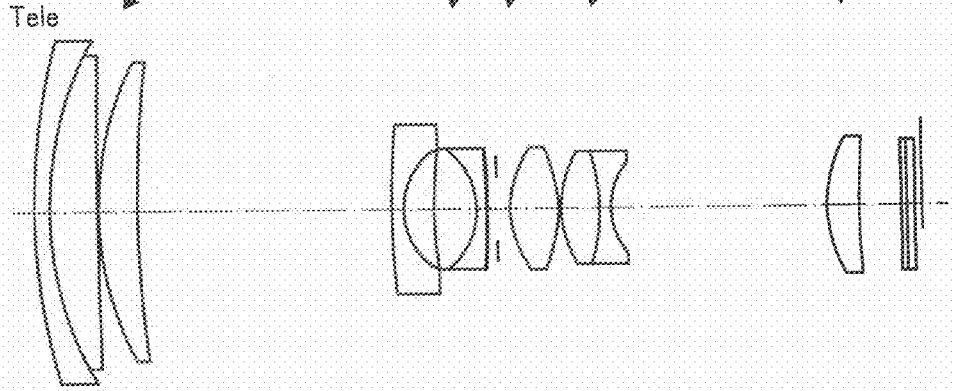
FIG. 1C Tele

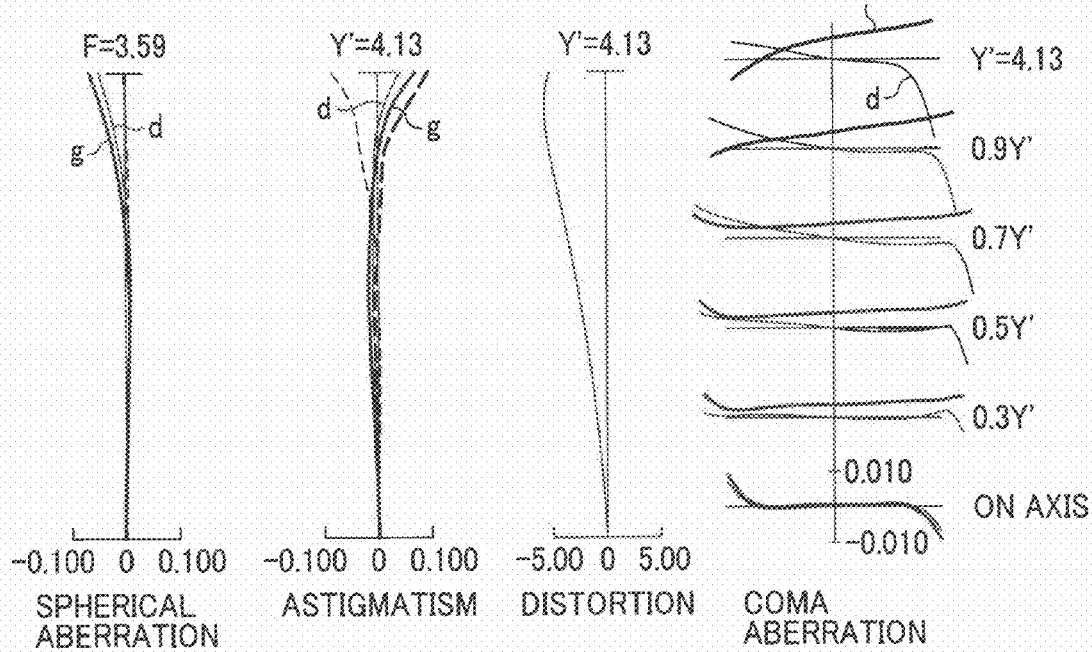
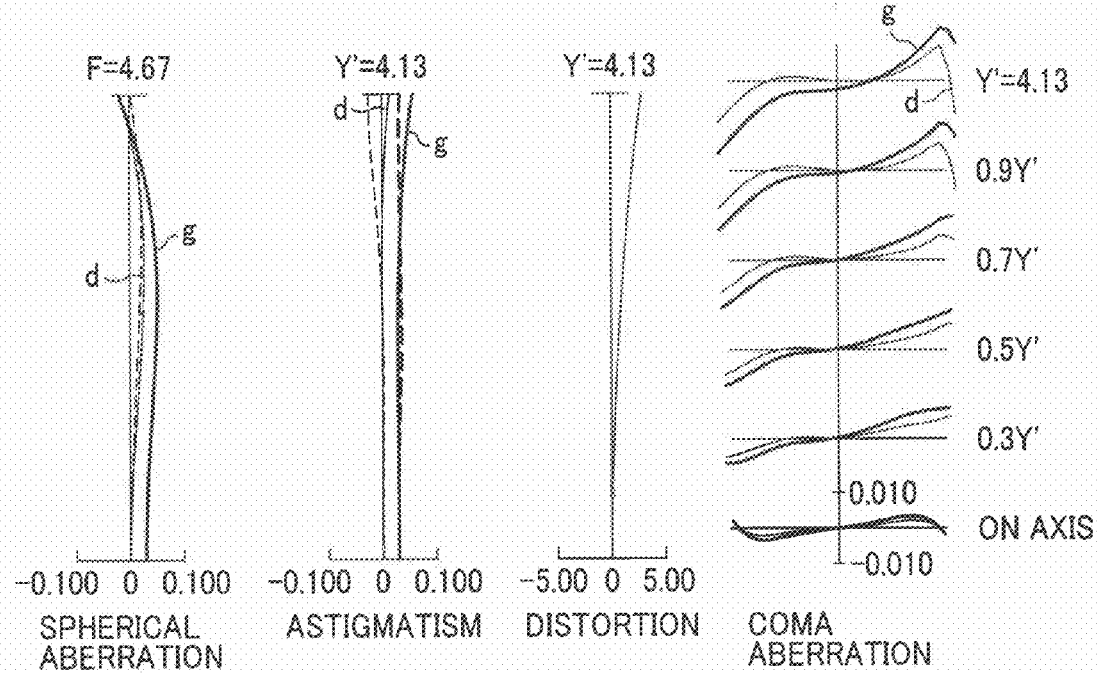

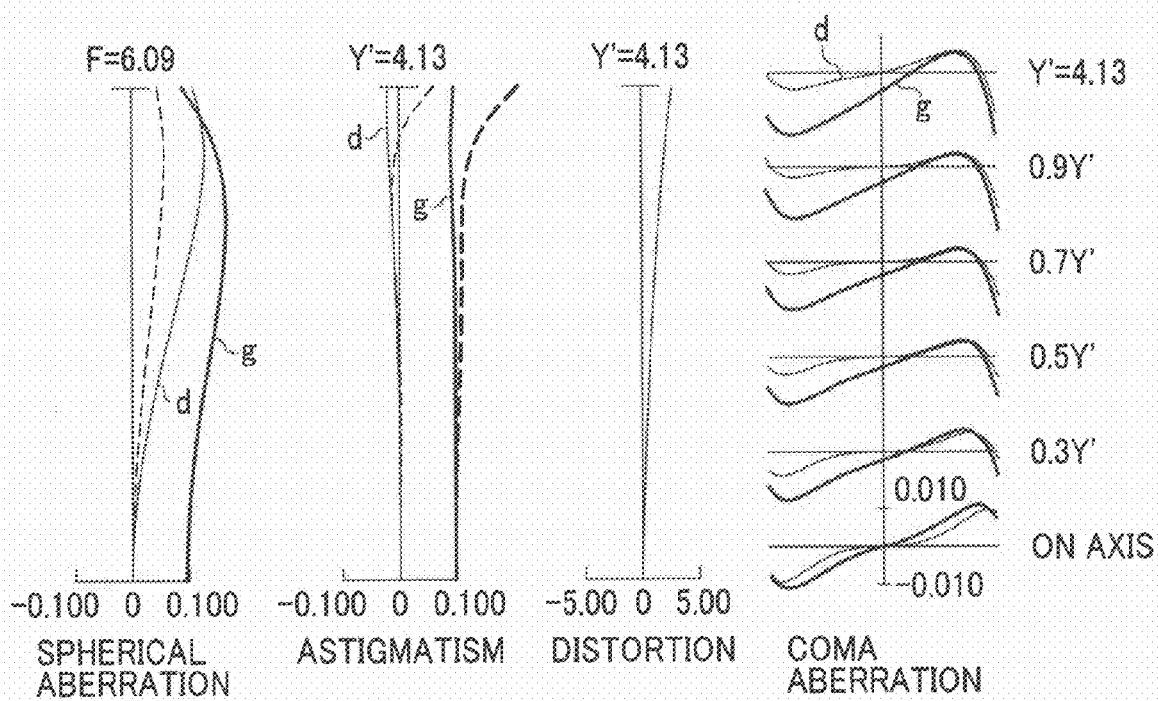

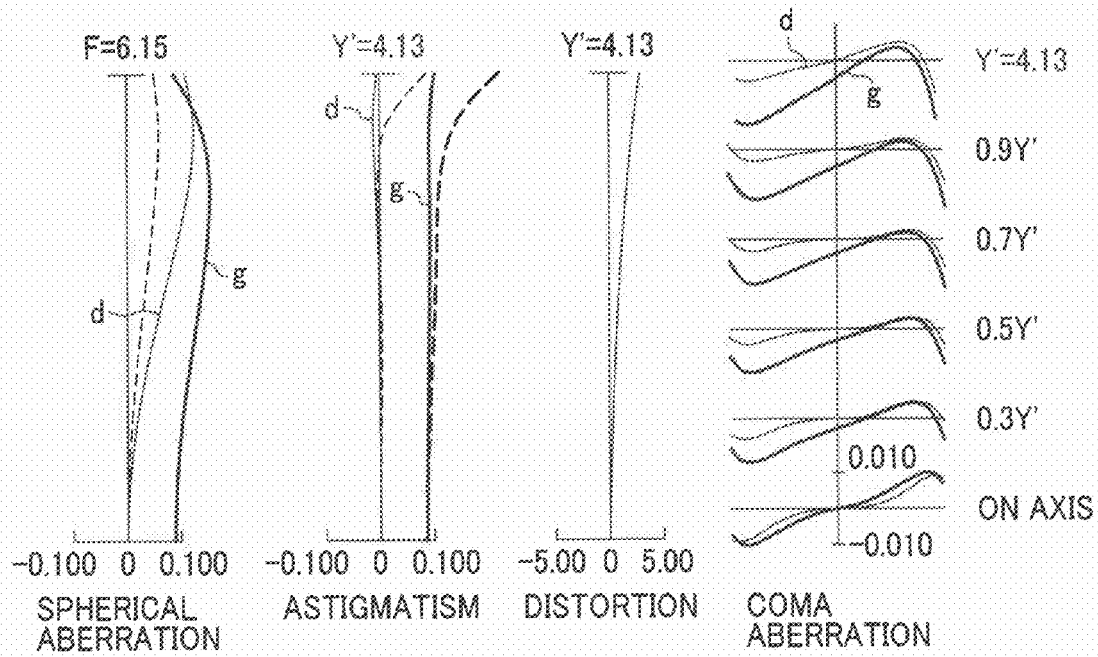

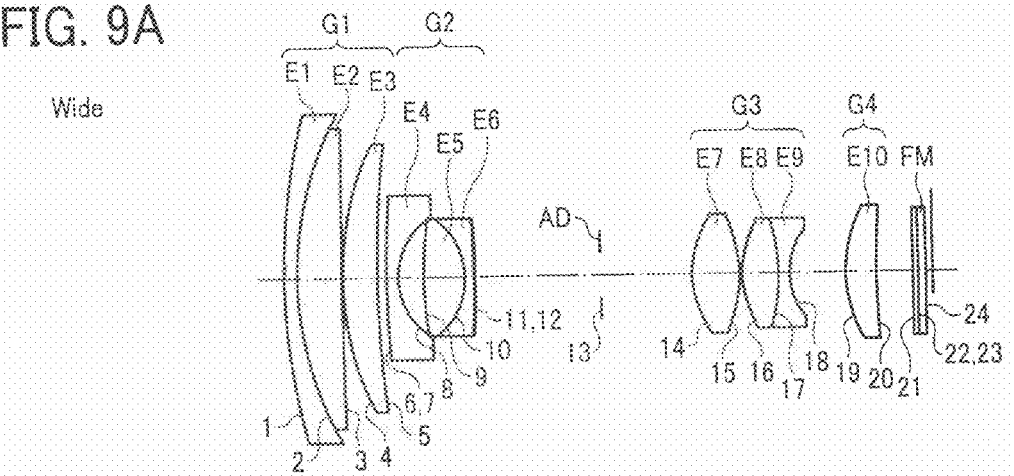
FIG. 9A Wide
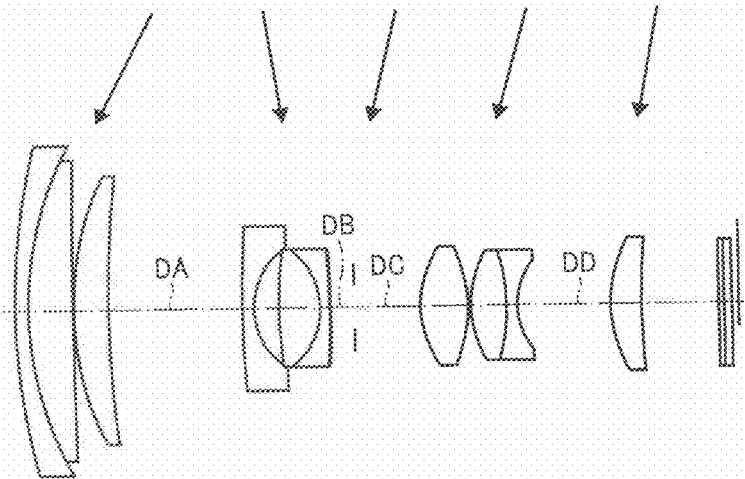
FIG. 9B Mean
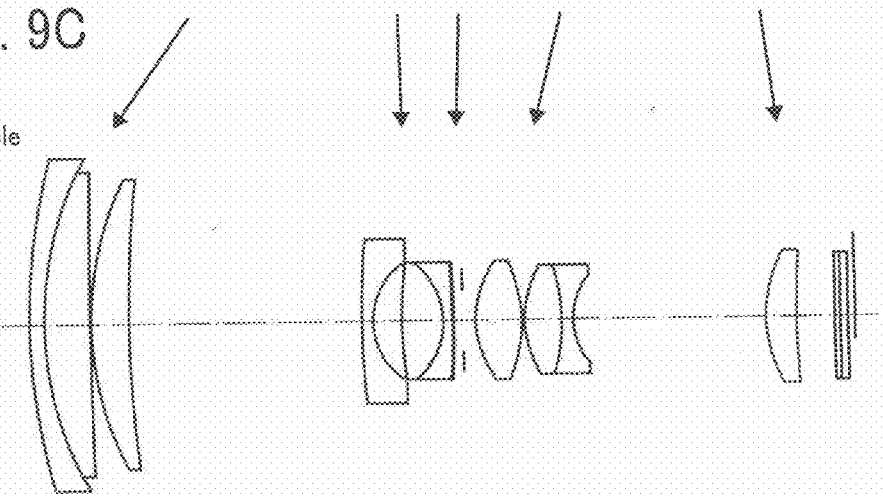
FIG. 9C Tele

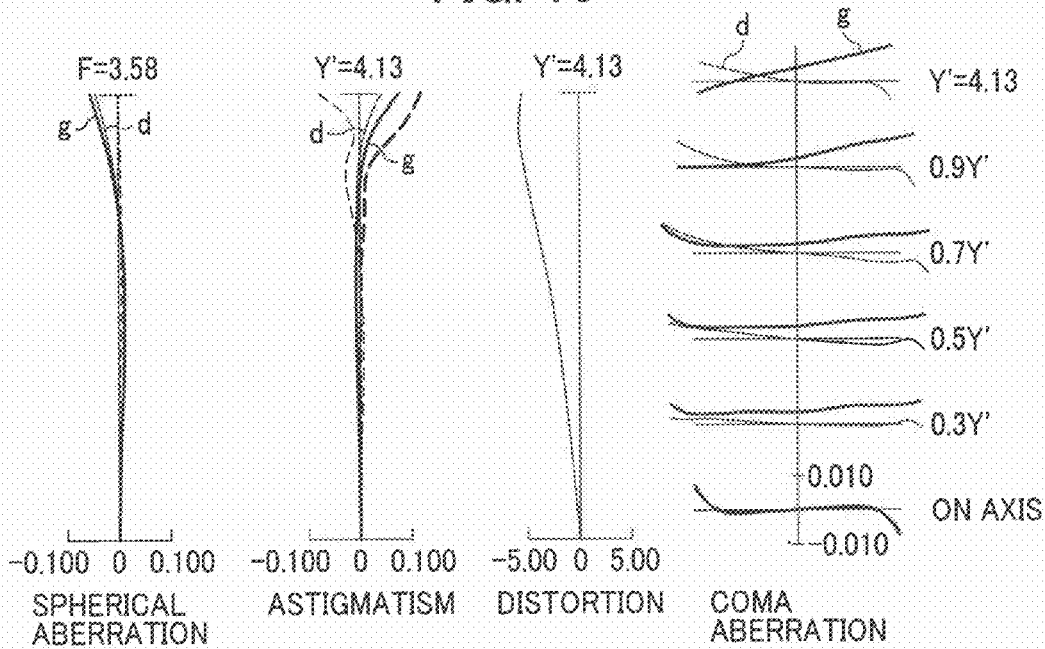
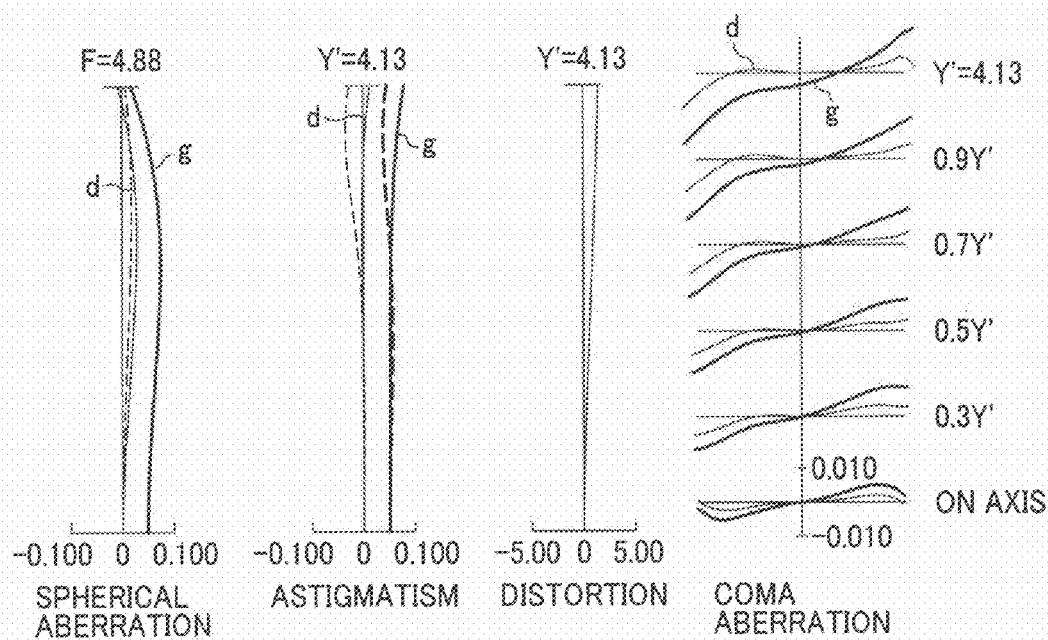

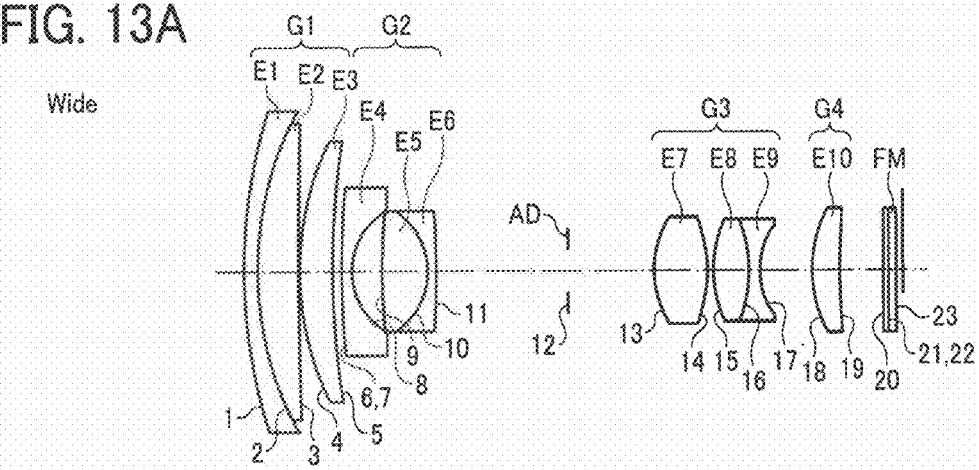
FIG. 13A Wide
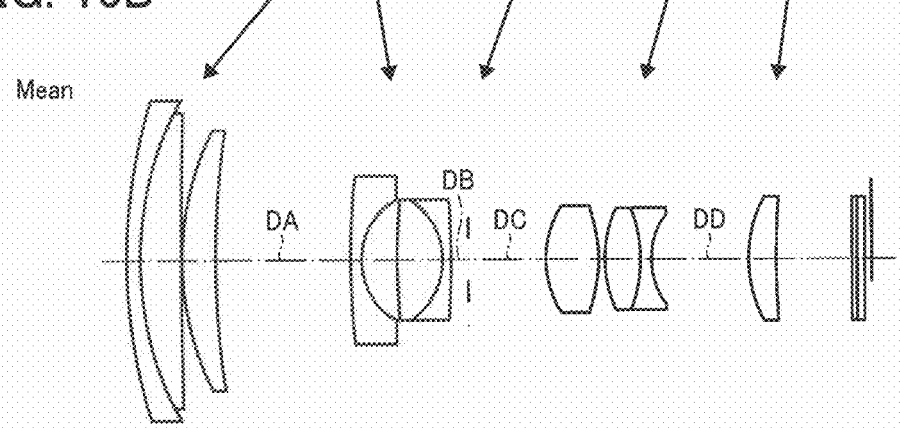
FIG. 13B Mean
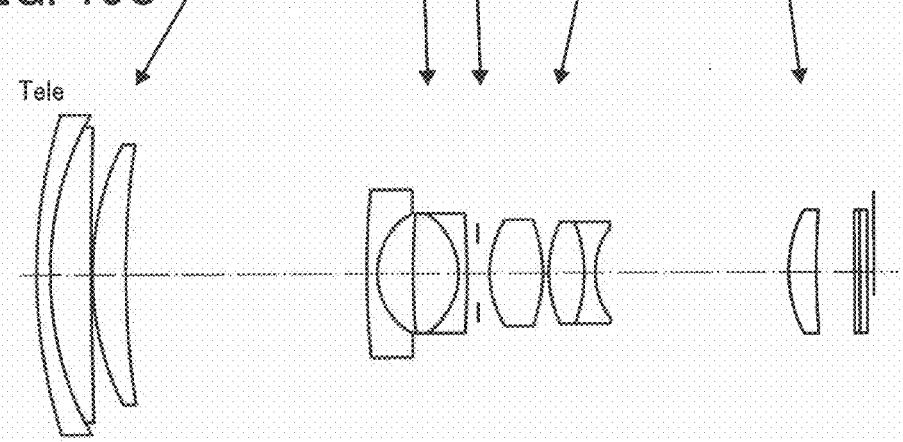
FIG. 13C Tele

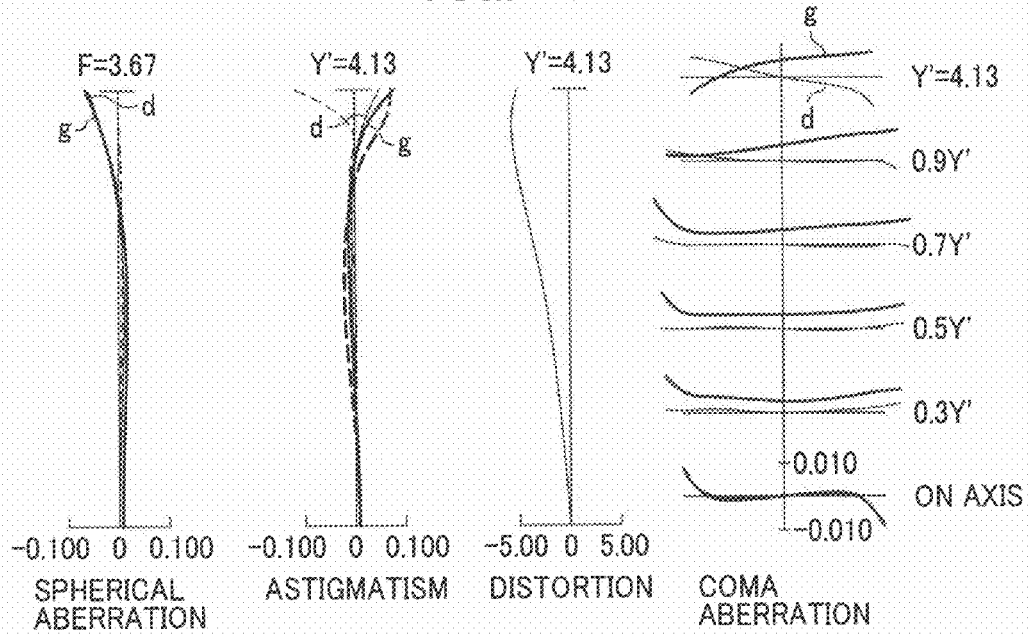
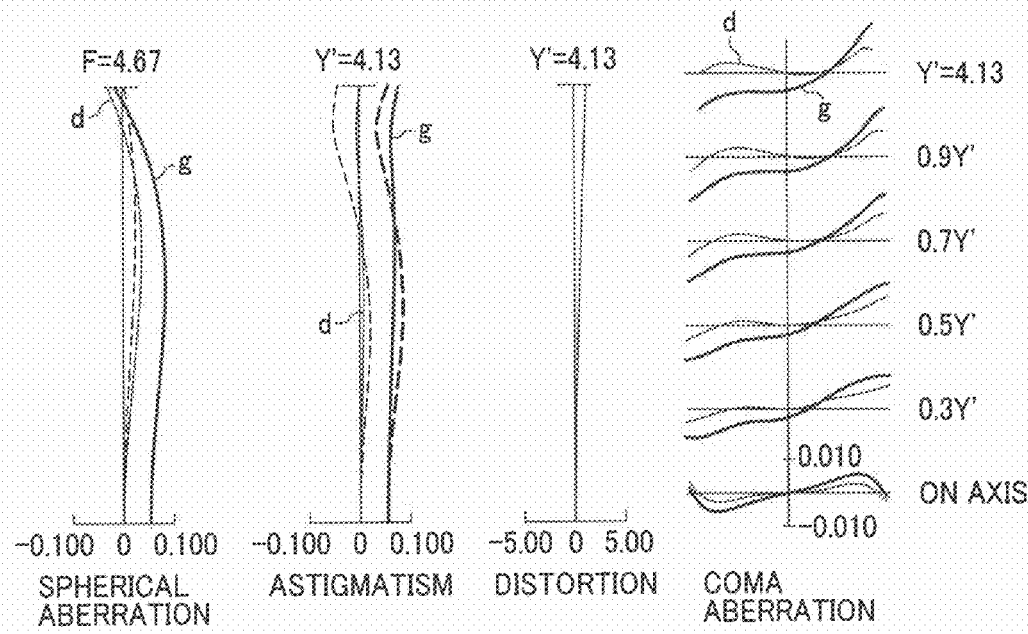

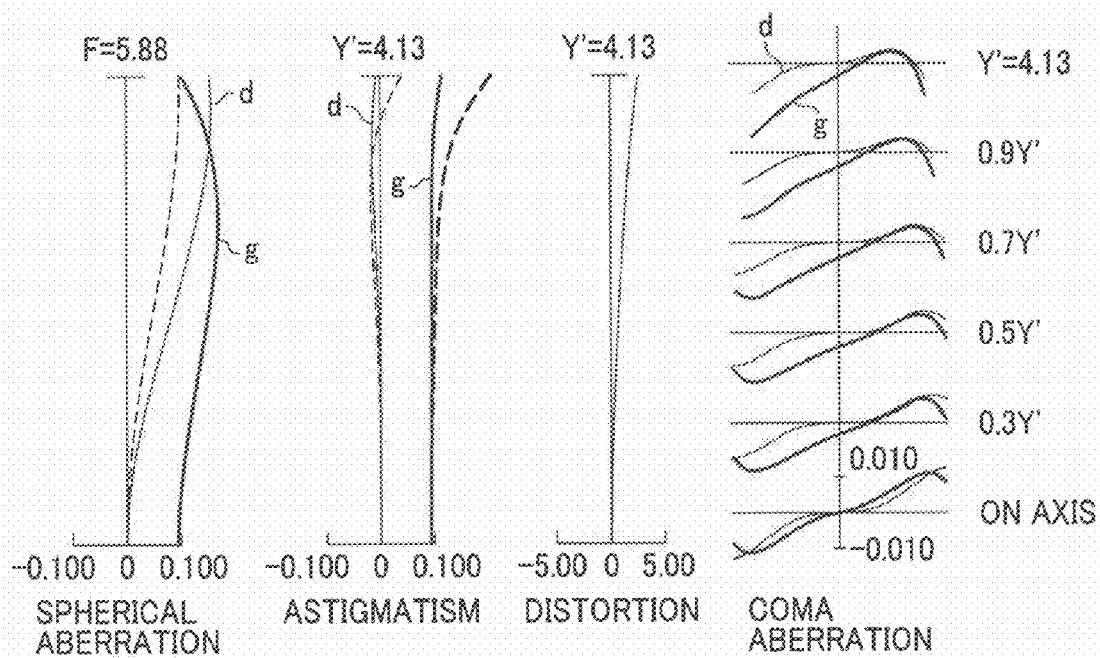

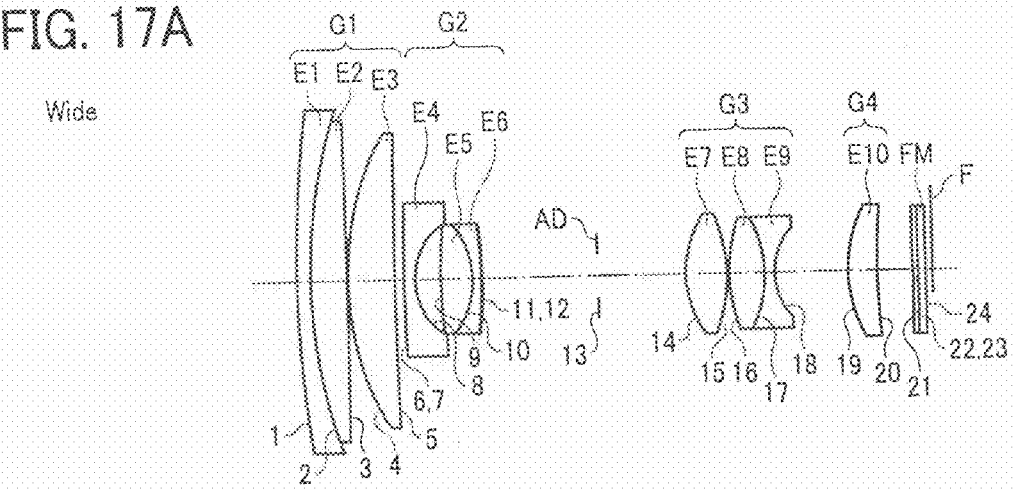
FIG. 17A Wide
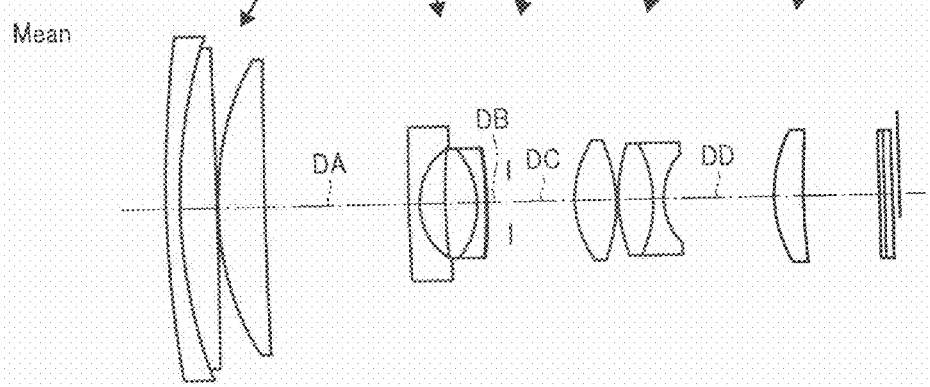
FIG. 17B Mean
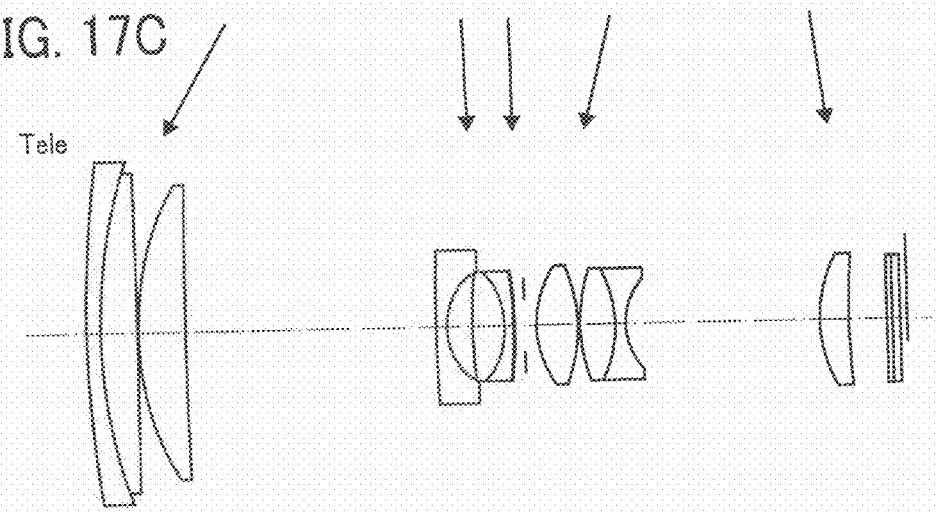
FIG. 17C Tele

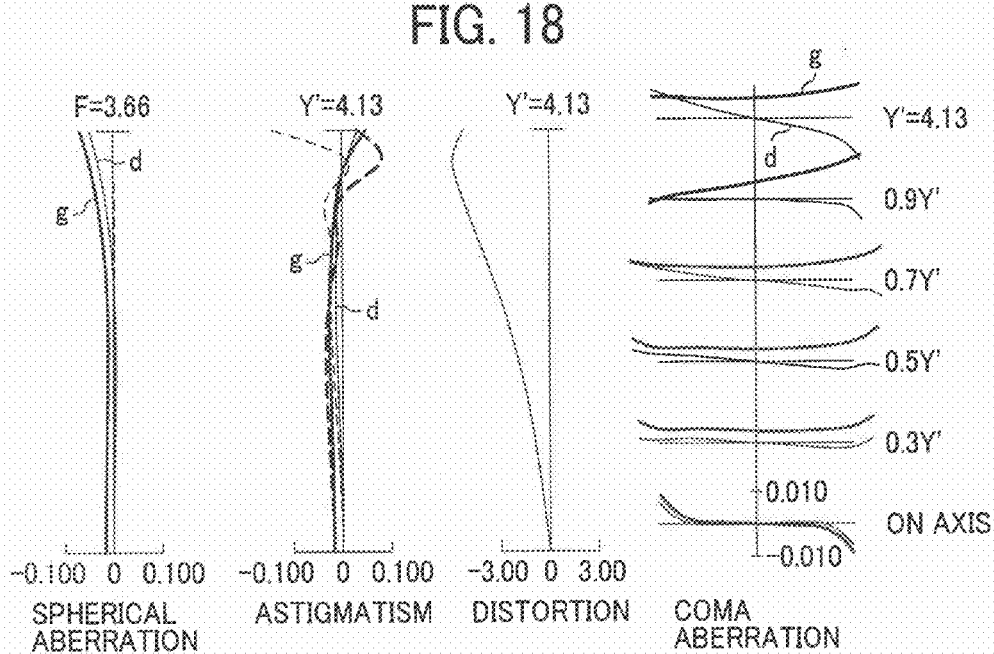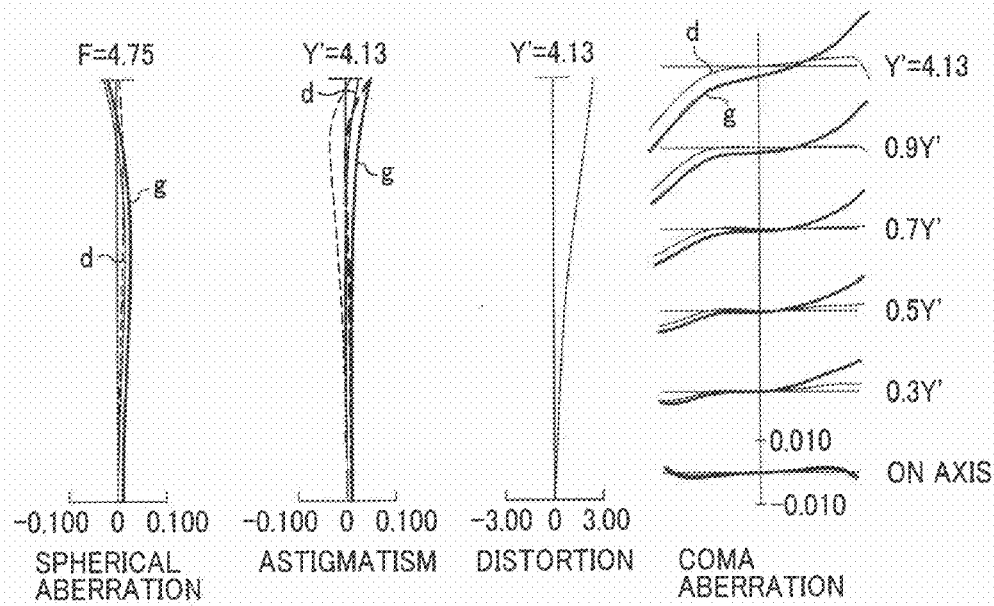

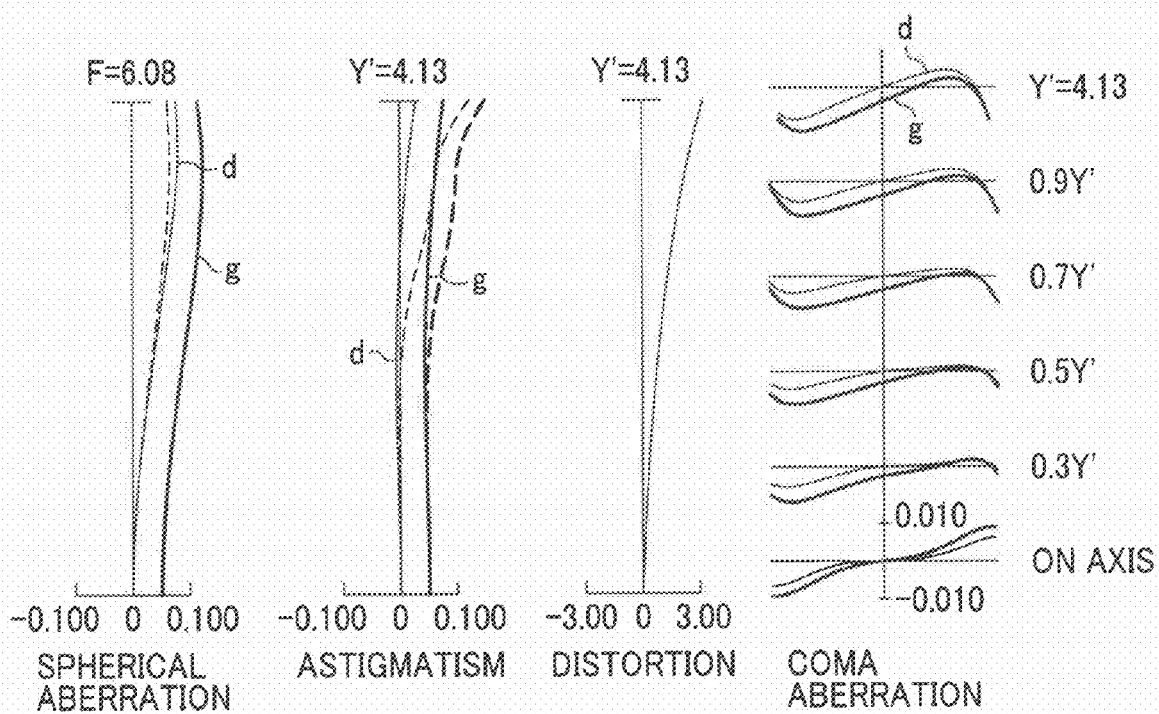

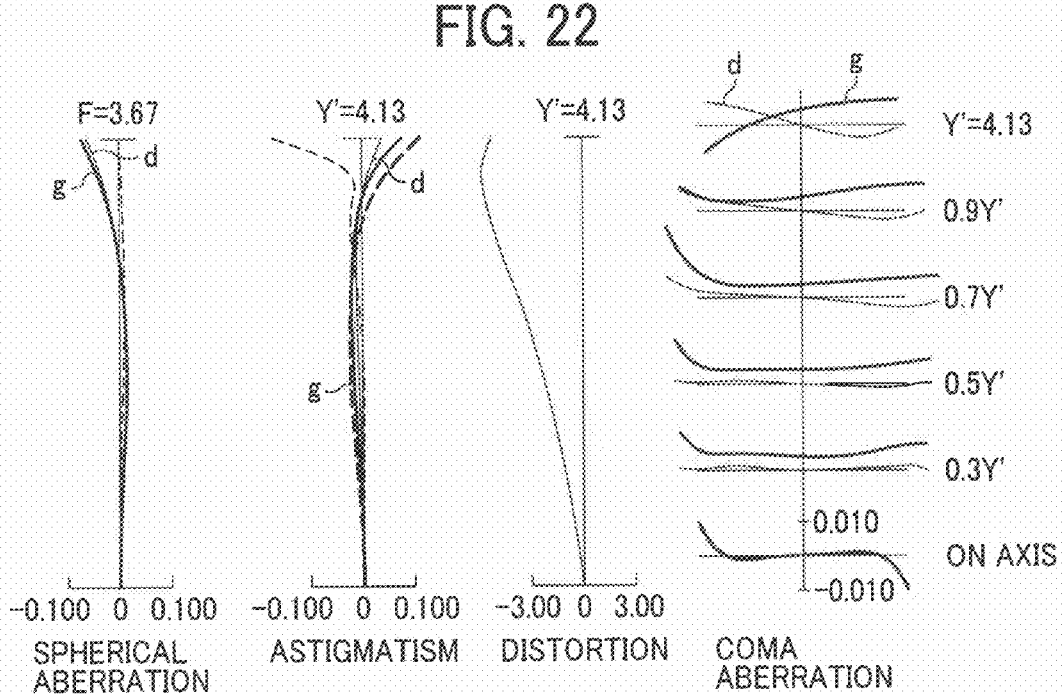
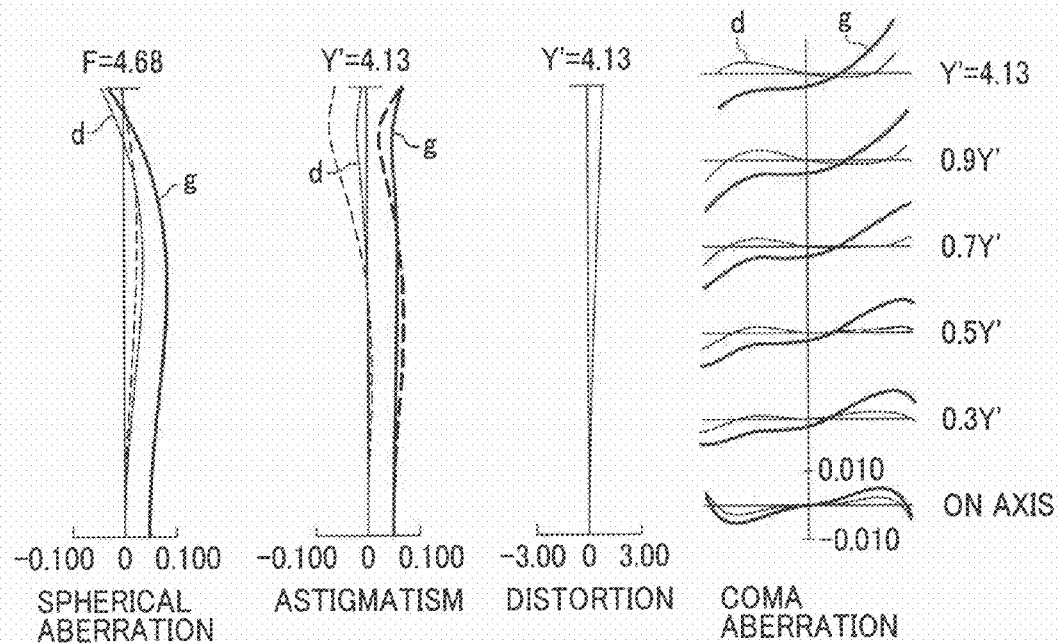

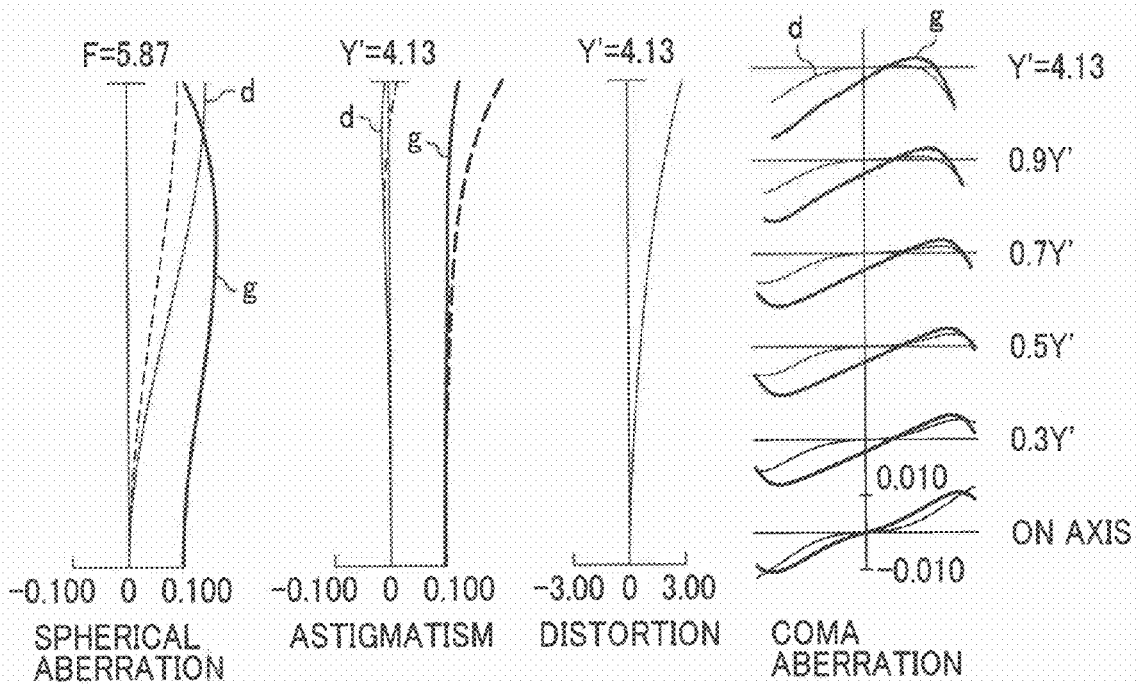

FIG. 25A Wide
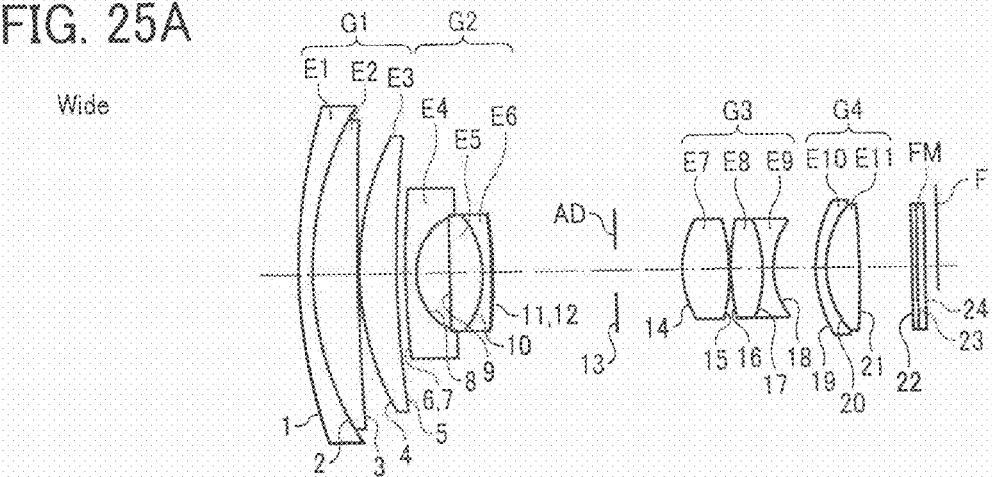
FIG. 25B Mean
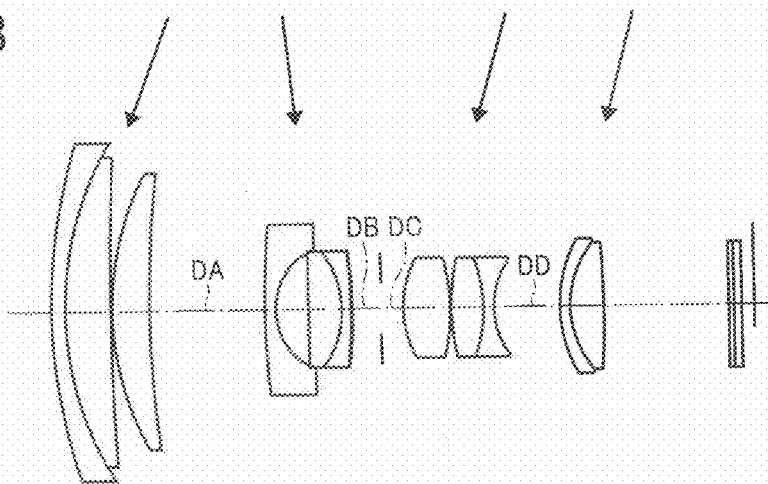
FIG. 25C Tele
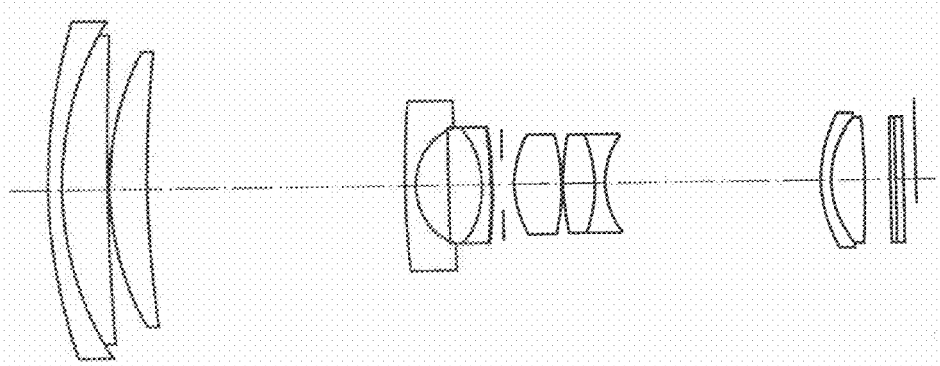

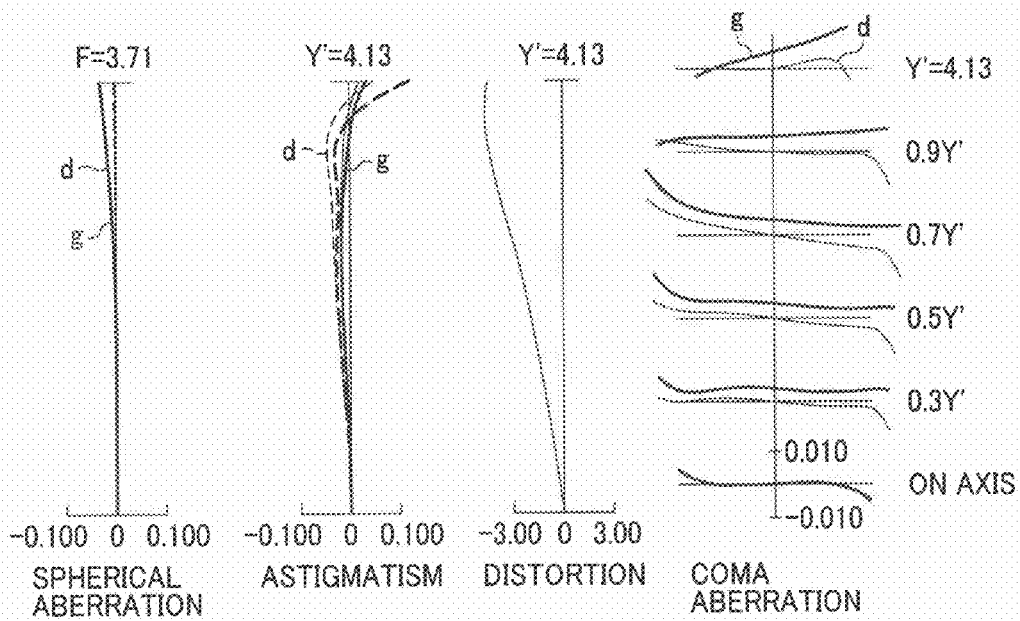
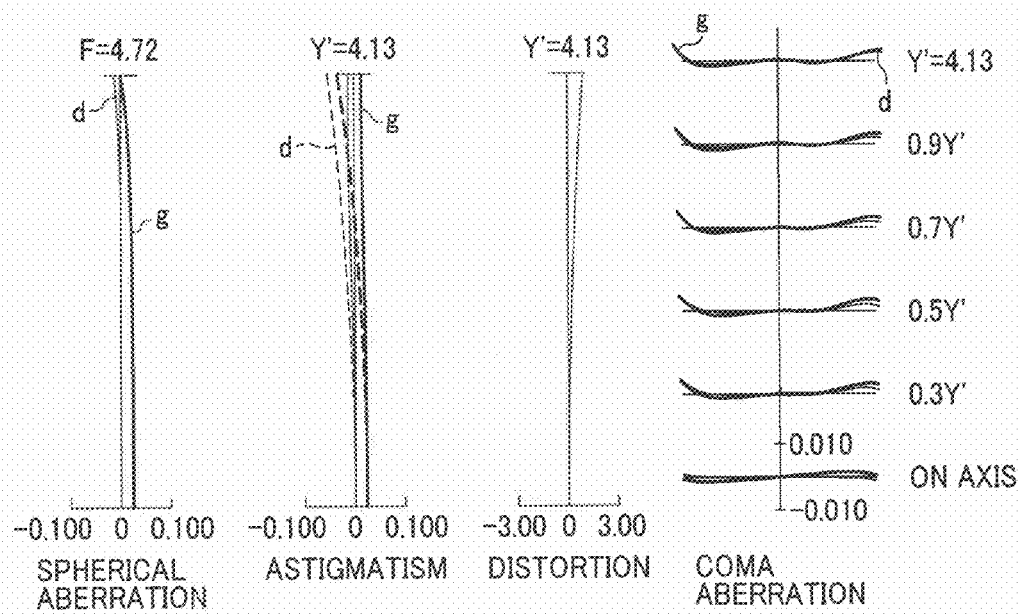

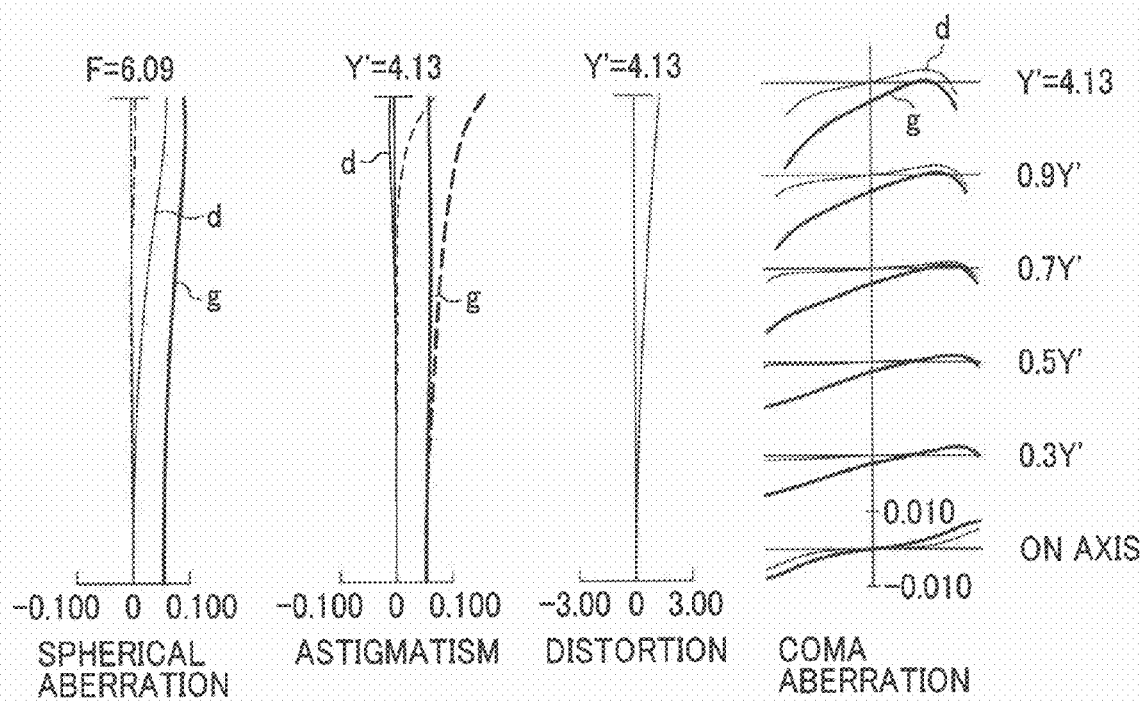

Wide

Mean

Tele

Wide

Mean

Tele

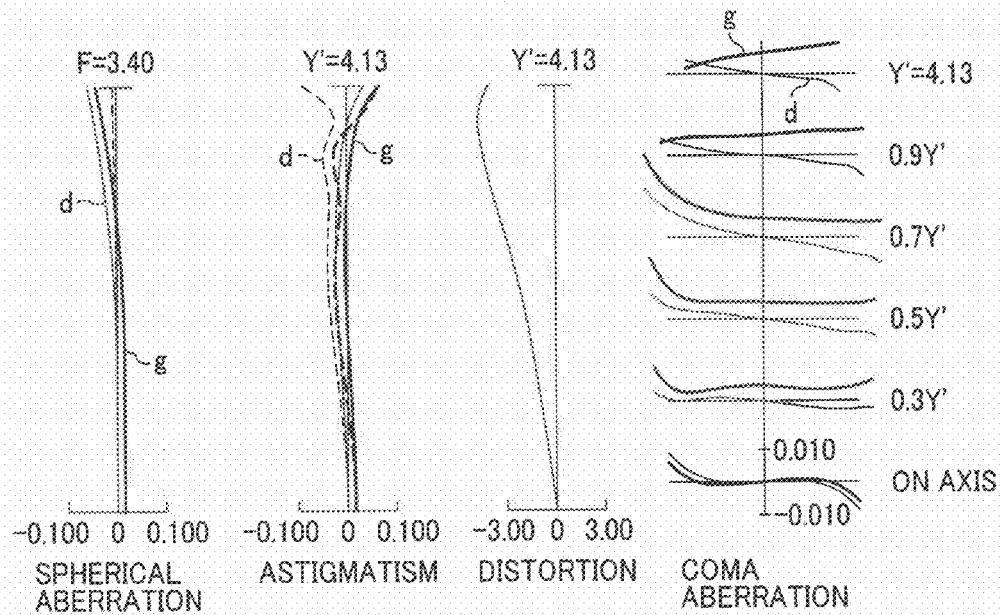
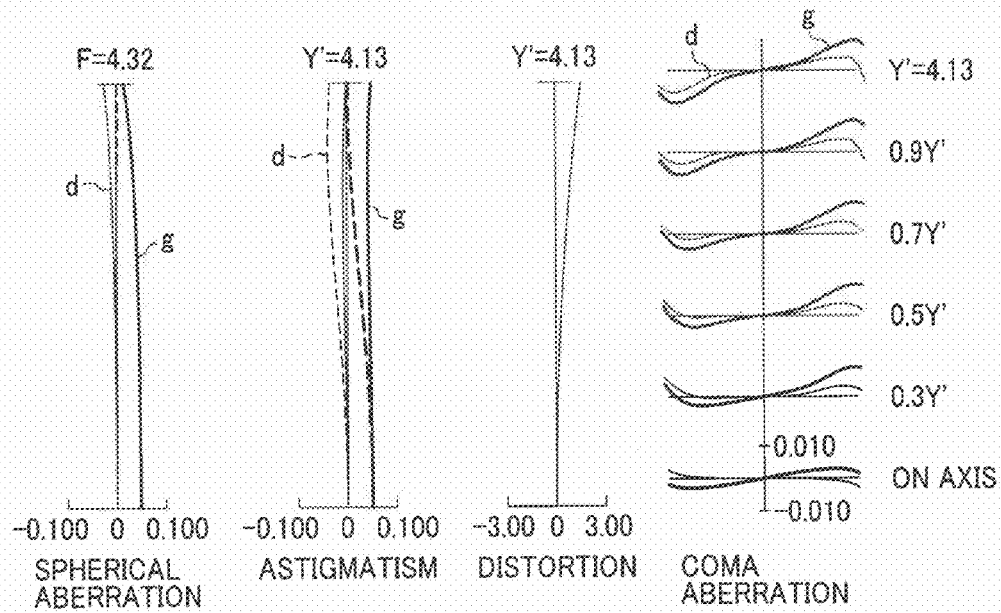

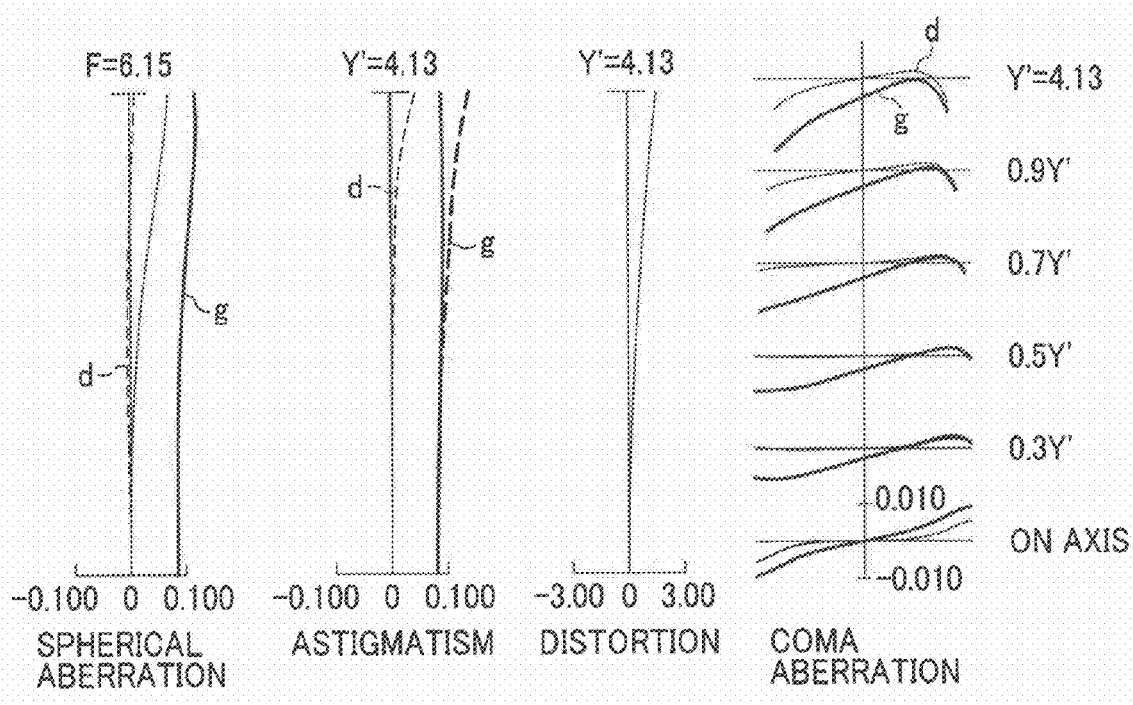

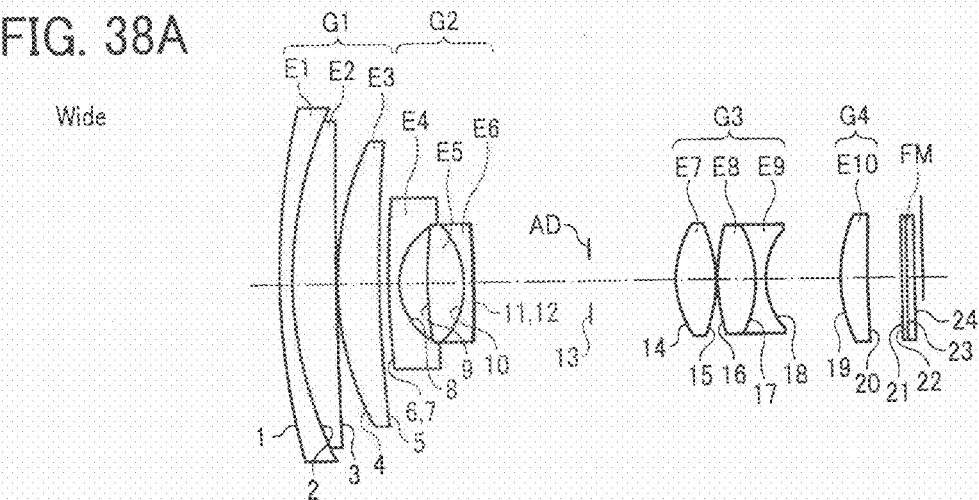
FIG. 38A Wide
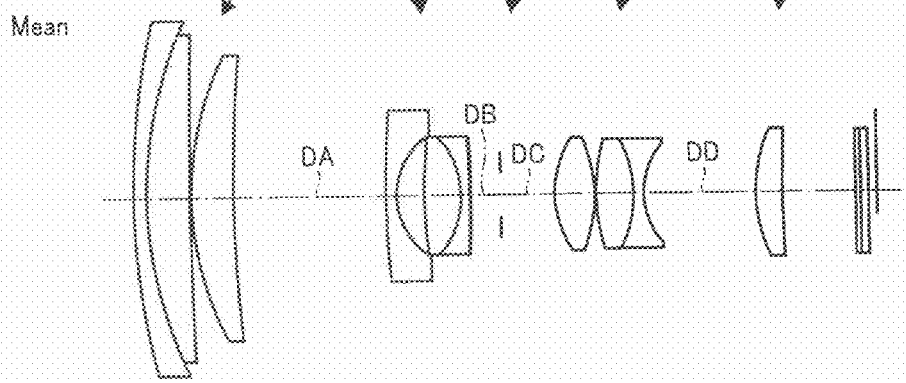
FIG. 38B Mean
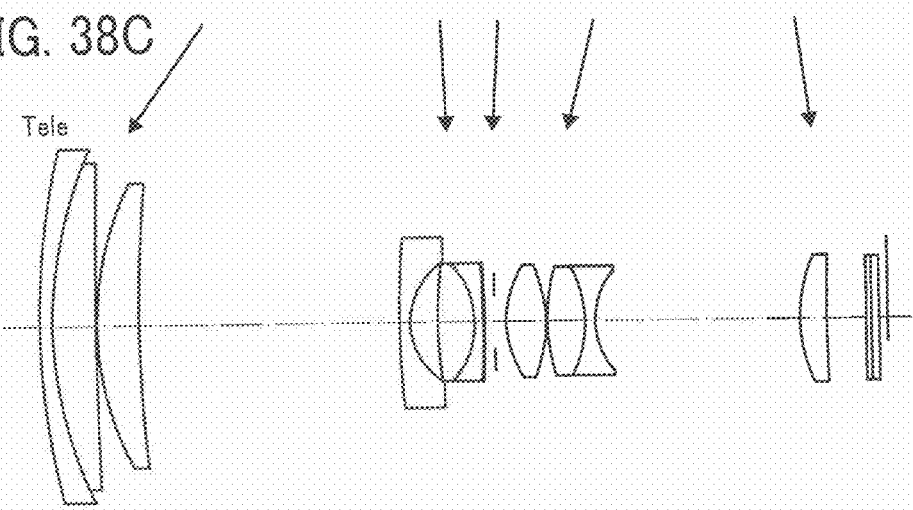
FIG. 38C Tele

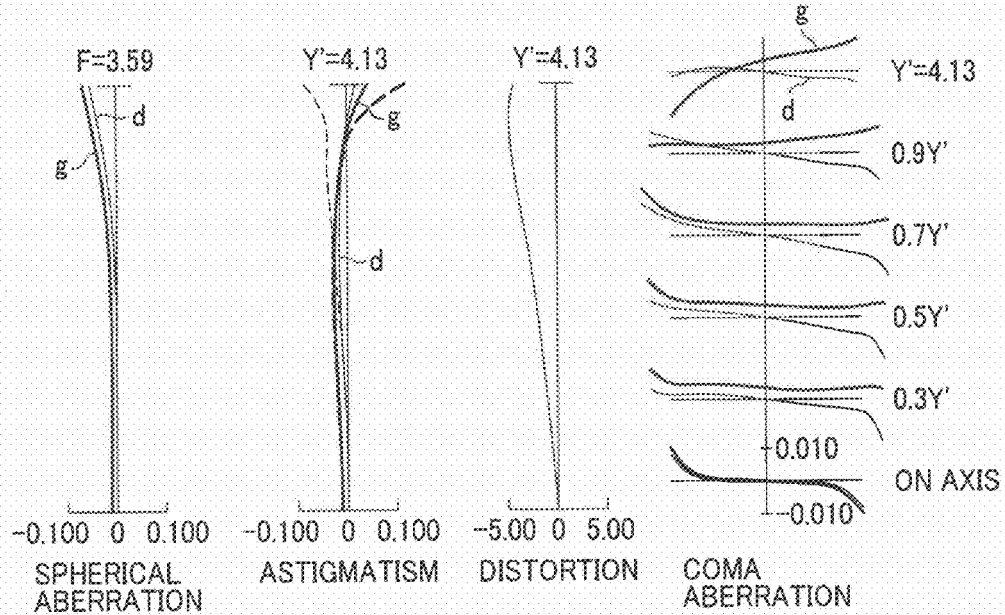
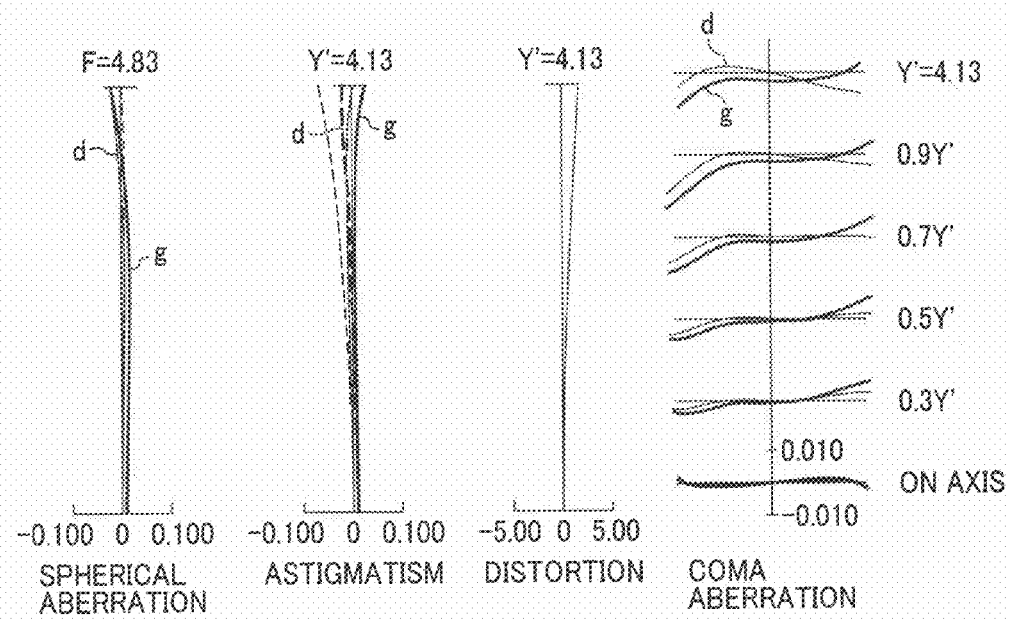

ZOOM LENS AND INFORMATION DEVICE

CROSS REFERENCE TO RELATED APPLICATIONS

The present application is based on and claims priority from Japanese Application Numbers, 2009-160297 and 2009-160299 filed on Jul. 6, 2009, and 2009-209864 filed on Sep. 10, 2009, the disclosure of which is hereby incorporated by reference herein in its entirety.

BACKGROUND OF THE INVENTION

1. Field of the Invention

The present invention relates to a zoom lens adapted to a digital camera configured to obtain an image data of a subject by use of an image pickup device such as a solid-state image pickup device, or the like, more preferably, a small size zoom lens preferably adapted to a video camera configured to obtain a moving image and a digital still camera configured to photograph a still image and an information device having a photographing function by use of such a zoom lens as a photographing optical system.

2. Description of the Related Art

Recently, instead of a still camera in a film type using a silver salt film as an image recording medium, that is, a silver-salt camera, an imaging apparatus such as a digital camera obtaining a still image, a video or a moving image of a subject via a solid-state image pickup device such as a CCD (charge-coupled device) image pickup device, a CMOS (complementary metal-oxide semiconductor) image pickup device, and the like and an information device having such a camera function, for example, a portable information terminal apparatus, have been widely used. User requirements in the above devices have been diversified and particularly, of the user requirements, an imaging apparatus having a small size and high performance, and also a small size and high performance zoom lens which is used as a photographing optical system has been required.

In the zoom lens used as the photographing optical system in such an imaging apparatus, in order to downsize a zoom lens used as an imaging optical system in such an imaging apparatus, it is required to reduce an entire length of lenses when changing magnification of the zoom lens (that is, a distance from a lens surface at the most object side to an image plane), more particularly, to reduce an entire length of the lenses at a telephoto end. Furthermore, in order to downsize the imaging apparatus, it is important to suppress the entire length of the lenses at a stored state by reducing a thickness of each lens group. In order to achieve high performance of the zoom lens, considering possibility of application to the high-end digital camera, resolution corresponding to an image pickup device having at least more than 5 to 10 million pixels is required over an entire zoom range.

In order to achieve a wide filed angle of the imaging optical system, it is preferable to achieve a half field angle of 38 degree or more at a wide angle end. The half field angle of 38 degrees corresponds to a focal length of 28 mm in a case of a silver-salt camera using a silver-salt film (so-called Leica film) having a width of 35 mm.

Although there are various types of the zoom lens for a digital camera, the zoom lens having five or more lens groups is not suitable for a small size camera because it is difficult to reduce a total thickness of the lens groups.

As the zoom lens having four lens groups suitable for a high variable magnification ratio and large aperture, an example of a zoom lens including a first lens group having a positive refractive power, a second lens group having a negative refractive power, a third lens group having a positive refractive power, and a fourth lens group having a positive refractive power, which are disposed in order from an object side has been known.

In such a zoom lens adapted to high magnification ratio and a wide aperture and having four lens groups, when changing the magnification of the zoom lens from a wide angle end to a telephoto end, an interval between the first and second lens groups is increased, an interval between the second and third lens groups is decreased, an interval between the third and fourth lens groups is changed or increased, and the second lens group has a negative lens, a positive lens, and a negative lens, in order from the object side, or the third lens group includes a positive lens, a positive lens, and a negative lens, in order from the object side is disclosed in Japanese Patent Application Publication Nos. 2008-107559, 2008-112013, 2005-326743, 2008-076493, 2008-225328, 2008-026837, 2004-199000, 2008-096924.

The zoom lens disclosed in Japanese Patent Application Publication No. 2008-107559 has a wide half angle of field of about 40 degrees at the wide angle end but the magnification ratio is only about 5 times. Furthermore, the distortion at the wide angle end is about 10% and therefore even if the distortion is corrected by image processing, an image is degraded due to a large correction amount.

The zoom lens disclosed in Japanese Patent Application Publication No. 2008-112013 has a large variable magnification ratio, that is, about 9 times and a half field angle of about 40 degrees at the wide angle end as well as a relatively small telephoto ratio. However, the distortion at the wide angle end is about 10% and therefore even if the distortion is corrected by image processing, an image is degraded due to a large correction amount.

That is, the zoom lenses disclosed in both of Japanese Patent Application Publication Nos. 2008-107559 and 2008-112013 are not sufficiently suitable for a zoom lens used as a photographing optical system in a high performance digital camera, or the like.

In Japanese Patent Application Nos. 2005-326743, 2008-076493, 2008-225328 and 2008-146016, the magnification ratio is between about 2.8 times and about 6.8 times and therefore it is not sufficient for satisfying a recently-raised user requirement. In Japanese Patent Application No 2006-189598, the large magnification ratio of 15 times is provided. However, the half angle of field is about 31 degrees and therefore user requirement for a wide angle is not sufficiently satisfied. In Japanese Patent Application No. 2008-026837, the magnification ratio is about 10 times. However, the telephoto ratio is large so that compact size is not sufficiently achieved and aberration correction is required to be improved. In Japanese Patent Application No. 2008-112013, the large magnification ratio of about 9.5 times and an angle of field of about 40 degrees are provided as well as relatively less telephoto ratio. However, the aberration correction is required to be improved.

As described above, the configurations disclosed in Japanese Patent Application Publication Nos. 2008-107559 and 2008-112013 do not achieve a zoom lens having a wide angle of field and small size as well as high magnification ratio and less aberration to satisfy the user requirements. Consequently, it is required to provide a zoom lens capable of achieving a wide angle of field and a small size and having a high magnification ratio and less aberration.

SUMMARY OF THE INVENTION

An object of the present invention is to provide a zoom lens capable of achieving a high magnification ratio of 10 times or more and a wide half angle of field of 38 degrees or more as well as less aberration and having a resolving power adapted to an image pickup device having more than 5 to 10 million pixels and also a small size information device having the zoom lens having high performance photographing function.

To achieve the above object, a zoom lens according to an embodiment of the present invention includes a first lens group having a positive refractive power, a second lens group having a negative refractive power, a third lens group having a positive refractive power, and a fourth lens group having a positive refractive power, which are disposed in order from an object side to an image side, and an aperture stop disposed at an object side of the third lens group. When changing the magnification of the zoom lens from a wide angle end to a telephoto end, an interval between the first and second lens groups increases, an interval between the second and third lens groups decreases, and an interval between the third and fourth lens groups increases. The first lens group includes at least a negative lens, a positive lens, and a positive lens, which are disposed in order from the object side. The following conditions (1-1) to (1-3) are satisfied:

$$nd11 > 1.85 \quad (1\text{-}1)$$

$$vd11 > 25 \quad (1\text{-}2)$$

$$-1.6 \times 10^{-3} \cdot vd11 + 0.642 < \theta_{gF} < -2.9 \times 10^{-3} \cdot vd11 + 0.69 \quad (1\text{-}3)$$

where nd11 is a refractive index of the negative lens of the first lens group for a d line, vd11 is an Abbe number of the negative lens of the first lens group for the d line, and $\theta_{gF}$ is a relative partial dispersion of the negative lens of the first lens group which is $(n_g - n_F)/(n_F - n_C)$ where $n_g$ is a refractive index for a g line, $n_F$ is a refractive index for a F line, and $n_C$ is a refractive index of the negative lens of the first lens group for a C line.

BRIEF DESCRIPTION OF THE DRAWINGS

FIG. 1A is a schematic sectional view of an optical system of a zoom lens according to an example 1 along an optical axis at a wide angle end.

FIG. 1B is a schematic sectional view of the optical system of the zoom lens according to the example 1 along the optical axis at a predetermined intermediate focal length position.

FIG. 1C is a schematic sectional view of the optical system of the zoom lens according to the example 1 along the optical axis at a telephoto end.

FIG. 2 is a view illustrating aberration curves of spherical aberration, astigmatism, distortion, and coma aberration in the zoom lens according to the example 1 at the wide angle end.

FIG. 3 is a view illustrating aberration curves of spherical aberration, astigmatism, distortion, and coma aberration in the zoom lens according to the example 1 at the intermediate focal length position.

FIG. 4 is a view illustrating aberration curves of spherical aberration, astigmatism, distortion, and coma aberration in the zoom lens according to the example 1 at the telephoto end.

FIG. 8 is a view illustrating aberration curves of spherical aberration, astigmatism, distortion, and coma aberration in the zoom lens according to the example 2 at the telephoto end.

FIG. 9A is a schematic sectional view of an optical system of a zoom lens according to an example 3 along an optical axis at a wide angle end.

FIG. 9B is a schematic sectional view of the optical system of the zoom lens according to the example 3 along the optical axis at a predetermined intermediate focal length position.

FIG. 9C is a schematic sectional view of the optical system of the zoom lens according to the example 3 along the optical axis at a telephoto end.

FIG. 10 is a view illustrating aberration curves of spherical aberration, astigmatism, distortion, and coma aberration in the zoom lens according to the example 3 at the wide angle end.

FIG. 11 is a view illustrating aberration curves of spherical aberration, astigmatism, distortion, and coma aberration in the zoom lens according to the example 3 at the intermediate focal length position.

FIG. 13A is a schematic sectional view of an optical system of a zoom lens according to an example 4 along an optical axis at a wide angle end.

FIG. 13B is a schematic sectional view of the optical system of the zoom lens according to the example 4 along the optical axis at a predetermined intermediate focal length position.

FIG. 13C is a schematic sectional view of the optical system of the zoom lens according to the example 4 along the optical axis at a telephoto end.

FIG. 14 is a view illustrating aberration curves of spherical aberration, astigmatism, distortion, and coma aberration in the zoom lens according to the example 4 at the wide angle end.

FIG. 15 is a view illustrating aberration curves of spherical aberration, astigmatism, distortion, and coma aberration in the zoom lens according to the example 4 at the intermediate focal length position.

FIG. 16 is a view illustrating aberration curves of spherical aberration, astigmatism, distortion, and coma aberration in the zoom lens according to the example 4 at the telephoto end.

FIG. 17A is a schematic sectional view of an optical system of a zoom lens according to an example 5 along an optical axis at a wide angle end.

FIG. 17B is a schematic sectional view of the optical system of the zoom lens according to the example 5 along the optical axis at a predetermined intermediate focal length position.

FIG. 17C is a schematic sectional view of the optical system of the zoom lens according to the example 5 along the optical axis at a telephoto end.

FIG. 18 is a view illustrating aberration curves of spherical aberration, astigmatism, distortion, and coma aberration in the zoom lens according to the example 5 at the wide angle end.

FIG. 19 is a view illustrating aberration curves of spherical aberration, astigmatism, distortion, and coma aberration in the zoom lens according to the example 5 at the intermediate focal length position.

FIG. 20 is a view illustrating aberration curves of spherical aberration, astigmatism, distortion, and coma aberration in the zoom lens according to the example 5 at the telephoto end.

FIG. 22 is a view illustrating aberration curves of spherical aberration, astigmatism, distortion, and coma aberration in the zoom lens according to the example 6 at the wide angle end.

FIG. 23 is a view illustrating aberration curves of spherical aberration, astigmatism, distortion, and coma aberration in the zoom lens according to the example 6 at the intermediate focal length position.

FIG. 24 is a view illustrating aberration curves of spherical aberration, astigmatism, distortion, and coma aberration in the zoom lens according to the example 6 at the telephoto end.

FIG. 25A is a schematic sectional view of an optical system of a zoom lens according to an example 7 along an optical axis at a wide angle end.

FIG. 25B is a schematic sectional view of the optical system of the zoom lens according to the example 7 along the optical axis at a predetermined intermediate focal length position.

FIG. 25C is a schematic sectional view of the optical system of the zoom lens according to the example 7 along the optical axis at a telephoto end.

FIG. 26 is a view illustrating aberration curves of spherical aberration, astigmatism, distortion, and coma aberration in the zoom lens according to the example 7 at the wide angle end.

FIG. 27 is a view illustrating aberration curves of spherical aberration, astigmatism, distortion, and coma aberration in the zoom lens according to the example 7 at the intermediate focal length position.

FIG. 28 is a view illustrating aberration curves of spherical aberration, astigmatism, distortion, and coma aberration in the zoom lens according to the example 7 at the telephoto end.

FIG. 34 is a view illustrating aberration curves of spherical aberration, astigmatism, distortion, and coma aberration in the zoom lens according to the example 9 at the wide angle end.

FIG. 35 is a view illustrating aberration curves of spherical aberration, astigmatism, distortion, and coma aberration in the zoom lens according to the example 9 at the intermediate focal length position.

FIG. 36 is a view illustrating aberration curves of spherical aberration, astigmatism, distortion, and coma aberration in the zoom lens according to the example 9 at the telephoto end.

FIG. 38A is a schematic sectional view of an optical system of a zoom lens according to an example 10 along an optical axis at a wide angle end.

FIG. 38B is a schematic sectional view of the optical system of the zoom lens according to the example 10 along the optical axis at a predetermined intermediate focal length position.

FIG. 38C is a schematic sectional view of the optical system of the zoom lens according to the example 10 along the optical axis at a telephoto end.

FIG. 39 is a view illustrating aberration curves of spherical aberration, astigmatism, distortion, and coma aberration in the zoom lens according to the example 10 at the wide angle end.

FIG. 40 is a view illustrating aberration curves of spherical aberration, astigmatism, distortion, and coma aberration in the zoom lens according to the example 10 at the intermediate focal length position.

DETAILED DESCRIPTION OF THE PREFERRED EMBODIMENTS

Figure 5A:
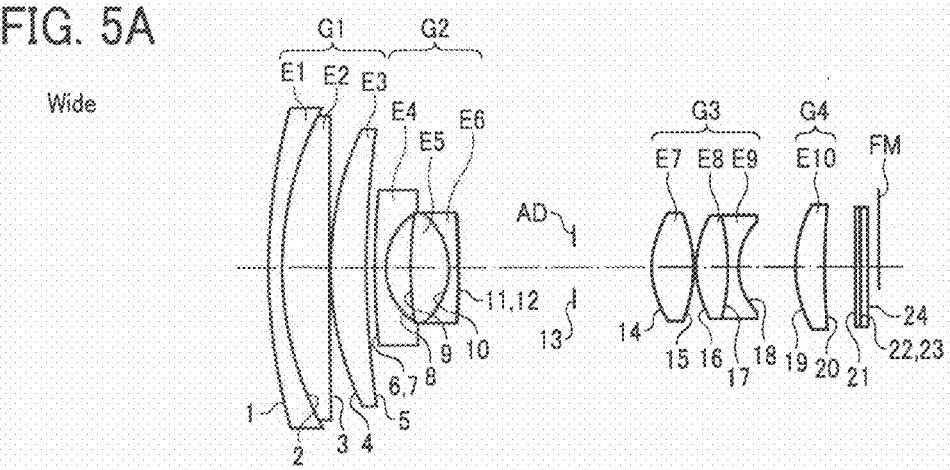
FIG. 5A is a schematic sectional view of an optical system of a zoom lens according to an example 2 along an optical axis at a wide angle end.

Preferred embodiments of the present invention will be explained in detail hereinafter with reference to the accompanying drawings.

[First Embodiment]

Hereinafter, a zoom lens and an information device according to a first embodiment of the present invention will be explained in detail with reference to accompanying drawings. At first, fundamental embodiments of the present invention will be explained.

The zoom lens according to one embodiment of the present invention includes a first lens group having a positive refractive power, a second lens group having a negative refractive power, a third lens group having a positive refractive power, and a fourth lens group having a positive refractive power, which are disposed in order from an object side to an image side, and an aperture stop disposed at an object side of the third lens group. In the zoom lens, in which when changing the magnification of the zoom lens from a wide angle end to a telephoto end, an interval between the first and second lens groups increases, an interval between the second and third lens groups decreases, and an interval between the third and fourth lens groups increases, the first lens group includes at least a negative lens, a positive lens, and a positive lens, which are disposed in order from the object side and the following conditions (1-1) to (1-3) are satisfied:

$$nd11>1.85 \quad (1\text{-}1)$$

$$vd11>25 \quad (1\text{-}2)$$

$$-1.6\times10^{-3}\cdot vd11+0.642<\theta_{gF}<-2.9\times10^{-3}\cdot vd11+0.69 \quad (1\text{-}3)$$

where nd11 is a refractive index of the negative lens of the first lens group for a d line, vd11 is an Abbe number of the negative lens of the first lens group for the d line, and $\theta_{gF}$ is a relative partial dispersion of the negative lens of the first lens group which is $(n_g-n_F)/(n_F-n_C)$ where $n_g$ is a refractive index for a g line, $n_F$ is a refractive index for a F line, and $n_C$ is a refractive index of the negative lens of the first lens group for a C line. Here, when changing the magnification of the zoom lens from a wide angle end to a telephoto end, all of the lens groups may move.

The condition (1-1) is for determining a refractive index of the negative lens of the first lens group for the d line. In order to downsize the first lens group, for example, reduce a thickness of the first lens group in a direction of an optical axis, the condition (1-1) is preferably 1.85 or more. The condition (1-2) is for determining an Abbe number of the negative lens of the first lens group for a d line.

In general, glass materials having high dispersion (small Abbe number) and glass materials having low dispersion (large Abbe number) are combined in order to correct color aberration. However, in order to correct color aberration at an entire zooming range in a balanced manner when largely changing the magnification of the zoom lens from the wide angle end to the telephoto end, the Abbe number of the negative lens of the first lens group for the d line is preferably 25 or more. Furthermore, the condition (1-3) is for determining a relative partial dispersion of the negative lens of the first lens group. The relative partial dispersion is a value obtained by $(n_g-n_F)/(n_F-n_C)$, where $n_g$ is the refractive index for the g line, $n_F$ is a refractive index for the F line, and $n_C$ is the refractive index for the C line.

Figure 37:
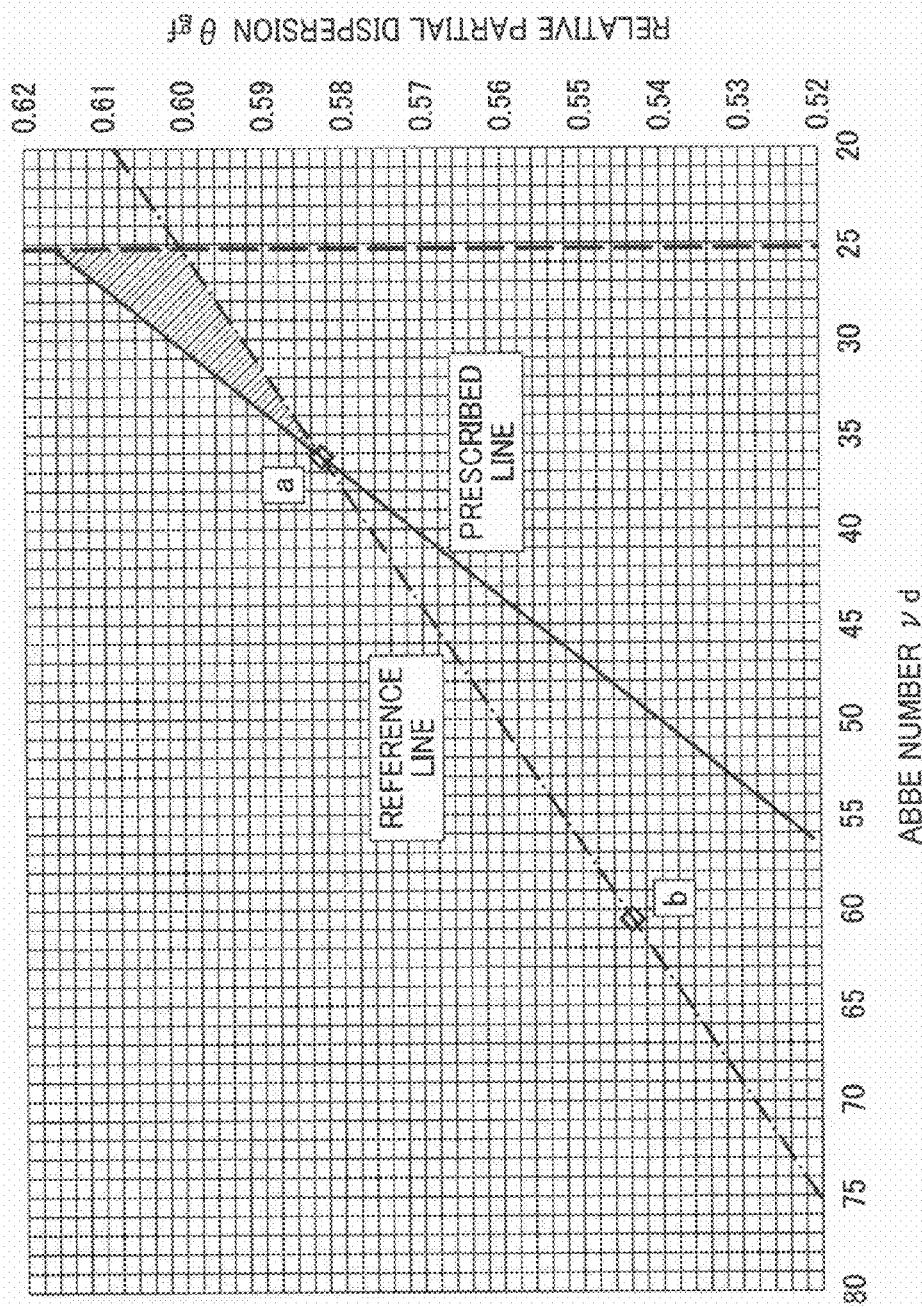
FIG. 37 is a view explaining a relationship between an Abbe number and a relative partial dispersion according to an embodiment of the present invention.

FIG. 37 shows a relationship between the Abbe number vd and the relative partial dispersion $\theta_{gF}$. In FIG. 37, a point "a" indicates PBM2 (product name, produced by OHARA INC.) (vd=36.26, $\theta_{gF}$=0.5828) and a point "b" indicates NSL7 (product name, produced by OHARA INC.) (vd=60.49, $\theta_{gF}$=0.5436) and then a line connecting the points a, b is a reference line. This reference line corresponds to a left hand side of the condition (1-3), that is, $-1.6\times10^{-3}\cdot vd11+0.642$. A specified line in FIG. 37 corresponds to a right hand side of the condition (1-3), that is, $-2.9\times10^{-3}\cdot vd11+0.69$. A range surrounded by the condition (1-2) vd11>25 is a range specifying the embodiment.

If the relative partial dispersion $\theta_{gF}$ is lower than a lower limit of the condition (1-3), it is not possible to correct the color aberration at the entire zooming range in a balanced manner. If the relative partial dispersion $\theta_{gF}$ is more than an upper limit of the condition (1-3), it is difficult to correct chromatic aberration of magnification which is color aberration, especially, of off-axis light beams at the entire zooming range in a balanced manner. Accordingly, especially, when the magnification of the zoom lens is largely changed, MTF is degraded at the telephoto end.

Furthermore, in the above described zoom lens, the second lens group preferably includes at least a negative lens, a positive lens, and a negative lens, which are disposed in order from the object side.

In addition, the above described zoom lens, it is preferable that the following condition (1-4) is satisfied:

$$5<fl/fw<8, \quad (1\text{-}4)$$

where fl is a focal length of the first lens group and fw is a focal length of the zoom lens at the wide angle end.

The condition (1-4) indicates a range of a ratio of the focal length of the first lens group to the focal length of the zoom lens at the wide angle end fl/fw. If the ratio fl/fw is more than an upper limit, that is, 8, there is a problem for reducing a camera size because a size of the zoom lens in a stored state is increased. If the ratio fl/fw is less than a lower limit, that is, 5, it is difficult to correct various aberrations.

In the above described zoom lens, it is preferable that the following condition is satisfied:

$$ft/fw>7, \quad (1\text{-}5)$$

where ft is a focal length of the zoom lens at the telephoto end and fw is a focal length of the zoom lens at the wide angle end.

The condition (1-5) indicates a variable magnification ratio. In this case, the variable magnification ratio is applied to more than 7. Particularly, even when the variable magnification ratio is 10 to 11 times, the aberration can be appropriately corrected.

In the above described zoom lens, it is preferable that the third lens group includes a positive lens, a positive lens and a negative lens, which are disposed in order from the object side. According to this configuration, even in the zoom lens having a large variable magnification ratio of more than 7 times from the wide angle end to the telephoto end, it is possible to appropriately correct aberrations such as color aberration, or the like, at the entire zooming range.

An information device according to an example of the embodiment of the present invention has a photographic function using the zoom lens according to the above described embodiment as a photographic optical system. Such an information device includes an image pickup device having a light receiving surface, and an object image through the zoom lens may be imaged on the light receiving surface of the image pickup device. The information device may be used in a digital camera, a video camera, a silver salt camera, and the like, and particularly, may be appropriately used as a portable information terminal apparatus.

Here, the zoom lens according to the above described embodiment of the present invention will be supplementarily explained.

As described above, in the zoom lens including the first lens group having the positive refractive power, the second lens group having the negative refractive power, the third lens group having the positive refractive power, and the fourth lens group having the positive refractive power, which are disposed in order from the object side, that is, positive-negative-positive-positive four lens groups, generally, the second lens group is configured as a "variator" which has a main magnification function. However, in the zoom lens according to an embodiment of the present invention, the third lens group also has a magnification function to reduce the burden of the second lens group so that degree of correction freedom for an aberration correction which is difficult in a wider angle- and higher magnification-zoom lens is ensured.

Furthermore, if the first lens group is configured to be moved toward the object side when changing the magnification of the zoom lens from the wide angle end to the telephoto end, a height of a light beam passing through the first lens group at the wide angle end is lowered. Accordingly, the zoom lens is configured such that the size of the first lens group is prevented from increasing in a wider angle zoom lens and a sufficient interval between the first and second lens groups is ensured to prevent the F number (F value) at the telephoto end from increasing.

According to such a configuration of the embodiment of the present invention, a new zoom lens and an information device can be provided. As shown in the following specific examples in detail, the zoom lens is capable of being applied to a light receiving element having more than 5 million to 10 million pixels due to the small size and the sufficient correction of aberration. In addition, if such a zoom lens is used as a photographing optical system, a small size and high performance information device including an imaging apparatus such as a digital camera can be achieved.

Next, specific examples based on the above described embodiment of the present invention will be explained. The following examples 1 to 9 are specific numerical examples of the configuration of the zoom lens according to the embodiment of the present invention.

In the examples 1 to 9 (also the following example 10 of the later described third embodiment), a parallel plate optical element is provided at an image side of the fourth lens group and may be one of various types of optical filter such as an optical low-pass filter, an infrared cut filter and the like or may be a cover glass (seal glass) for an image pickup device such as a CCD sensor, or the like and is referred to as a filter FM. In addition, a unit of an amount having a dimension in length is "mm" unless otherwise stated.

Furthermore, in the examples 1 to 9 (also the following example 10), the zoom lens has some aspheric lens surfaces. In order to form an aspheric surface, as a so-called mold aspheric lens, each lens surface may be directly formed to be an aspheric surface or, as a so-called hybrid aspheric lens, a spherical lens surface may be covered with a resin thin film to form an aspheric surface.

Aberrations in the examples 1 to 9 (also the following example 10) are sufficiently corrected and the zoom lens can be used for a light-receiving element having 5 to 10 million pixels or more. By use of the configuration of the zoom lens according to an embodiment of the present invention, it is clearly found that it is possible to provide a zoom lens having a sufficiently-small size and good image performance according to the examples 1 to 9.

The following reference numbers are commonly used in the examples 1 to 10.

f: focal length of whole system of the zoom lens
F: F number (F value)
ω: half field angle
R: curvature radius (or paraxial curvature radius for aspheric surface)
D: surface interval
nd: refracting index
vd: Abbe number
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient
$A_{12}$: twelfth order aspheric coefficient
$A_{14}$: fourteenth order aspheric coefficient An aspheric form used in the following examples is defined in the following equation (1-6) and obtains a paraxial curvature radius, a conic constant, and each order aspheric coefficient to specify the form by use of the above aspheric coefficients:

(1-6)

$$X = \frac{CH^2}{1 + \sqrt{1 - (1+K)C^2 H^2}} + A_4 \cdot H^4 + A_6 \cdot H^6 + A_8 \cdot H^8 + A_{10} \cdot H^{10} + A_{12} \cdot H^{12} + A_{14} \cdot H^{14}$$

where X is an aspheric amount in a direction of the optical axis, C is an inverse of a paraxial curvature radius (paraxial curvature), H is a height from an optical axis of the zoom lens, and K is a conic constant.

EXAMPLE 1

FIG. 1A to 1C are schematic views of lens configurations of the zoom lens according to the example 1 of the first embodiment of the present invention on a zooming trajectory when zooming from a wide angle end to a telephoto end via a predetermined intermediate focal length position, that is, FIG. 1A is a schematic sectional view of the zoom lens at the wide angle end, FIG. 1B is a schematic sectional view of the zoom lens at the predetermined intermediate focal length position, and FIG. 1C is a schematic sectional view of the zoom lens at the telephoto end. A left side of FIGS. 1A to 1C is an object side of the zoom lens.

The zoom lens shown in FIG. 1A to 1C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 1A to 1C, surface numbers (1st to 24th surfaces) of each optical surface are shown. In addition, the same reference numbers are independently used in each example for sake of simplicity and therefore the configuration indicated by the same reference number is not always the same configuration.

When changing the magnification of the zoom lens from the wide angle end (short focal end) to the telephoto end (long focal end), all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens (a so-called hybrid aspheric lens) having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer to an image side surface in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface at the object side, the eighth lens E8 provided with a double-convex positive lens having a stronger convex surface at the object side, and the ninth lens E9 provided with a double-concave negative lens having a stronger concave surface at the image side, in order from the object side. The eighth and ninth lenses E8, E9 are closely stuck and cemented together with each other to form a cemented lens formed by the two lenses.

The fourth lens group G4 includes only the tenth lens E10 provided with a positive meniscus lens having an aspheric surface at the object side, which is a convex surface directed toward the object side.

In this case, as shown in FIGS. 1A to 1C, the first and third lens groups G1 and G3 are monotonically moved from the image side to the object side, the second lens group G2 is moved along a trajectory curve which is convex toward the image side, and the fourth lens group G4 is moved along a trajectory curve which is convex toward the object side when changing the magnification of the zoom lens from the wide angle end (short focal end) to the telephoto end (long focal end).

In this example 1, the focal length f of an entire optical system of the zoom lens, the F number F, and the half field angle ω are changed within a range of f=5.05 to 51.98, F=3.59 to 6.09, and ω=39.3 to 4.54, respectively. An optical property of each optical element is as follows:

TABLE 1

OPTICAL PROPERTIES
f = 5.05~51.98, F = 3.59~6.09, ω = 39.3~4.54

| Surface No. | R | D | nd | vd | GLASS TYPE | | NOTE | | |
|---|---|---|---|---|---|---|---|---|---|
| 1 | 43.7504 | 1.035 | | | | | | | G1 |
| | | | 2.00069 | 25.46 | HOYA | TAFD40 | | E1 | |
| 2 | 23.8077 | 3.35862 | | | | | | | |
| | | | 1.603 | 65.44 | OHARA | SPHM53 | | E2 | |
| 3 | 417.207 | 0.1 | | | | | | | |
| 4 | 22.476 | 2.71731 | | | | | | | |
| | | | 1.7725 | 49.6 | OHARA | SLAH66 | | E3 | |
| 5 | 87.0845 | Variable DA | | | | | | | |
| 6* | 90.8892 | 0.04 | 1.5202 | 52.02 | | | RESIN LAYER | E4 | G2 |
| 7 | 61.9212 | 0.8 | | | | | | | |
| | | | 2.0033 | 28.27 | OHARA | SLAH79 | | | |
| 8 | 4.84886 | 1.84814 | | | | | | | |
| 9 | 25.7749 | 3.05576 | | | | | | | |
| | | | 1.84666 | 23.78 | OHARA | STIH53 | | E5 | |
| 10 | −5.2676 | 0.7 | | | | | | E6 | |
| | | | 1.883 | 40.76 | OHARA | SLAH58 | | | |
| 11 | −61.351 | 0.04 | | | | | | | |
| 12* | 100.15 | Variable DB | 1.5202 | 52.02 | | | RESIN LAYER | | |
| 13 | ∞ | Variable DC | | | | | Aperture stop | AD | |
| 14* | 6.24807 | 3.35949 | | | | | | | G3 |
| | | | 1.48749 | 70.24 | OHARA | SFSL5 | | E7 | |
| 15* | −8.3239 | 0.19375 | | | | | | | |
| 16 | 7.34842 | 2.63755 | | | | | | | |
| | | | 1.5924 | 68.3 | SUMITA | KGFK68 | | E8 | |
| 17 | −13.426 | 0.8 | | | | | | | |
| | | | 1.90366 | 31.32 | HOYA | TAFD25 | | E9 | |
| 18 | 4.80907 | Variable DD | | | | | | | |
| 19* | 9.55516 | 2.23946 | | | | | | | |
| | | | 1.51633 | 64.06 | OHARA | LBSL7 | | E10 | G4 |
| 20 | 82.1926 | — | | | | | | | |
| 21 | ∞ | 0.3 | | | | | | FM | |
| | | | 1.5168 | 64.2 | | | | | |
| 22 | ∞ | 0.1 | | | | | | | |
| 23 | ∞ | 0.5 | | | | | | | |
| | | | 1.5 | 64 | | | | | |
| 24 | ∞ | — | | | | | | | |

In Table 1, the lens surface indicated by adding "*" (asterisk) is aspheric surface. Before a glass type name, a name of a manufacture is abbreviated to HOYA (HOYA CORPORA- TION), OHARA (OHARA INC.), SUMITA (SUMITA OPTICAL GLASS INC.), and HIKARI (HIKARI GLASS LTD.), as used in other examples.

That is, in Table 1, each of 6th, 12th, 14th, 15th and 19th optical surfaces is aspheric and indicated by asterisk, and the parameters in the equation (1-6) for each aspheric surface are as follows.

Aspheric Surface Parameters:
6th Surface $K=0$ $A_4=1.77332\times10^{-4}$ $A_6=-9.72325\times10^{-6}$ $A_8=6.90805\times10^{-7}$ $A_{10}=-2.97854\times10^{-8}$ $A_{12}=6.25272\times10^{-10}$ $A_{14}=-5.22888\times10^{-12}$ 12th Surface $K=0$ $A_4=-7.64112\times10^{-4}$ $A_6=2.16009\times10^{-6}$ $A_8=-1.12969\times10^{-6}$ $A_{10}=-1.24137\times10^{-8}$ 14th Surface $K=0$ $A_4=-8.06209\times10^{-4}$ $A_6=1.09740\times10^{-5}$ $A_8=-7.54712\times10^{-7}$ $A_{10}=1.12131\times10^{-8}$ $A_{12}=2.76518\times10^{-11}$ 15th Surface $K=0$ $A_4=4.55902\times10^{-4}$ $A_5=9.25284\times10^{-6}$ $A_5=-9.40053\times10^{-8}$ 19th Surface $K=0$ $A_4=-4.47303\times10^{-6}$ $A_6=3.64467\times10^{-6}$ $A_8=-5.98158\times10^{-8}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 2

VARIABLE INTERVAL

|  | WIDE ANGLE END | INTERMEDIATE FOCAL LENGTH | TELEPHOTO END |
|---|---|---|---|
| f | 5.05 | 16.20 | 51.98 |
| DA | 0.640 | 10.784 | 17.944 |
| DB | 8.774 | 1.566 | 0.800 |
| DC | 6.215 | 4.903 | 0.950 |
| DD | 4.006 | 6.046 | 15.200 |

In this case, the focal length fl of the first lens group, the focal length fw of the entire system of the zoom lens at the wide angle end, and the focal length ft of the entire system at the telephoto end are as follows:

fl=32.98 fw=5.05 ft=51.98

The values of the conditions (1-1) to (1-5) are as follows:

nd11=2.00069   (1-1)

vd11=25.46   (1-2)

θgF=0.6135   (1-3)

fl/fw=6.53   (1-4)

ft/fw=10.29   (1-5)

Accordingly, the conditions (1-1) to (1-5) are satisfied.

FIGS. 2, 3 and 4 show aberration curves of spherical aberration, astigmatism, distortion, and coma aberration at the wide angle end, the intermediate focal length position, and the telephoto end, respectively, in the zoom lens according to the example 1. In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

EXAMPLE 2

Figure 5B:
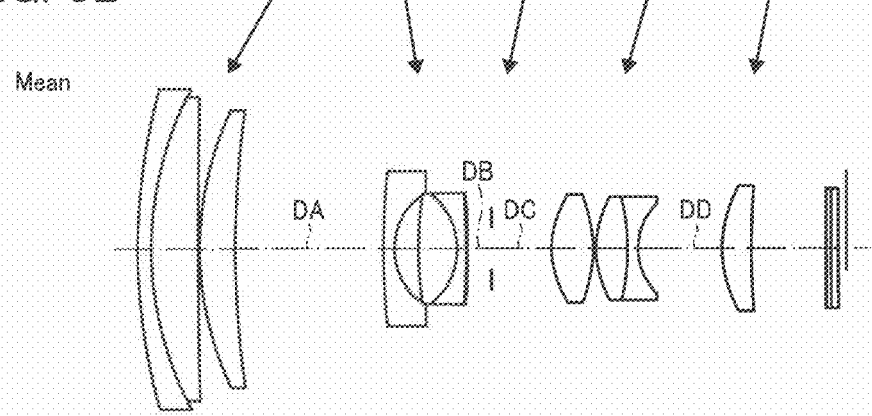
FIG. 5B is a schematic sectional view of the optical system of the zoom lens according to the example 2 along the optical axis at a predetermined intermediate focal length position.
Figure 5C:
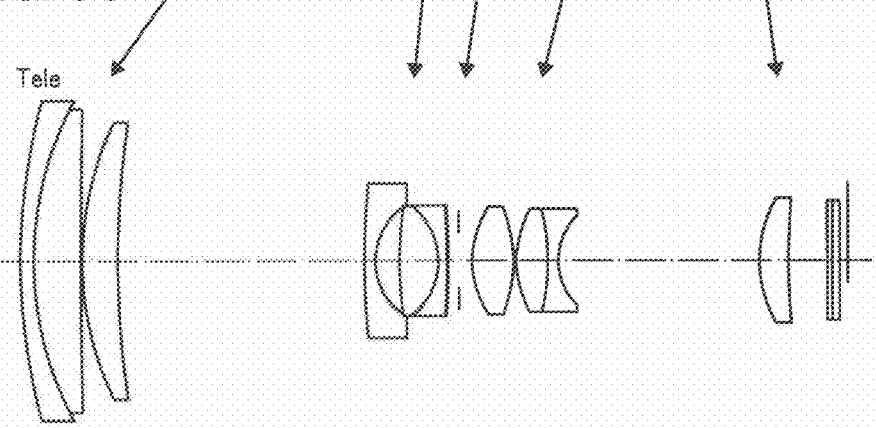
FIG. 5C is a schematic sectional view of the optical system of the zoom lens according to the example 2 along the optical axis at a telephoto end.

FIG. 5A to 5C are schematic views of lens configurations of the zoom lens according to the example 2 of the first embodiment of the present invention on a zooming trajectory when zooming from a wide angle end to a telephoto end via a predetermined intermediate focal length position, that is, FIG. 5A is a schematic sectional view of the zoom lens at the wide angle end, FIG. 5B is a schematic sectional view of the zoom lens at the predetermined intermediate focal length position, and FIG. 5C is a schematic sectional view of the zoom lens at the telephoto end. A left side of FIGS. 5A to 5C is an object side of the zoom lens.

The zoom lens shown in FIG. 5A to 5C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 5A to 5C, surface numbers of each optical surface are shown. In addition, the same reference numbers in FIGS. 5A to 5C are also independently used in each example for sake of simplicity and therefore the configuration indicated by the same reference number is not always the same configuration.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is an aspheric lens having an aspheric surface formed by applying a resin layer to an image side surface thereof, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface at the object side, the eighth lens E8 provided with a double-convex positive lens having a stronger convex surface at the object side, and the ninth lens E9 provided with a double-concave negative lens having a stronger concave surface at the image side, in order from the object side. The eighth and ninth lenses E8, E9 are closely stuck and cemented together with each other to form a cemented lens formed by the two lenses.

The fourth lens group G4 includes the tenth lens E10 provided with a positive meniscus lens having an aspheric surface at the object side, which is a convex surface directed toward the object side.

That is, in this example 2, substantially, the configuration is almost same as that of the above described example 1.

In this case, as shown in FIGS. 5A to 5C, the first and third lens groups G1 and G3 are monotonically moved from the image side to the object side, the second lens group G2 is moved along a trajectory curve which is convex toward the image side, and the fourth lens group G4 is moved along a trajectory curve which is convex toward the object side when changing the magnification of the zoom lens from the wide angle end to the telephoto end.

In this example 2, the focal length f of an entire optical system of the zoom lens, the F number F, and the half field angle ω are changed within a range of f=5.05 to 51.98, F=3.61 to 6.15, and ω=39.3 to 4.54, respectively. An optical property of each optical element is as follows:

TABLE 3

OPTICAL PROPERTIES
f = 5.05~51.98, F = 3.61~6.15, ω = 39.3~4.54

| Surface No. | R | D | nd | vd | GLASS TYPE | | NOTE | |
|---|---|---|---|---|---|---|---|---|
| 1 | 44.8899 | 1.035 | | | | | | G1 |
| | | | 2.00069 | 25.46 | HOYA | TAFD40 | E1 | |
| 2 | 24.5919 | 3.59405 | | | | | | |
| | | | 1.603 | 65.44 | OHARA | SPHM53 | E2 | |
| 3 | 461.586 | 0.1 | | | | | | |
| 4 | 23.051 | 2.86197 | | | | | | |
| | | | 1.7725 | 49.6 | OHARA | SLAH66 | E3 | |
| 5 | 84.5224 | Variable DA | | | | | | |
| 6* | 80.4367 | 0.04 | 1.5202 | 52.02 | | | RESIN LAYER | E4 | G2 |
| 7 | 56.5703 | 0.8 | | | | | | |
| | | | 2.0033 | 28.27 | OHARA | SLAH79 | | |
| 8 | 4.77167 | 1.86212 | | | | | | |
| 9 | 31.9527 | 2.98759 | | | | | | |
| | | | 1.84666 | 23.78 | OHARA | STIH53 | E5 | |
| 10 | −5.1414 | 0.7 | | | | | E6 | |
| | | | 1.883 | 40.76 | OHARA | SLAH58 | | |
| 11 | −42.81 | 0.04 | | | | | | |
| 12* | 286.864 | Variable DB | 1.5202 | 52.02 | | | RESIN LAYER | |
| 13 | ∞ | Variable DC | | | | | Aperture stop | AD |
| 14* | 6.24933 | 3.2304 | | | | | | G3 |
| | | | 1.5067 | 70.5 | SUMITA | KPG325 | E7 | |
| 15* | −8.4384 | 0.14996 | | | | | | |
| 16 | 7.54621 | 2.44644 | | | | | | |
| | | | 1.5924 | 68.3 | SUMITA | KGFK68 | E8 | |

TABLE 3-continued

OPTICAL PROPERTIES
f = 5.05~51.98, F = 3.61~6.15, ω = 39.3~4.54

| Surface No. | R | D | nd | vd | GLASS TYPE | | NOTE | |
|---|---|---|---|---|---|---|---|---|
| 17 | −15.337 | 0.80163 | | | | | | |
| | | | 1.90366 | 31.32 | HOYA | TAFD25 | E9 | |
| 18 | 4.78897 | Variable DD | | | | | | |
| 19* | 9.37762 | 2.24041 | | | | | | |
| | | | 1.5067 | 70.5 | SUMITA | KPG325 | E10 | G4 |
| 20 | 72.5489 | — | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | — | | | | | | |

In Table 3, each of 6th, 12th, 14th, 15th and 19th optical surfaces is aspheric and indicated by asterisk "*", and the parameters in the equation (1-6) for each aspheric surface are as follows.

Aspheric Surface Parameters:
6th Surface $K=0$ $A_4=1.70437 \times 10^{-4}$ $A_6=-8.89500 \times 10^{-6}$ $A_8=5.88584 \times 10^{-7}$ $A_{10}=-2.56139 \times 10^{-8}$ $A_{12}=5.44131 \times 10^{-10}$ $A_{14}=-4.57914 \times 10^{-12}$ 12th Surface $K=0$ $A_4=-7.78347 \times 10^{-4}$ $A_6=3.93144 \times 10^{-8}$ $A_8=-1.61339 \times 10^{-8}$ $A_{10}=7.50104 \times 10^{-8}$ 14th Surface $K=0$ $A_4=-8.29907 \times 10^{-4}$ $A_6=1.14027 \times 10^{-8}$ $A_8=-9.96991 \times 10^{-7}$ $A_{10}=1.65803 \times 10^{-8}$ $A_{12}=1.14513 \times 10^{-11}$ 15th Surface $K=0$ $A_4=4.54675 \times 10^{-4}$ $A_6=8.97554 \times 10^{-8}$ $A_8=-2.66344 \times 10^{-7}$ 19th Surface $K=0$ $A_4=-5.31816 \times 10^{-5}$ $A_6=3.63784 \times 10^{-6}$ $A_8=-6.17397 \times 10^{-8}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 4

| | VARIABLE INTERVAL | | |
|---|---|---|---|
| | WIDE ANGLE END | INTERMEDIATE FOCAL LENGTH | TELEPHOTO END |
| f | 5.05 | 16.20 | 51.98 |
| DA | 0.640 | 11.382 | 18.851 |
| DB | 8.807 | 1.806 | 0.800 |
| DC | 5.892 | 4.548 | 0.950 |
| DD | 4.379 | 6.400 | 15.350 |

In this case, the focal length fl of the first lens group, the focal length fw of the entire system of the zoom lens at the wide angle end, and the focal length ft of the entire system at the telephoto end are as follows:

fl=34.1 fw=5.05 ft=51.98

The values of the conditions (1-1) to (1-5) are as follows:

nd11=2.00069   (1-1)

vd11=25.46   (1-2)

θgF=0.6135   (1-3)

fl/fw=6.75   (1-4)

ft/fw=10.29   (1-5)

Accordingly, the conditions (1-1) to (1-5) are satisfied.

Figure 6:
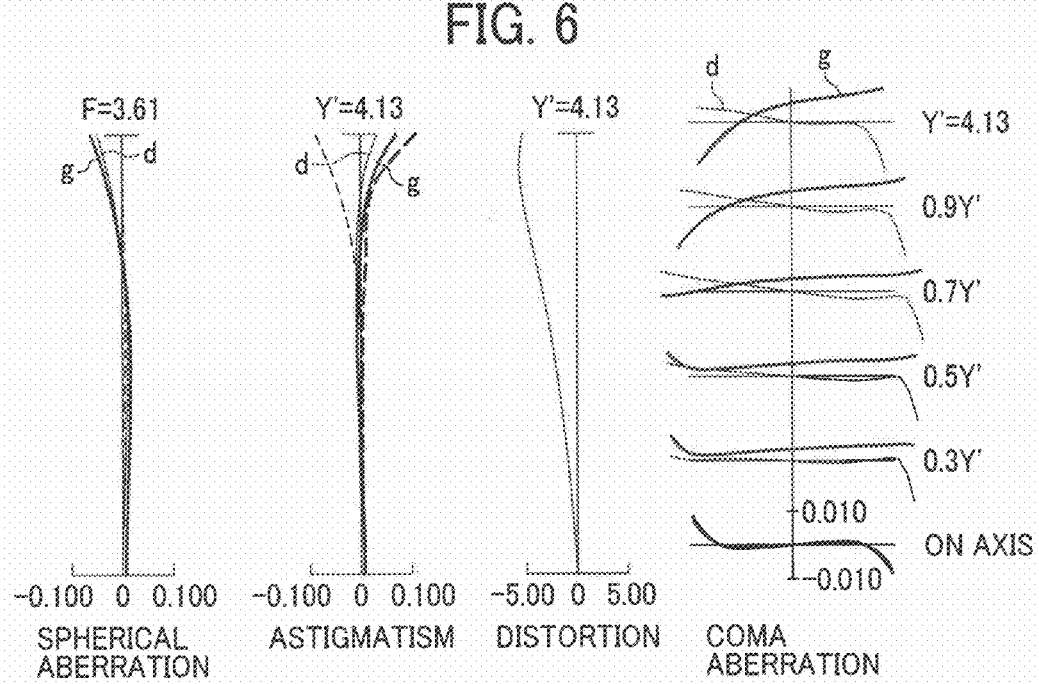
FIG. 6 is a view illustrating aberration curves of spherical aberration, astigmatism, distortion, and coma aberration in the zoom lens according to the example 2 at the wide angle end.
Figure 7:
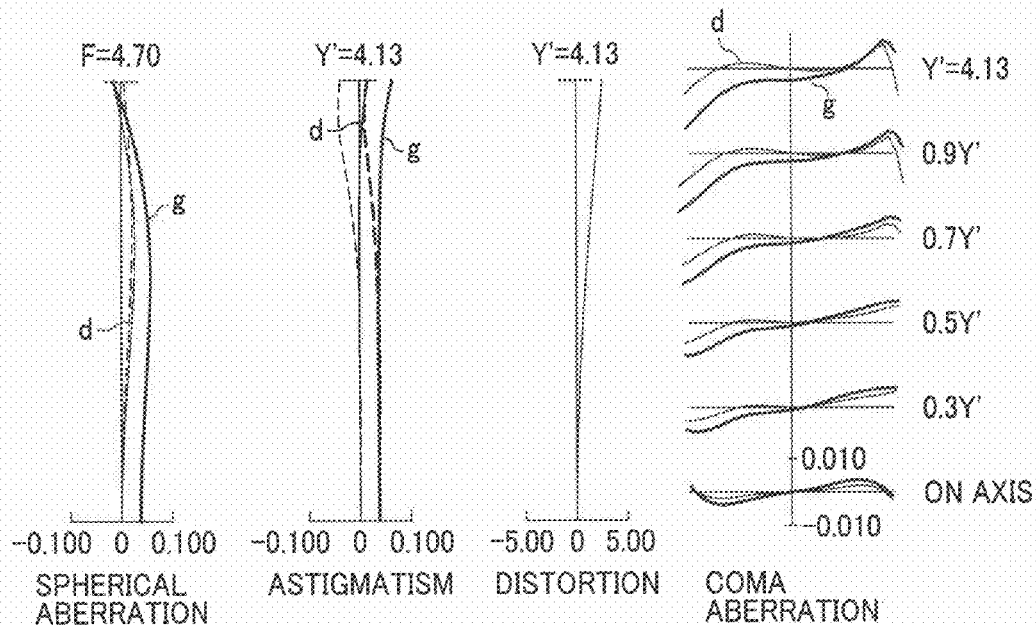
FIG. 7 is a view illustrating aberration curves of spherical aberration, astigmatism, distortion, and coma aberration in the zoom lens according to the example 2 at the intermediate focal length position.

FIGS. 6, 7 and 8 show aberration curves of spherical aberration, astigmatism, distortion, and coma aberration at the wide angle end, the intermediate focal length position, and the telephoto end, respectively, in the zoom lens according to the example 2.

EXAMPLE 3

FIG. 9A to 9C are schematic views of lens configurations of the zoom lens according to the example 3 of the first embodiment of the present invention on a zooming trajectory when zooming from a wide angle end to a telephoto end via a predetermined intermediate focal length position, that is, FIG. 9A is a schematic sectional view of the zoom lens at the wide angle end, FIG. 9B is a schematic sectional view of the zoom lens at the predetermined intermediate focal length position, and FIG. 9C is a schematic sectional view of the zoom lens at the telephoto end. A left side of FIGS. 9A to 9C is an object side of the zoom lens.

The zoom lens shown in FIG. 9A to 9C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 9A to 9C, surface numbers of each optical surface are shown. In addition, the same reference numbers in FIGS. 9A to 9C are also independently used in each example for sake of simplicity and therefore the configuration indicated by the same reference number is not always the same configuration.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer to an image side surface thereof, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the object side, and the ninth lens E9 provided with a double-concave negative lens having a stronger concave surface directed toward the image side, in order from the object side. The eighth and ninth lenses E8, E9 are closely stuck and cemented together with each other to form a cemented lens formed by the two lenses.

The fourth lens group G4 includes the tenth lens E10 provided with a positive meniscus lens having an aspheric surface at the object side, which is a convex surface directed toward the object side.

That is, in this example 3, substantially, the configuration is almost same as that of the above described examples 1 and 2. In this case, as shown in FIGS. 9A to 9C, the first and third lens groups G1 and G3 are monotonically moved from the image side to the object side, the second lens group G2 is monotonically moved from the object side to the image side, and the fourth lens group G4 is moved along a trajectory curve which is convex toward the object side when changing the magnification of the zoom lens from the wide angle end to the telephoto end.

In this example 3, the focal length f of an entire optical system of the zoom lens, the F number F, and the half field angle ω are changed within a range of f=5.05 to 51.97, F=3.58 to 5.72, and ω=39.3 to 4.54, respectively. An optical property of each optical element is as follows:

TABLE 5

OPTICAL PROPERTIES
f = 5.05~51.97, F = 3.58~5.72, ω = 39.3~4.54

| Surface No. | R | D | nd | vd | GLASS TYPE | | NOTE | |
|---|---|---|---|---|---|---|---|---|
| 1 | 44.9864 | 1.035 | | | | | | G1 |
| | | | 2.00069 | 25.46 | HOYA | TAFD40 | E1 | |
| 2 | 24.4589 | 3.39853 | | | | | | |
| | | | 1.603 | 65.44 | OHARA | SPHM53 | E2 | |
| 3 | 715.125 | 0.1 | | | | | | |
| 4 | 22.7794 | 2.72948 | | | | | | |
| | | | 1.7725 | 49.6 | OHARA | SLAH66 | E3 | |
| 5 | 83.5985 | Variable DA | | | | | | |

TABLE 5-continued

OPTICAL PROPERTIES
f = 5.05~51.97, F = 3.58~5.72, ω = 39.3~4.54

| Surface No. | R | D | nd | vd | GLASS TYPE | | NOTE | |
|---|---|---|---|---|---|---|---|---|
| 6* | 194.643 | 0.04 | 1.5202 | 52.02 | | | RESIN LAYER | E4 G2 |
| 7 | 83.2685 | 0.8 | | | | | | |
| | | | 2.0033 | 28.27 | OHARA | SLAH79 | | |
| 8 | 5.1300 | 2.09294 | | | | | | |
| 9 | 42.678 | 3.16559 | | | | | | |
| | | | 1.84666 | 23.78 | OHARA | STIH53 | | E5 |
| 10 | −5.5135 | 0.7 | | | | | | E6 |
| | | | 1.883 | 40.76 | OHARA | SLAH58 | | |
| 11 | −36.246 | 0.04 | | | | | | |
| 12* | −230.03 | Variable DB | 1.5202 | 52.02 | | | RESIN LAYER | |
| 13 | ∞ | Variable DC | | | | | Aperture stop | AD |
| 14* | 6.5615 | 23.59273 | | | | | | G3 |
| | | | 1.48749 | 70.24 | OHARA | SFSL5 | | E7 |
| 15* | −9.0874 | 0.28841 | | | | | | |
| 16 | 7.6035 | 2.76103 | | | | | | |
| | | | 1.5924 | 68.3 | SUMITA | KGFK68 | | E8 |
| 17 | −13.068 | 0.8 | | | | | | |
| | | | 1.90366 | 31.32 | HOYA | TAFD25 | | E9 |
| 18 | 5.01417 | Variable DD | | | | | | |
| 19* | 8.76636 | 2.33407 | | | | | | |
| | | | 1.48749 | 70.24 | OHARA | SFSL5 | | E10 G4 |
| 20 | 60.3211 | — | | | | | | |
| 21 | ∞ | 0.3 | | | | | | FM |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | — | | | | | | |

In Table 5, each of 6th, 12th, 14th, 15th and 19th optical surfaces is aspheric and indicated by asterisk "*", and the parameters in the equation (1-6) for each aspheric surface are as follows.

Aspheric Surface Parameters:

6th Surface $K=0$ $A_4=2.25844\times10^{-4}$ $A_6=-1.12455\times10^{-5}$ $A_8=6.76369\times10^{-7}$ $A_{10}=-2.52638\times10^{-8}$ $A_{12}=4.66507\times10^{-10}$ $A_{14}=-3.41911\times10^{-12}$ 12th Surface $K=0$ $A_4=-5.67227\times10^{-4}$ $A_5=-3.24620\times10^{-6}$ $A_8=-2.94393\times10^{-7}$ $A_{10}=-1.76132\times10^{-8}$ 14th Surface $K=0$ $A_4=-6.53010\times10^{-4}$ $A_6=6.85627\times10^{-6}$ $A_8=-4.27084\times10^{-7}$ $A_{10}=2.66460\times10^{-8}$ $A_{12}=2.95049\times10^{-31}$ 15th Surface $K=0$ $A_4=3.59196\times10^{-4}$ $A_5=7.31481\times10^{-6}$ $A_8=-1.15774\times10^{-7}$ 19th Surface $K=0$ $A_4=-7.94840\times10^{5}$ $A_6=4.43016\times10^{-6}$ $A_8=-1.31828\times10^{-7}$ $A_{10}=1.68587\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 6

VARIABLE INTERVAL

|    | WIDE ANGLE END | INTERMEDIATE FOCAL LENGTH | TELEPHOTO END |
|----|----------------|---------------------------|---------------|
| f  | 5.05           | 16.20                     | 51.97         |
| DA | 0.640          | 10.248                    | 18.396        |
| DB | 9.698          | 1.860                     | 0.800         |
| DC | 7.052          | 5.099                     | 0.950         |
| DD | 4.237          | 7.204                     | 14.776        |

In this case, the focal length fl of the first lens group, the focal length fw of the entire system of the zoom lens at the wide angle end, and the focal length ft of the entire system at the telephoto end are as follows:

fl=33.39 fw=5.05 ft=51.97

The values of the conditions (1-1) to (1-5) are as follows:

$nd11=2.00069$     (1-1)

$vd11=25.46$     (1-2)

$\theta gF=0.6135$     (1-3)

$fl/fw=6.61$     (1-4)

$ft/fw=10.29$     (1-5)

Accordingly, the conditions (1-1) to (1-5) are satisfied.

Figure 12:
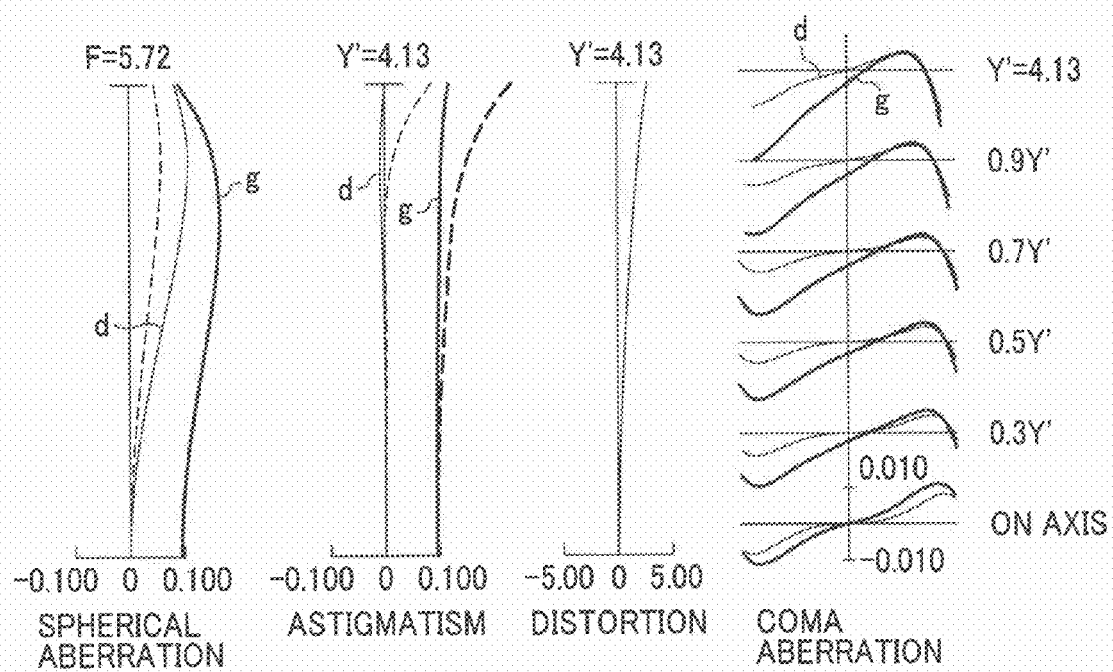
FIG. 12 is a view illustrating aberration curves of spherical aberration, astigmatism, distortion, and coma aberration in the zoom lens according to the example 3 at the telephoto end.

FIGS. 10, 11 and 12 show aberration curves of spherical aberration, astigmatism, distortion, and coma aberration at the wide angle end, the intermediate focal length position, and the telephoto end, respectively, in the zoom lens according to the example 3.

EXAMPLE 4

FIG. 13A to 13C are schematic views of lens configurations of the zoom lens according to the example 4 of the first embodiment of the present invention on a zooming trajectory when zooming from a wide angle end to a telephoto end via a predetermined intermediate focal length position, that is, FIG. 13A is a schematic sectional view of the zoom lens at the wide angle end, FIG. 13B is a schematic sectional view of the zoom lens at the predetermined intermediate focal length position, and FIG. 13C is a schematic sectional view of the zoom lens at the telephoto end. A left side of FIGS. 13A to 13C is an object side of the zoom lens.

The zoom lens shown in FIG. 13A to 13C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 13A to 13C, surface numbers of each optical surface are shown. In addition, the same reference numbers in FIGS. 13A to 13C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the object side, and the ninth lens E9 provided with a double-concave negative lens having a stronger concave surface directed toward the image side, in order from the object side. The eighth and ninth lenses E8, E9 are closely stuck and cemented together with each other to form a cemented lens formed by the two lenses.

The fourth lens group G4 includes the tenth lens E10 provided with a positive meniscus lens having a convex surface directed toward the object side, which is an aspheric surface at the object side.

That is, in this example 4, substantially, the configuration is almost same as that of the above described example 1, except for that a resin layer is not applied to an image side surface (surface number 11) of the sixth lens, that is, to a most image side surface of the second lens group G2. In this case, as shown in FIGS. 13A to 13C, the first and third lens groups G1 and G3 are monotonically moved from the image side to the object side, the second lens group G2 is monotonically moved from the object side to the image side, and the fourth lens group G4 is moved along a trajectory curve which is convex toward the object side when changing the magnification of the zoom lens from the wide angle end to the telephoto end.

In this example 4, the focal length f of an entire optical system of the zoom lens, the F number F, and the half field angle ω are changed within a range of f=5.06 to 52.00, F=3.67 to 5.88, and ω=39.3 to 4.54, respectively. An optical property of each optical element is as follows:

TABLE 7

OPTICAL PROPERTIES
f = 5.06~52.00, F = 3.67~5.88, ω = 39.3~4.54

| Surface No. | R | D | nd | vd | GLASS TYPE | | NOTE | |
|---|---|---|---|---|---|---|---|---|
| 1 | 39.3312 | 1.03 | | | | | | G1 |
| | | | 2.00069 | 25.46 | HOYA | TAFD40 | E1 | |
| 2 | 24.3582 | 3.14622 | | | | | | |
| | | | 1.603 | 65.44 | OHARA | SPHM53 | E2 | |
| 3 | 358.516 | 0.1 | | | | | | |
| 4 | 22.1181 | 2.47274 | | | | | | |
| | | | 1.72916 | 54.68 | OHARA | SLAL18 | E3 | |
| 5 | 66.837 | Variable DA | | | | | | |
| 6* | 181.937 | 0.04 | 1.5202 | 52.02 | | | RESIN LAYER E4 | G2 |
| 7 | 58.5901 | 0.8 | | | | | | |
| | | | 2.00069 | 25.46 | HOYA | TAFD40 | | |
| 8 | 5.04203 | 2.35583 | | | | | | |
| 9 | 73.4068 | 3.4852 | | | | | | |
| | | | 1.84666 | 23.78 | HOYA | FDS90 | E5 | |
| 10 | -5.1686 | 0.6 | | | | | | |
| | | | 1.8208 | 42.71 | HOYA | MTAFD51 | E6 | |
| 11* | -117.69 | Variable DB | | | | | | |
| 12 | ∞ | Variable DC | | | | | Aperture stop | AD |
| 13* | 6.60113 | 4.01405 | | | | | | G3 |
| | | | 1.48749 | 70.44 | HOYA | FC5 | E7 | |
| 14* | -9.2793 | 0.435 | | | | | | |
| 15 | 8.35798 | 2.765 | | | | | | |
| | | | 1.59319 | 67.9 | HIKARI | EPSKH1 | E8 | |
| 16 | -8.9653 | 0.80102 | | | | | | |
| | | | 1.90366 | 31.32 | HOYA | TAFD25 | E9 | |
| 17 | 5.88563 | Variable DD | | | | | | |
| 18* | 9.70656 | 2.07 | | | | | | |
| | | | 1.52528 | 56.2 | | PLASTIC | E10 | G4 |
| 19 | 56.3632 | — | | | | | | |
| 20 | ∞ | 0.3 | | | | | | FM |
| | | | 1.5168 | 64.2 | | | | |
| 21 | ∞ | 0.1 | | | | | | |
| 22 | ∞ | 0.5 | | | | | | |
| | | | 1.5 | 64 | | | | |
| 23 | ∞ | — | | | | | | |

In Table 7, each of 6th, 11th, 13th, 14th and 18th optical surfaces is aspheric and indicated by asterisk "*", and the parameters in the equation (1-6) for each aspheric surface are as follows.
Aspheric Surface Parameters:
6th Surface $K=0$ $A_4=1.87731\times10^{-4}$ $A_6=-8.48011\times10^{-6}$ $A_8=5.31966\times10^{-7}$ $A_{10}=-1.96752\times10^{-8}$ $A_{12}=3.60944\times10^{-10}$ $A_{14}=-2.61168\times10^{-12}$ 11th Surface $K=0$ $A_4=-3.09393\times10^{-4}$ $A_6=-2.60609\times10^{-6}$ $A_8=9.00781\times10^{-8}$ $A_{10}=-2.11546\times10^{-8}$ $A_{12}=5.00134\times10^{-12}$ 13th Surface $K=0$ $A_4=-5.34737\times10^{-4}$ $A_6=1.25801\times10^{-5}$ $A_8=-6.90959\times10^{-7}$ $A_{10}=3.54100\times10^{-8}$ $A_{12}=-3.42791\times10^{-10}$ 14th Surface $K=0$ $A_4=4.15136\times10^{-4}$ $A_6=1.12480\times10^{-5}$ $A_8=-1.24918\times10^{-7}$ $A_{10}=2.42397\times10^{-8}$ 18th Surface $K=0$ $A_4=-5.80774\times10^{-5}$ $A_8=4.48970\times10^{-6}$ $A_8=-1.43440\times10^{-7}$ $A_{10}=1.99458\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 8

VARIABLE INTERVAL

| | WIDE ANGLE END | INTERMEDIATE FOCAL LENGTH | TELEPHOTO END |
|---|---|---|---|
| f | 5.06 | 16.22 | 52.00 |
| DA | 0.640 | 10.755 | 18.680 |
| DB | 10.098 | 1.224 | 0.800 |
| DC | 6.605 | 6.012 | 0.950 |
| DD | 3.924 | 7.359 | 14.724 |

In this case, the focal length fl of the first lens group, the focal length fw of the entire system of the zoom lens at the wide angle end, and the focal length ft of the entire system at the telephoto end are as follows:

$fl=33.71$ $fw=5.06$ $ft=52$

The values of the conditions (1-1) to (1-5) are as follows:

$nd11=2.00069$ (1-1)

$vd11=25.46$ (1-2)

$\theta gF=0.6135$ (1-3)

$fl/fw=6.66$ (1-4)

$ft/fw=10.28$ (1-5)

Accordingly, the conditions (1-1) to (1-5) are satisfied.

FIGS. 14, 15 and 16 show aberration curves of spherical aberration, astigmatism, distortion, and coma aberration at the wide angle end, the intermediate focal length position, and the telephoto end, respectively, in the zoom lens according to the example 4.

EXAMPLE 5

FIG. 17A to 17C are schematic views of lens configurations of the zoom lens according to the example 5 of the first embodiment of the present invention on a zooming trajectory when zooming from a wide angle end to a telephoto end via a predetermined intermediate focal length position, that is, FIG. 17A is a schematic sectional view of the zoom lens at the wide angle end, FIG. 17B is a schematic sectional view of the zoom lens at the predetermined intermediate focal length position, and FIG. 17C is a schematic sectional view of the zoom lens at the telephoto end. A left side of FIGS. 17A to 17C is an object side of the zoom lens.

The zoom lens shown in FIG. 17A to 17C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 17A to 17C, surface numbers of each optical surface are shown. In addition, the same reference numbers in FIGS. 17A to 17C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a double-convex positive lens having a stronger convex surface directed toward the object side of the zoom lens, and the third lens E3 provided with a positive meniscus lens having a convex surface toward the object side and an aspheric surface at the image side, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the image side, and the ninth lens E9 provided with a double-concave negative lens having a stronger concave surface directed toward the image side, in order from the object side.

The eighth and ninth lenses E8, E9 are closely stuck and cemented together with each other to form a cemented lens formed by the two lenses.

angle ω are changed within a range of f=5.10 to 52.51, F=3.66 to 6.08, and ω=39.0 to 4.50, respectively. An optical property of each optical element is as follows:

TABLE 9

OPTICAL PROPERTIES
f = 5.10~52.51, F = 3.66~6.08, ω = 39.0~4.50

| Surface No. | R | D | nd | vd | GLASS TYPE | | NOTE | |
|---|---|---|---|---|---|---|---|---|
| 1 | 84.2678 | 1.02 | | | | | | G1 |
| | | | 2.00069 | 25.46 | HOYA | TAFD40 | E1 | |
| 2 | 37.1485 | 2.73849 | | | | | | |
| | | | 1.603 | 65.44 | OHARA | SPHM53 | E2 | |
| 3 | −382.3 | 0.1 | | | | | | |
| 4 | 21.2932 | 3.55069 | | | | | | |
| | | | 1.5924 | 68.3 | SUMITA | KGFK68 | E3 | |
| 5* | 10944.4 | Variable DA | | | | | | |
| 6* | 231.738 | 0.04 | 1.5202 | 52.02 | | | RESIN LAYER | E4 | G2 |
| 7 | 122.537 | 0.8 | | | | | | |
| | | | 1.883 | 40.76 | OHARA | SLAH58 | | |
| 8 | 4.65642 | 1.89752 | | | | | | |
| 9 | 41.7643 | 2.52947 | | | | | | |
| | | | 1.75211 | 25.05 | HOYA | FF8 | E5 | |
| 10 | −5.9515 | 0.7 | | | | | E6 | |
| | | | 1.883 | 40.76 | OHARA | SLAH58 | | |
| 11 | −24.167 | 0.04 | | | | | | |
| 12* | −70.781 | Variable DB | 1.5202 | 52.02 | | | RESIN LAYER | |
| 13 | ∞ | Variable DC | | | | | Aperture stop | AD |
| 14* | 6.4109 | 3.09995 | | | | | | G3 |
| | | | 1.5067 | 70.5 | SUMITA | KPG325 | E7 | |
| 15* | −9.311 | 0.1 | | | | | | |
| 16 | 10.4979 | 2.6769 | | | | | | |
| | | | 1.5924 | 68.3 | SUMITA | KGFK68 | E8 | |
| 17 | −8.3536 | 0.8 | | | | | | |
| | | | 1.72047 | 34.71 | OHARA | SNBH8 | E9 | |
| 18 | 4.97379 | Variable DD | | | | | | |
| 19* | 8.92833 | 2.20315 | | | | | | |
| | | | 1.5067 | 70.5 | SUMITA | KPG325 | E10 | G4 |
| 20 | 40.9714 | — | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | — | | | | | | |

The fourth lens group G4 includes the tenth lens E10 provided with a positive meniscus lens having a convex surface directed toward the object side, which is an aspheric surface at the object side.

That is, in this example 5, substantially, the configuration is almost same as that of the above described example 1, except for that the second lens E2 of the first lens group G1 is the double-convex lens having the strong convex surface at the object side, the most image side surface of the first lens group, that is, the image side surface (surface number 5) of the third lens E3 is aspheric, and the second positive lens of the third lens group G3, that is, the eighth lens E8 is the double convex lens having the stronger convex surface directed toward the image side. In this case, as shown in FIGS. 17A to 17C, the first and third lens groups G1 and G3 are monotonically moved from the image side to the object side, the second lens group G2 is monotonically moved from the object side to the image side, and the fourth lens group G4 is moved along a trajectory curve which is convex toward the object side when changing the magnification of the zoom lens from the wide angle end to the telephoto end.

In this example 5, the focal length f of an entire optical system of the zoom lens, the F number F, and the half field In Table 9, each of 5th, 6th, 12th, 14th, 15th and 19th optical surfaces is aspheric and indicated by asterisk "*", and the parameters in the equation (1-6) for each aspheric surface are as follows.

Aspheric Surface Parameters:
5th Surface $K=0$ $A_4=6.74244\times10^{-6}$ $A_6=1.71567\times10^{-8}$ $A_8=-5.77985\times10^{-10}$ $A_{10}=6.82490\times10^{-12}$ $A_{12}=-3.92899\times10^{-14}$ $A_{14}=8.90124\times10^{-17}$ 6th Surface $K=0$ $A_4=2.82064\times10^{-4}$ $A_6 = -1.64412 \times 10^{-6}$ $A_8 = 7.67008 \times 10^{-7}$ $A_{10} = -2.50553 \times 10^{-08}$ $A_{12} = 4.03304 \times 10^{-16}$ $A_{14} = -2.59031 \times 10^{-12}$ 12th Surface $K = 0$ $A_4 = -7.3045 \times 10^{-4}$ $A_6 = -1.28510 \times 10^{-5}$ $A_8 = -1.51108 \times 10^{-8}$ $A_{10} = -4.94285 \times 10^{-8}$ 14th Surface $K = 0$ $A_4 = -7.37337 \times 10^{-4}$ $A_6 = 6.09853 \times 10^{-6}$ $A_8 = -3.31772 \times 10^{-7}$ $A_{10} = 1.12573 \times 10^{-8}$ 15th Surface $K = 0$ $A_4 = 3.65974 \times 10^{-4}$ $A_6 = 7.04803 \times 10^{-6}$ $A_8 = -8.52137 \times 10^{-8}$ 19th Surface $K = 0$ $A_4 = -7.06590 \times 10^{-5}$ $A_6 = 2.65324 \times 10^{-5}$ $A_8 = -3.92249 \times 10^{-8}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 10

VARIABLE INTERVAL

|    | WIDE ANGLE END | INTERMEDIATE FOCAL LENGTH | TELEPHOTO END |
|----|----|----|----|
| f  | 5.099 | 16.36 | 52.51 |
| DA | 0.64 | 10.89252 | 18.94725 |
| DB | 9 | 1.69361 | 0.8 |
| DC | 6.65969 | 5.15765 | 0.95 |
| DD | 5.48522 | 8.28286 | 14.80659 |

In this case, the focal length fl of the first lens group, the focal length fw of the entire system of the zoom lens at the wide angle end, and the focal length ft of the entire system at the telephoto end are as follows:

fl=32.97 fw=5.1 ft=52.51

The values of the conditions (1-1) to (1-5) are as follows:

nd11=2.00069   (1-1)

vd11=25.46   (1-2)

θgF=0.6135   (1-3)

$fl/fw$=6.46   (1-4)

$ft/fw$=10.3   (1-5)

Accordingly, the conditions (1-1) to (1-5) are satisfied.

FIGS. 18, 19 and 20 show aberration curves of spherical aberration, astigmatism, distortion, and coma aberration at the wide angle end, the intermediate focal length position, and the telephoto end, respectively, in the zoom lens according to the example 5.

EXAMPLE 6

Figure 21A:
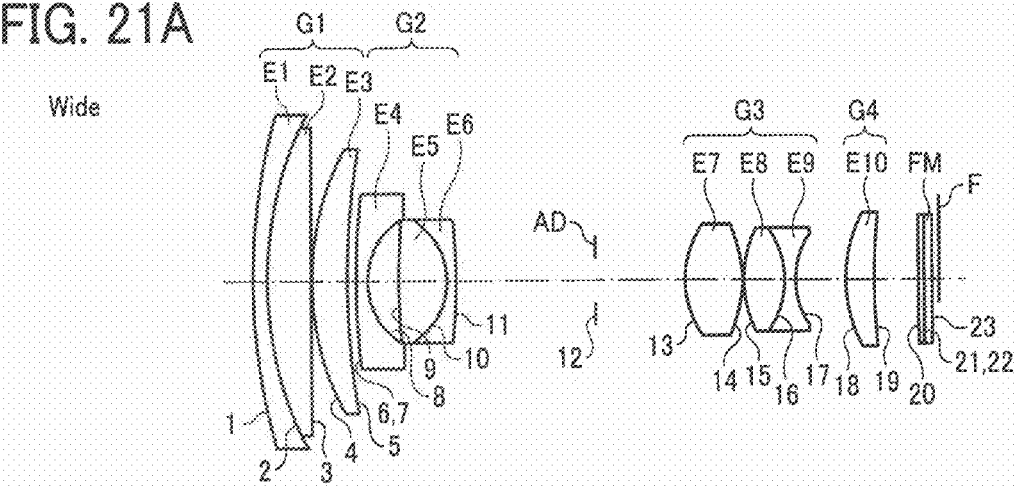
FIG. 21A is a schematic sectional view of an optical system of a zoom lens according to an example 6 along an optical axis at a wide angle end.
Figure 21B:
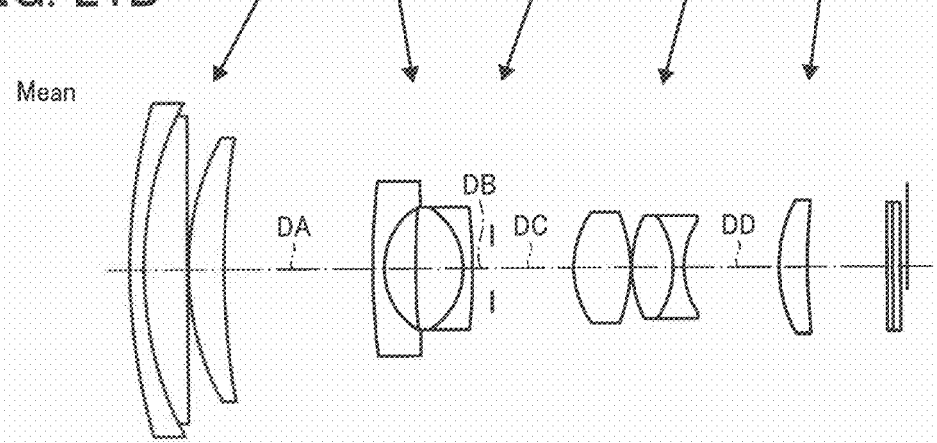
FIG. 21B is a schematic sectional view of the optical system of the zoom lens according to the example 6 along the optical axis at a predetermined intermediate focal length position.
Figure 21C:
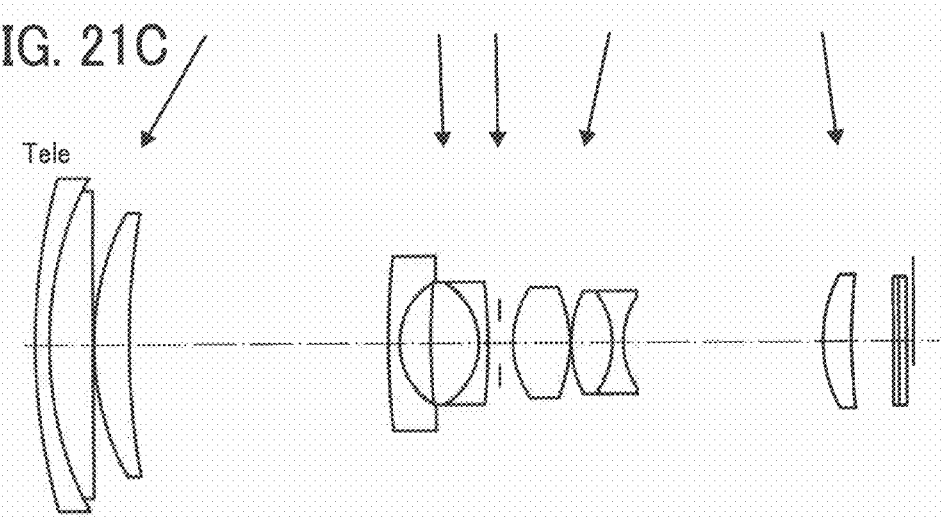
FIG. 21C is a schematic sectional view of the optical system of the zoom lens according to the example 6 along the optical axis at a telephoto end.

FIG. 21A to 21C are schematic views of lens configurations of the zoom lens according to the example 6 of the first embodiment of the present invention on a zooming trajectory when zooming from a wide angle end to a telephoto end via a predetermined intermediate focal length position, that is, FIG. 21A is a schematic sectional view of the zoom lens at the wide angle end, FIG. 21B is a schematic sectional view of the zoom lens at the predetermined intermediate focal length position, and FIG. 21C is a schematic sectional view of the zoom lens at the telephoto end. A left side of FIGS. 21A to 21C is an object side of the zoom lens.

The zoom lens shown in FIG. 21A to 21C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 21A to 21C, surface numbers of each optical surface are shown. In addition, the same reference numbers in FIGS. 21A to 21C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a plane-convex positive lens having a convex surface directed toward the object side of the zoom lens, and the third lens E3 provided with a positive meniscus lens having a convex surface toward the object side, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is an aspheric lens having an aspheric surface at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the object side, and the ninth lens E9 provided with a double-concave negative lens having curvatures at both of the object side and the image side, which are substantially equal to each other, in order from the object side. The eighth and ninth lenses E8, E9 are closely stuck and cemented together with each other to form a cemented lens formed by the two lenses.

The fourth lens group G4 includes the tenth lens E10 provided with a positive meniscus lens having a convex surface directed toward the object side and an aspheric surface at the object side.

That is, in this example 6, substantially, the configuration is almost same as that of the above described example 1, except for that a resin layer is not applied to the most image side surface of the second lens group G2, that is, the image side surface (surface number 11) of the sixth lens E6, the second lens E2 of the first lens group G1 is the plane-convex lens having a convex lens directed toward the object side, the second lens of the third lens group G3, that is the eighth lens E8 is the double convex lens having the stronger convex lens directed toward the image side, and the third lens of the third lens group G3, that is, the ninth lens E9 is the double concave lens having curvature radiuses of both surfaces which are substantially equal to each other. In this case, as shown in FIGS. 21A to 21C, the first and third lens groups G1 and G3 are monotonically moved from the image side to the object side, the second lens group G2 is monotonically moved from the object side to the image side, and the fourth lens group G4 is moved along a trajectory curve which is convex toward the object side when changing the magnification of the zoom lens from the wide angle end to the telephoto end.

In this example 6, the focal length f of an entire optical system of the zoom lens, the F number F, and the half field angle ω are changed within a range of f=5.06 to 52.0, F=3.67 to 5.87, and ω=39.2 to 4.54, respectively. An optical property of each optical element is as follows:

TABLE 11

OPTICAL PROPERTIES
f = 5.06~52.0, F = 3.67~5.87, ω = 39.2~4.54

| Surface No. | R | D | nd | vd | GLASS TYPE | | NOTE | |
|---|---|---|---|---|---|---|---|---|
| 1 | 44.3171 | 1.03 | | | | | | G1 |
| | | | 2.00069 | 25.46 | HOYA | TAFD40 | E1 | |
| 2 | 26.0958 | 3.18435 | | | | | | |
| | | | 1.603 | 65.44 | OHARA | SPHM53 | E2 | |
| 3 | ∞ | 0.1 | | | | | | |
| 4 | 20.885 | 2.49398 | | | | | | |
| | | | 1.72916 | 54.68 | OHARA | SLAL18 | E3 | |
| 5 | 57.3467 | Variable DA | | | | | | |
| 6* | 126.698 | 0.04 | | | | | | |
| | | | 1.5202 | 52.02 | | | RESIN LAYER | E4 G2 |
| 7 | 50.5005 | 0.8 | | | | | | |
| | | | 2.00069 | 25.46 | HOYA | TAFD40 | | |
| 8 | 4.95265 | 2.28123 | | | | | | |
| 9 | 92.143 | 3.49045 | | | | | | |
| | | | 1.84666 | 23.78 | HOYA | FDS90 | E5 | |
| 10 | −5.0956 | 0.61 | | | | | | |
| | | | 1.8208 | 42.71 | HOYA | MTAFD51 | E6 | |
| 11* | −91.662 | Variable DB | | | | | | |
| 12 | ∞ | Variable DC | | | | | Aperture stop | AD |
| 13* | 6.29816 | 4.13431 | | | | | | G3 |
| | | | 1.48749 | 70.44 | HOYA | FC5 | E7 | |
| 14* | −8.7832 | 0.1 | | | | | | |
| 15 | 8.3995 | 2.95605 | 1.5186 | 69.98 | HIKARI | EPKH1 | E8 | |
| 16 | −6.2962 | 0.81742 | | | | | | |
| | | | 1.85026 | 32.35 | HIKARI | ELASF021 | E9 | |
| 17 | 6.29619 | Variable DD | | | | | | |
| 18* | 9.12983 | 2.07 | | | | | | |
| | | | 1.52528 | 56.2 | PLASTIC | | E10 | G4 |
| 19 | 42.8851 | — | | | | | | |

TABLE 11-continued

OPTICAL PROPERTIES
f = 5.06~52.0, F = 3.67~5.87, ω = 39.2~4.54

| Surface No. | R | D | nd | vd | GLASS TYPE | NOTE |
|---|---|---|---|---|---|---|
| 20 | ∞ | 0.28 | | | | FM |
| | | | 1.5377 | 66.6 | | |
| 21 | ∞ | 0.1 | | | | |
| 22 | ∞ | 0.5 | | | | |
| | | | 1.5 | 64 | | |
| 23 | ∞ | — | | | | |

In Table 11, each of 6th, 11th, 13th, 14th and 18th optical surfaces is aspheric and indicated by asterisk "*", and the parameters in the equation (1-6) for each aspheric surface are as follows.

Aspheric Surface Parameters:

6th Surface $K=0$ $A_4=1.61812\times10^{-4}$ $A_6=-8.77148\times10^{-6}$ $A_8=6.64153\times10^{-7}$ $A_{10}=-2.61706\times10^{-8}$ $A_{12}=4.90817\times10^{-16}$ $A_{14}=-3.58555\times10^{-12}$ 11th Surface $K=0$ $A_4=-3.34755\times10^{-4}$ $A_6=-1.46643\times10^{-6}$ $A_8=1.45680\times10^{-7}$ $A_{10}=-2.98204\times10^{-8}$ $A_{12}=8.56606\times10^{-11}$ 13th Surface $K=0$ $A_4=-6.0355\times10^{-4}$ $A_6=7.15076\times10^{-6}$ $A_8=-6.86505\times10^{-7}$ $A_{10}=9.64137\times10^{-9}$ $A_{12}=-4.18827\times10^{-16}$ 14th Surface $K=0$ $A_4=3.20064\times10^{-4}$ $A_6=4.81813\times10^{-6}$ $A_8=3.04886\times10^{-8}$ $A_{10}=-1.58516\times10^{-8}$ 18th Surface $K=0$ $A_4=-1.00058\times10^{-4}$ $A_6=3.53642\times10^{-6}$ $A_8=-1.37159\times10^{-7}$ $A_{10}=1.92665\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 12

| | VARIABLE INTERVAL | | |
|---|---|---|---|
| | WIDE ANGLE END | INTERMEDIATE FOCAL LENGTH | TELEPHOTO END |
| f | 5.047 | 16.2 | 51.97 |
| DA | 0.64 | 10.77025 | 18.61 |
| DB | 10.098 | 1.39139 | 0.8 |
| DC | 6.42866 | 5.80645 | 0.95 |
| DD | 3.62932 | 6.81779 | 14.38379 |

In this case, the focal length fl of the first lens group, the focal length fw of the entire system of the zoom lens at the wide angle end, and the focal length ft of the entire system at the telephoto end are as follows:

fl=33.48 fw=5.06 ft=52

The values of the conditions (1-1) to (1-5) are as follows:

nd11=2.00069 (1-1)

vd11=25.46 (1-2)

θgF=0.6135 (1-3)

fl/fw=6.62 (1-4)

ft/fw=10.28 (1-5)

Accordingly, the conditions (1-1) to (1-5) are satisfied.
FIGS. 22, 23 and 24 show aberration curves of spherical aberration, astigmatism, distortion, and coma aberration at the wide angle end, the intermediate focal length position, and the telephoto end, respectively, in the zoom lens according to the example 6.

EXAMPLE 7

FIG. 25A to 25C are schematic views of lens configurations of the zoom lens according to the example 7 of the first embodiment of the present invention on a zooming trajectory when zooming from a wide angle end to a telephoto end via a predetermined intermediate focal length position, that is, FIG. 25A is a schematic sectional view of the zoom lens at the wide angle end, FIG. 25B is a schematic sectional view of the zoom lens at the predetermined intermediate focal length position, and FIG. 25C is a schematic sectional view of the zoom lens at the telephoto end. A left side of FIGS. 25A to 25C is an object side of the zoom lens.

The zoom lens shown in FIG. 25A to 25C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group. In FIGS. 25A to 25C, surface numbers of each optical surface are shown. In addition, the same reference numbers in FIGS. 25A to 25C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side and an aspheric surface at the image side, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is an aspheric lens having an aspheric surface formed by applying a resin layer at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the image side, and the ninth lens E9 provided with a double-concave negative lens having a stronger concave surface directed toward the image side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having a convex surface directed toward the object side, which is an aspheric surface at the object side and the eleventh lens E11 provided with a double convex positive lens having a stronger convex surface directed toward the object side, in order from the object side. The tenth and eleventh lenses E8, E9 are closely stuck and cemented together with each other to form a cemented lens formed by the two lenses.

That is, in this example 7, substantially, the configuration is almost same as that of the above described example 1, except for that the most image side surface of the first lens group G1, that is, the image side surface of the third lens E3 (surface number 5) is aspheric, the second positive lens of the third lens group G3, that is, the eighth lens E8 is the double-convex positive lens having the stronger surface directed toward the image side, and the fourth lens group G4 is the cemented lens formed by closely sticking and cementing the tenth lens E10 which is the negative meniscus lens having the convex surface directed toward the object side together with the eleventh lens E11 which is the double convex positive lens having the stronger convex surface directed toward the object side. In this case, as shown in FIGS. 25A to 25C, the first and third lens groups G1 and G3 are monotonically moved from the image side to the object side, the second lens group G2 is moved along a trajectory curve which is convex toward the image side, and the fourth lens group G4 is moved along a trajectory curve which is convex toward the object side when changing the magnification of the zoom lens from the wide angle end to the telephoto end.

In this example 7, the focal length f of an entire optical system of the zoom lens, the F number F, and the half field angle $\omega$ are changed within a range of f=5.10 to 52.0, F=3.71 to 6.09, and $\omega$=39.0 to 4.54, respectively. An optical property of each optical element is as follows:

TABLE 13

| | OPTICAL PROPERTIES | | | | | | | |
|---|---|---|---|---|---|---|---|---|
| | f = 5.10~52.0, F = 3.71~6.09, ω = 39.0~4.54 | | | | | | | |
| Surface No. | R | D | nd | vd | GLASS TYPE | | NOTE | |
| 1 | 38.984 | 1.00 | | | | | | G1 |
| | | | 2.00330 | 28.27 | OHARA | SLAH79 | E1 | |
| 2 | 22.713 | 3.53 | | | | | | |
| | | | 1.60300 | 65.44 | OHARA | SPHM53 | E2 | |
| 3 | 265.820 | 0.10 | | | | | | |
| 4 | 20.393 | 2.91 | | | | | | |
| | | | 1.58913 | 61.15 | OHARA | LBAL35 | E3 | |
| 5* | 87.586 | Variable DA | | | | | | |
| 6* | 94.038 | 0.04 | 1.52020 | 52.02 | | | RESIN LAYER | E4 G2 |
| 7 | 69.105 | 0.80 | | | | | | |
| | | | 1.80610 | 40.93 | OHARA | SLAH53 | | |
| 8 | 4.512 | 2.50 | | | | | | |
| 9 | 144.119 | 2.55 | | | | | | |
| | | | 1.76182 | 26.52 | OHARA | STIH14 | E5 | |
| 10 | −6.562 | 0.70 | | | | | E6 | |
| | | | 1.77250 | 49.60 | OHARA | SLAH66 | | |
| 11 | −33.585 | 0.04 | | | | | | |
| 12* | 1415.901 | Variable DB | 1.52020 | 52.02 | | | RESIN LAYER | |
| 13 | ∞ | Variable DC | | | | | Aperture stop | AD |
| 14* | 6.614 | 3.58 | | | | | | G3 |
| | | | 1.48749 | 70.24 | OHARA | SFSL5 | E7 | |
| 15* | −10.616 | 0.10 | | | | | | |
| 16 | 15.373 | 2.50 | | | | | | |
| | | | 1.69680 | 55.53 | OHARA | SLAL14 | E8 | |
| 17 | −9.347 | 0.80 | | | | | | |
| | | | 1.66680 | 33.05 | OHARA | STIM39 | E9 | |
| 18 | 5.572 | Variable DD | | | | | | |
| 19* | 9.803 | 0.80 | | | | | | G4 |
| | | | 1.86400 | 40.58 | OHARA | LLAH83 | E10 | |
| 20 | 7.178 | 2.51 | | | | | | |
| | | | 1.48749 | 70.24 | OHARA | SFSL5 | E11 | |
| 21 | −58.759 | — | | | | | | |
| 22 | ∞ | 0.30 | | | | | | FM |
| | | | 1.51680 | 64.20 | | | | |
| 23 | ∞ | 0.50 | | | | | | |
| | | | 1.50000 | 64.00 | | | | |
| 24 | ∞ | — | | | | | | |

In Table 13, each of 5th, 6th, 12th, 14th, 15th and 19th optical surfaces is aspheric and indicated by asterisk "*", and the parameters in the equation (1-6) for each aspheric surface are as follows.

Aspheric Surface Parameters:

5th Surface $K=0$ $A_4=7.67\times10^{-7}$ $A_6=4.28\times10^{-9}$ $A_8=6.46\times10^{-11}$ $A_{10}=-5.79\times10^{-13}$ $A_{12}=2.25\times10^{-16}$ 6th Surface $K=0$ $A_4=1.15\times10^{-4}$ $A_6=-4.00\times10^{-6}$ $A_8=2.21\times10^{-7}$ $A_{10}=-7.66\times10^{-9}$ $A_{12}=1.12\times10^{-19}$ $A_{14}=-5.58\times10^{-13}$ 12th Surface $K=0$ $A_4=-6.74\times10^{-4}$ $A_6=-2.73\times10^{-6}$ $A_8=-6.70\times10^{-7}$ $A_{10}=-3.16\times10^{-9}$ 14th Surface $K=0$ $A_4=-5.70\times10^{-4}$ $A_6=2.19\times10^{-6}$ $A_8=-1.14\times10^{-6}$ $A_{10}=7.28\times10^{-8}$ 15th Surface $K=0$ $A_4=5.11\times10^{-4}$ $A_6 = 2.89 \times 10^{-5}$ $A_8 = -1.42 \times 10^{-6}$ $A_{10} = 1.03 \times 10^{-7}$ 19th Surface $K = 0$ $A_4 = 1.44 \times 10^{-5}$ $A_6 = 1.27 \times 10^{-6}$ $A_8 = -2.55 \times 10^{-8}$ $A_{10} = 3.47 \times 10^{-10}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 14

VARIABLE INTERVAL

| | WIDE ANGLE END | INTERMEDIATE FOCAL LENGTH | TELEPHOTO END |
|---|---|---|---|
| f | 5.10 | 16.28 | 51.98 |
| DA | 0.64 | 8.79 | 20.01 |
| DB | 9.50 | 2.29 | 0.80 |
| DC | 5.22 | 1.78 | 0.95 |
| DD | 3.25 | 5.11 | 16.62 |

In this case, the focal length fl of the first lens group, the focal length fw of the entire system of the zoom lens at the wide angle end, and the focal length ft of the entire system at the telephoto end are as follows:

fl=35.69 fw=5.1 ft=51.97

The values of the conditions (1-1) to (1-5) are as follows:

nd11=2.00330 (1-1)

vd11=28.3 (1-2)

θgF=0.598 (1-3)

fl/fw=7.0 (1-4)

ft/fw=10.19 (1-5)

Accordingly, the conditions (1-1) to (1-5) are satisfied.

FIGS. 26, 27 and 28 show aberration curves of spherical aberration, astigmatism, distortion, and coma aberration at the wide angle end, the intermediate focal length position, and the telephoto end, respectively, in the zoom lens according to the example 7.

EXAMPLE 8

Figure 29A:
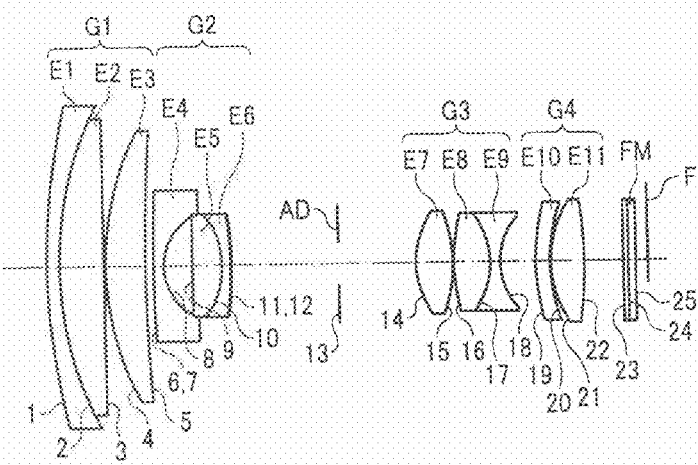
FIG. 29A is a schematic sectional view of an optical system of a zoom lens according to an example 8 along an optical axis at a wide angle end.
Figure 29B:
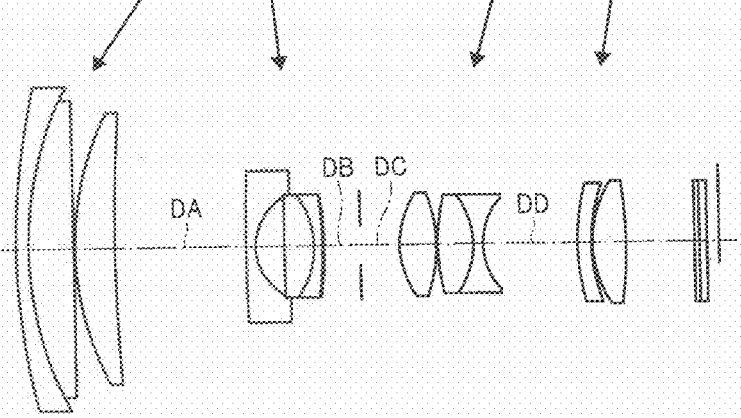
FIG. 29B is a schematic sectional view of the optical system of the zoom lens according to the example 8 along the optical axis at a predetermined intermediate focal length position.
Figure 29C:
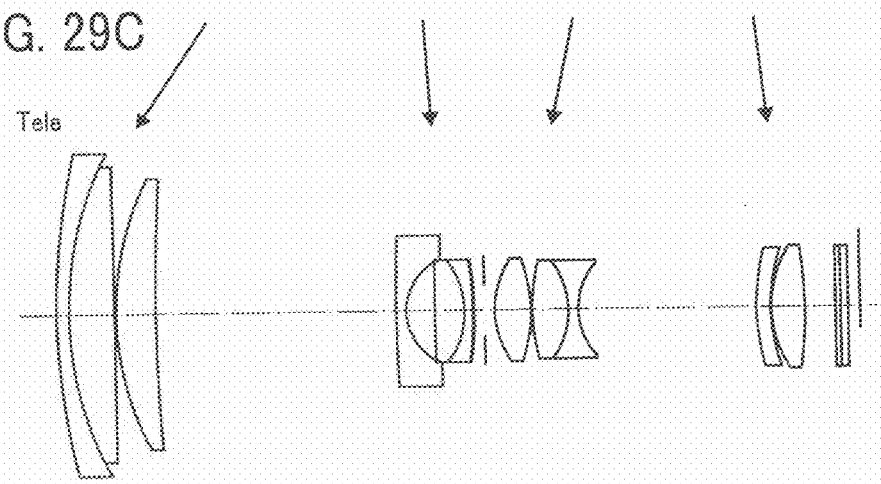
FIG. 29C is a schematic sectional view of the optical system of the zoom lens according to the example 8 along the optical axis at a telephoto end.

FIG. 29A to 29C are schematic views of lens configurations of the zoom lens according to the example 8 of the first embodiment of the present invention on a zooming trajectory when zooming from a wide angle end to a telephoto end via a predetermined intermediate focal length position, that is, FIG. 29A is a schematic sectional view of the zoom lens at the wide angle end, FIG. 29B is a schematic sectional view of the zoom lens at the predetermined intermediate focal length position, and FIG. 29C is a schematic sectional view of the zoom lens at the telephoto end. A left side of FIGS. 29A to 29C is an object side of the zoom lens.

The zoom lens shown in FIG. 29A to 29C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens Ell.

Each of the first to fourth lens groups G1 to G4 is appropriately commonly supported by a common support frame or the like and when zooming, each lens group is integrally operated and the aperture stop AD is operated independently from each lens group. In FIGS. 29A to 29C, surface numbers of each optical surface are shown. In addition, the same reference numbers in FIGS. 29A to 29C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a double-convex positive lens having a stronger convex surface directed toward the object side of the zoom lens, and the third lens E3 provided with a positive meniscus lens having a convex surface toward the object side and an aspheric surface at the image side, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the image side, and the ninth lens E9 provided with a double-concave negative lens having a stronger concave surface directed toward the image side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having a convex surface directed toward the object side, which is an aspheric surface at the object side and the eleventh lens E11 provided with a double convex positive lens having a stronger convex surface directed toward the object side, in order from the object side.

That is, in this example 8, substantially, the configuration is almost same as that of the above described example 1, except for that the second positive lens of the first lens group G1, that is, the second lens E2 is the double-convex positive lens having the stronger convex surface directed toward the object side, the most image side surface of the first lens group G1, that is, the image side surface (surface number 5) of the third lens E3 is aspheric, the second positive lens of the third lens group G3, that is, the eighth lens E8 is the double convex positive lens having a stronger convex lens directed toward the image side, and the fourth lens group G4 includes the tenth lens E10 which is the negative meniscus lens having the convex surface directed toward the object side and the eleventh lens E11 which is the double convex positive lens having the stronger convex surface directed toward the object side. In this case, as shown in FIGS. 29A to 29C, the first and third lens groups G1 and G3 are monotonically moved from the image side to the object side, the second lens group G2 is substantially monotonically moved to the image side, and the fourth lens group G4 is moved along a trajectory curve which is convex toward the object side when changing the magnification of the zoom lens from the wide angle end to the telephoto end.

In this example 8, the focal length f of an entire optical system of the zoom lens, the F number F, and the half field angle ω are changed within a range of f=5.10 to 52.50, F=3.61 to 6.08, and ω=39.0 to 4.5, respectively. An optical property of each optical element is as follows:

TABLE 15

OPTICAL PROPERTIES
f = 5.10~52.50, F = 3.61~6.08, ω = 39.0~4.5

| Surface No. | R | D | nd | vd | GLASS TYPE | | NOTE | |
|---|---|---|---|---|---|---|---|---|
| 1 | 52.273 | 1.03 | | | | | | G1 |
| | | | 2.00330 | 28.27 | OHARA | SLAH79 | E1 | |
| 2 | 26.659 | 3.79 | | | | | | |
| | | | 1.60300 | 65.44 | OHARA | SPHM53 | E2 | |
| 3 | −929.010 | 0.10 | | | | | | |
| 4 | 22.530 | 3.44 | | | | | | |
| | | | 1.58913 | 61.15 | OHARA | LBAL35 | E3 | |
| 5* | 210.638 | Variable DA | | | | | | |
| 6* | 457.799 | 0.04 | 1.52020 | 52.02 | | | RESIN LAYER | E4 | G2 |
| 7 | 156.173 | 0.80 | | | | | | |
| | | | 1.80610 | 40.93 | OHARA | SLAH53 | | |
| 8 | 4.545 | 2.30 | | | | | | |
| 9 | 219.473 | 2.46 | | | | | | |
| | | | 1.76182 | 26.52 | OHARA | STIH14 | E5 | |
| 10 | −6.587 | 0.76 | | | | | | |
| | | | 1.77250 | 49.60 | OHARA | SLAH66 | E6 | |
| 11 | −25.934 | 0.04 | | | | | | |
| 12* | −117.013 | Variable DB | 1.52020 | 52.02 | | | RESIN LAYER | |
| 13 | ∞ | Variable DC | | | | | Aperture stop | AD |
| 14* | 6.213 | 3.05 | | | | | | G3 |
| | | | 1.48749 | 70.24 | OHARA | SFSL5 | E7 | |
| 15* | −8.856 | 0.10 | | | | | | |
| 16 | 14.468 | 3.01 | | | | | | |
| | | | 1.73400 | 51.47 | OHARA | SLAL59 | E8 | |
| 17 | −6.253 | 0.80 | | | | | | |
| | | | 1.80100 | 34.97 | OHARA | SLAM66 | E9 | |
| 18 | 5.302 | Variable DD | | | | | | |
| 19* | 16.153 | 1.20 | | | | | | G4 |
| | | | 1.90200 | 25.10 | OHARA | LNBH54 | E10 | |
| 20 | 12.236 | 0.10 | | | | | | |
| 21 | 8.876 | 2.74 | | | | | | |
| | | | 1.48749 | 70.24 | OHARA | SFSL5 | E11 | |
| 22 | −30.259 | — | | | | | | |
| 23 | ∞ | 0.30 | 1.51680 | 64.20 | | | | FM |
| 24 | ∞ | 0.50 | | | | | | |
| | | | 1.50000 | 64.00 | | | | |
| 25 | ∞ | – | | | | | | |

In Table 15, each of 5th, 6th, 12th, 14th, 15th and 19th optical surfaces is aspheric and indicated by asterisk "*", and the parameters in the equation (1-6) for each aspheric surface are as follows.

Aspheric Surface Parameters:

5th Surface $K=0$ $A_4=2.205540\times10^{-6}$ $A_6=4.181840\times10^{-8}$ $A_8=-1.494890\times10^{-10}$ $A_{10}=1.522100\times10^{-12}$ $A_{12}=-5.516210\times10^{-15}$ Sixth Surface $K=0$ $A_4=1.999680\times10^{-4}$ $A_6=-1.122220\times10^{-5}$ $A_8=4.160730\times10^{-7}$ $A_{10}=-6.510170\times10^{-8}$ $A_{12}=-5.021190\times10^{-11}$ $A_{14}=1.590660\times10^{-12}$ 12th Surface $K=0$ $A_4=-6.659970\times10^{-4}$ $A_6=-9.274390\times10^{-6}$ $A_8=-4.062510\times10^{-8}$ $A_{10}=-5.698790\times10^{-8}$ 14th Surface $K=0$ $A_4=-7.967520\times10^{-4}$ $A_6=1.099360\times10^{-5}$ $A_8=-9.587750\times10^{-7}$ $A_{10}=4.152840\times10^{-8}$ 15th Surface $K=0$ $A_4=4.643910\times10^{-4}$ $A_6=1.657550\times10^{-5}$ $A_8=1.202080\times10^{-6}$ $A_{10}=6.179880\times10^{-8}$ 19th Surface $K=0$ $A_4=-3.955820\times10^{-5}$ $A_6=1.598050\times10^{-6}$ $A_8=-1.060610\times10^{-7}$ $A_{10}=1.644690\times10^{-9}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 16

VARIABLE INTERVAL

|  | WIDE ANGLE END | INTERMEDIATE FOCAL LENGTH | TELEPHOTO END |
|---|---|---|---|
| f | 5.10 | 16.28 | 51.98 |
| DA | 0.64 | 11.02 | 20.25 |
| DB | 9.00 | 3.09 | 0.80 |
| DC | 6.45 | 3.34 | 0.95 |
| DD | 2.95 | 7.81 | 14.83 |

In this case, the focal length fl of the first lens group, the focal length fw of the entire system of the zoom lens at the wide angle end, and the focal length ft of the entire system at the telephoto end are as follows:

fl=35.69 fw=5.1 ft=52.5

The values of the conditions (1-1) to (1-5) are as follows:

nd11=2.00330 (1-1)

vd11=28.3 (1-2)

θgF=0.598 (1-3)

*fl/fw*=7.0 (1-4)

*ft/fw*=10.30 (1-5)

Accordingly, the conditions (1-1) to (1-5) are satisfied.

Figure 30:
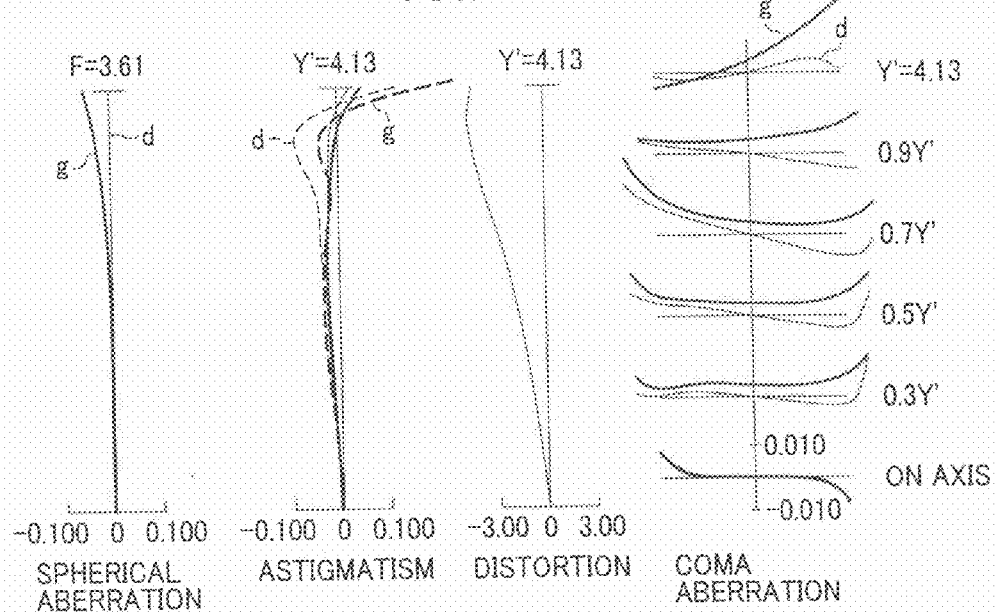
FIG. 30 is a view illustrating aberration curves of spherical aberration, astigmatism, distortion, and coma aberration in the zoom lens according to the example 8 at the wide angle end.
Figure 31:
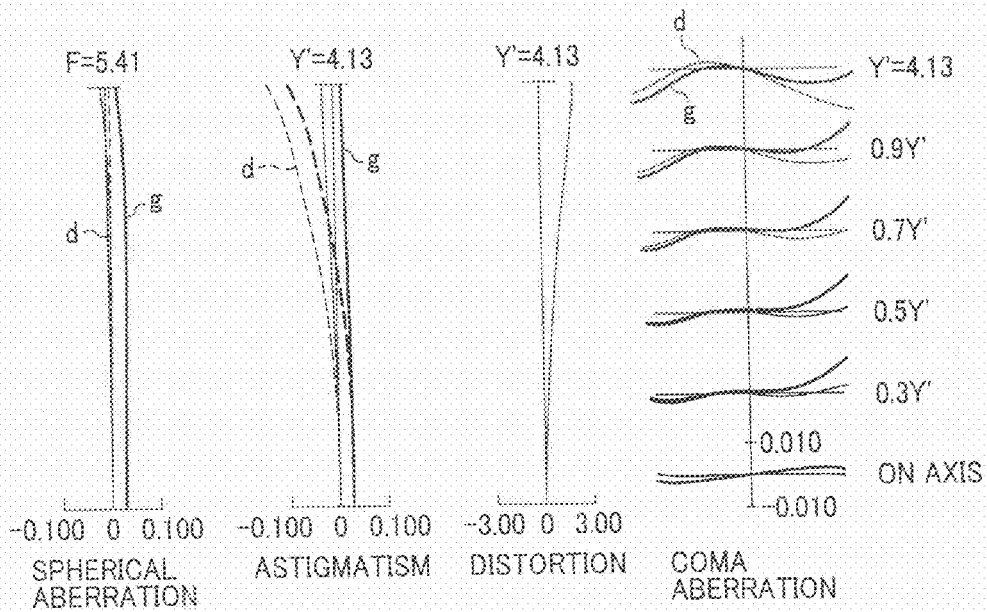
FIG. 31 is a view illustrating aberration curves of spherical aberration, astigmatism, distortion, and coma aberration in the zoom lens according to the example 8 at the intermediate focal length position.
Figure 32:
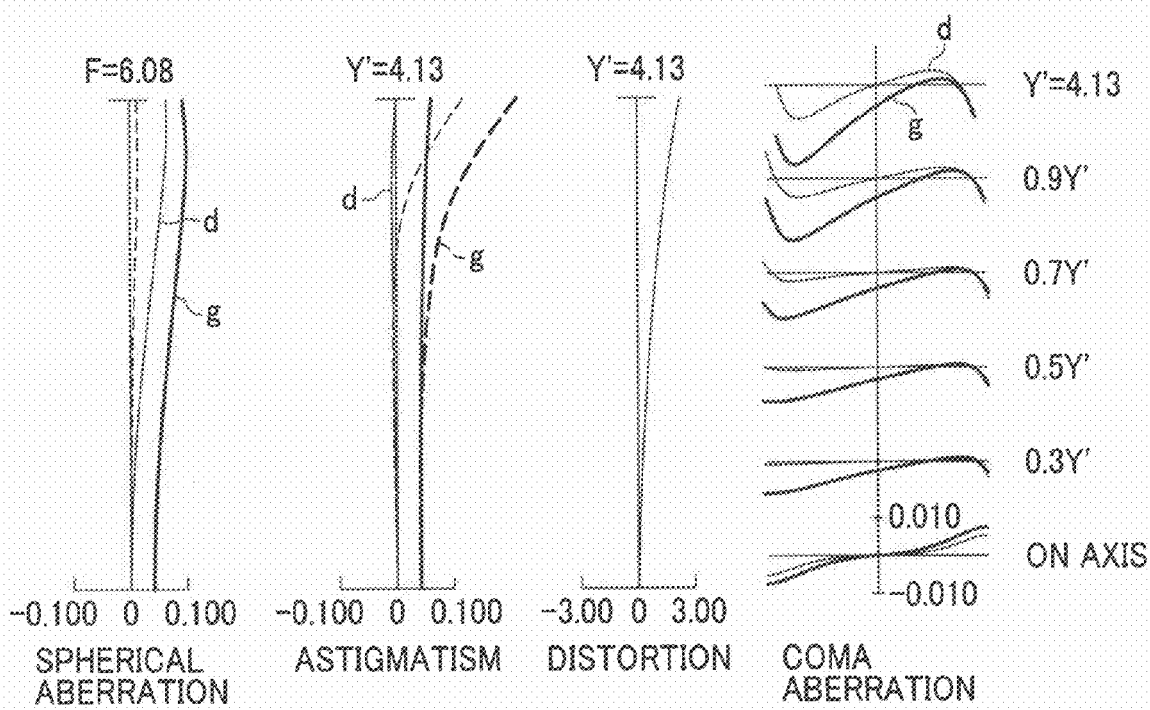
FIG. 32 is a view illustrating aberration curves of spherical aberration, astigmatism, distortion, and coma aberration in the zoom lens according to the example 8 at the telephoto end.

FIGS. 30, 31 and 32 show aberration curves of spherical aberration, astigmatism, distortion, and coma aberration at the wide angle end, the intermediate focal length position, and the telephoto end, respectively, in the zoom lens according to the example 8.

EXAMPLE 9

Figure 33A:
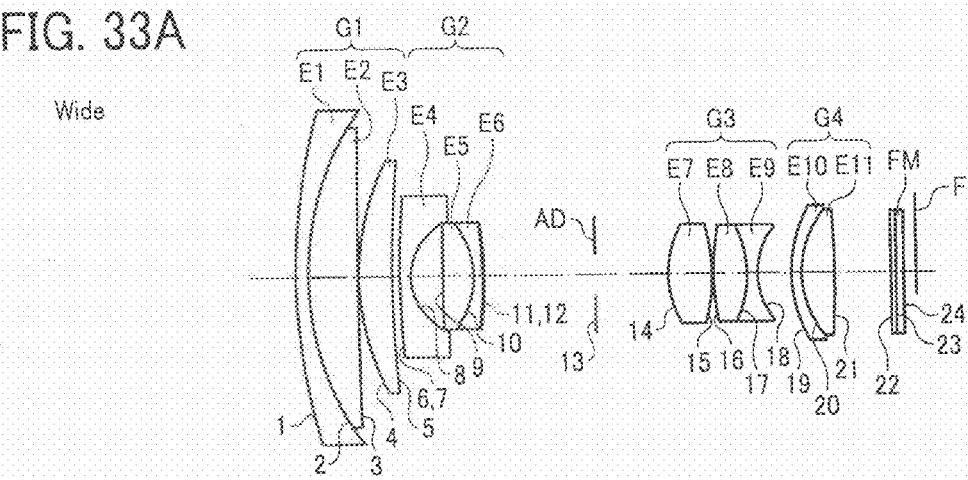
FIG. 33A is a schematic sectional view of an optical system of a zoom lens according to an example 9 along an optical axis at a wide angle end.
Figure 33B:
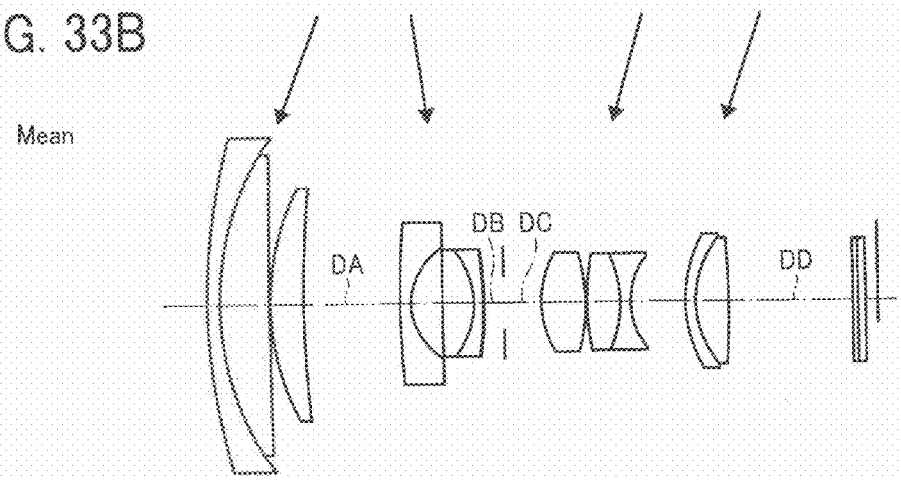
FIG. 33B is a schematic sectional view of the optical system of the zoom lens according to the example 9 along the optical axis at a predetermined intermediate focal length position.
Figure 33C:
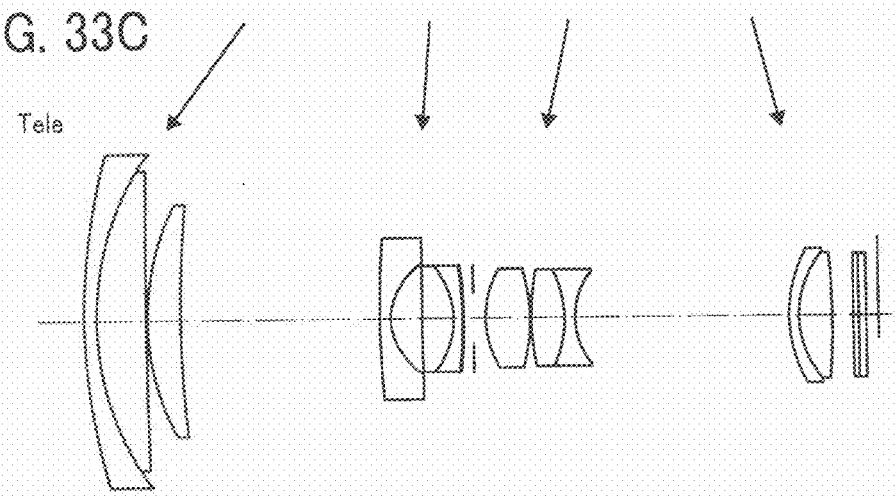
FIG. 33C is a schematic sectional view of the optical system of the zoom lens according to the example 9 along the optical axis at a telephoto end.

FIG. 33A to 33C are schematic views of lens configurations of the zoom lens according to the example 9 of the first embodiment of the present invention on a zooming trajectory when zooming from a wide angle end to a telephoto end via a predetermined intermediate focal length position, that is, FIG. 33A is a schematic sectional view of the zoom lens at the wide angle end, FIG. 33B is a schematic sectional view of the zoom lens at the predetermined intermediate focal length position, and FIG. 33C is a schematic sectional view of the zoom lens at the telephoto end. A left side of FIGS. 33A to 33C is an object side of the zoom lens.

The zoom lens shown in FIG. 33A to 33C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10 and an eleventh lens E11.

Each of the first to fourth lens groups G1 to G4 is appropriately commonly supported by a common support frame or the like and when zooming, each lens group is integrally operated and the aperture stop AD is operated independently from each lens group.

In FIGS. 33A to 33C, surface numbers of each optical surface are shown. In addition, the same reference numbers in FIGS. 33A to 33C are also independently used in each example for sake of simplicity and therefore the configuration indicated by the same reference number is not always the same.

When changing the magnification of the zoom lens from the wide angle end to the telephoto end, all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side and an aspheric surface at the image side, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is a hybrid aspheric lens having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer at the image side, in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface directed toward the object side, the eighth lens E8 provided with a double-convex positive lens having a stronger convex surface directed toward the image side, and the ninth lens E9 provided with a double-concave negative lens having a stronger concave surface directed toward the image side, in order from the object side. The eighth and ninth lenses E8, E9 are closely stuck and cemented together with each other to form a cemented lens formed by the two lenses.

The fourth lens group G4 includes the tenth lens E10 provided with a negative meniscus lens having a convex surface directed toward the object side, which is an aspheric surface at the object side and the eleventh lens E11 provided with a double convex positive lens having a stronger convex surface directed toward the object side, in order from the object side. The tenth and eleventh lenses E10, E11 are closely stuck and cemented together with each other to form a cemented lens formed by the two lenses.

That is, in this example 9, substantially, the configuration is almost same as that of the above described example 1, except for that the most image side surface of the first lens group G1, that is, the image side surface (surface number 5) of the third lens E3 is aspheric, the second positive lens of the third lens group G3, that is, the eighth lens E8 is the double convex positive lens having the convex surface directed toward the object side, and the fourth lens group G4 includes the tenth lens E10 which is the negative meniscus lens having the convex surface directed toward the object side and the eleventh lens E11 which is the double convex positive lens having the stronger convex surface directed toward the object side. In this case, as shown in FIGS. 33A to 33C, the first and third lens groups G1 and G3 are monotonically moved from the image side to the object side, the second lens group G2 is substantially is moved along a trajectory curve which is convex toward the image side, and the fourth lens group G4 is moved along a trajectory curve which is convex toward the object side when changing the magnification of the zoom lens from the wide angle end to the telephoto end.

In this example 8, the focal length f of an entire optical system of the zoom lens, the F number F, and the half field angle ω are changed within a range of f=5.10 to 51.98, F=3.40 to 6.15, and ω=39.0 to 4.54, respectively. An optical property of each optical element is as follows:

TABLE 17

| Surface No. | R | D | nd | vd | GLASS TYPE | | NOTE | |
|---|---|---|---|---|---|---|---|---|
| | | | | | | | | |
| 1 | 41.760 | 1.00 | | | | | | G1 |
| | | | 2.00330 | 28.27 | OHARA | SLAH79 | E1 | |
| 2 | 20.716 | 3.93 | | | | | | |
| | | | 1.60300 | 65.44 | OHARA | SPHM53 | E2 | |
| 3 | 861.946 | 0.10 | | | | | | |
| 4 | 18.175 | 2.66 | | | | | | |
| | | | 1.69680 | 55.53 | OHARA | SLAL14 | E3 | |
| 5* | 88.494 | Variable DA | | | | | | |
| 6* | 154.670 | 0.04 | 1.52020 | 52.02 | | | RESIN LAYER | E4 | G2 |
| 7 | 93.456 | 0.80 | | | | | | |
| | | | 1.80610 | 40.93 | OHARA | SLAH53 | | |
| 8 | 4.400 | 2.39 | | | | | | |

TABLE 17-continued

OPTICAL PROPERTIES
f = 5.10~51.98, F = 3.40~6.15, ω = 39.0~4.54

| Surface No. | R | D | nd | vd | GLASS TYPE | | NOTE | |
|---|---|---|---|---|---|---|---|---|
| 9 | 170.030 | 2.55 | | | | | | |
| | | | 1.76182 | 26.52 | OHARA | STIH14 | E5 | |
| 10 | −5.964 | 0.70 | | | | | E6 | |
| | | | 1.77250 | 49.60 | OHARA | SLAH66 | | |
| 11 | −36.272 | 0.04 | | | | | | |
| 12* | 362.612 | Variable DB | 1.52020 | 52.02 | | | RESIN LAYER | |
| 13 | ∞ | Variable DC | | | | | Aperture stop | AD |
| 14* | 6.568 | 3.52 | | | | | | G3 |
| | | | 1.48749 | 70.24 | OHARA | SFSL5 | E7 | |
| 15* | −9.669 | 0.10 | | | | | | |
| 16 | 18.622 | 2.57 | | | | | | |
| | | | 1.69680 | 55.53 | OHARA | SLAL14 | E8 | |
| 17 | −8.754 | 0.80 | | | | | | |
| | | | 1.66680 | 33.05 | OHARA | STIM39 | E9 | |
| 18 | 5.643 | Variable DD | | | | | | |
| 19* | 9.804 | 0.79 | | | | | | G4 |
| | | | 1.86400 | 40.58 | OHARA | LLAH83 | E10 | |
| 20 | 7.208 | 2.59 | | | | | | |
| | | | 1.48749 | 70.24 | OHARA | SFSL5 | E11 | |
| 21 | −51.711 | — | | | | | | |
| 22 | ∞ | 0.30 | | | | | FM | |
| | | | 1.51680 | 64.20 | | | | |
| 23 | ∞ | 0.50 | | | | | | |
| | | | 1.50000 | 64.00 | | | | |
| 24 | ∞ | – | | | | | | |

In Table 17, each of 5th, 6th, 12th, 14th, 15th and 19th optical surfaces is aspheric and indicated by asterisk "*", and the parameters in the equation (1-6) for each aspheric surface are as follows.

Aspheric Surface Parameters:

5th Surface $K=0$ $A_4=1.947850\times10^{-6}$-6

$A_6=-5.051910\times10^{-9}$ $A_8=4.847070\times10^{-11}$ $A_{10}=-2.800590\times10^{-13}$ $A_{12}=1.399070\times10^{-36}$ 6th Surface $K=0$ $A_4=1.313170\times10^{-4}$ $A_6=-5.126640\times10^{-6}$ $A_8=2.369100\times10^{-7}$ $A_{10}=-7.633340\times10^{-9}$ $A_{12}=1.106480\times10^{-10}$ $A_{14}=-5.583560\times10^{-13}$ 12th Surface $K=0$ $A_4=-7.425700\times10^{-4}$ $A_6=-7.391420\times10^{-7}$ $A_8=-1.082630\times10^{-6}$ $A_{10}=-3.252710\times10^{-8}$ 14th Surface $K=0$ $A_4=-6.802070\times10^{-4}$ $A_6=2.072020\times10^{-5}$ $A_8=-1.126100\times10^{-6}$ $A_{10}=5.500980\times10^{-8}$ 15th Surface $K=0$ $A_4=4.961470\times10^{-4}$ $A_6=2.754750\times10^{-5}$ $A_8=-1.508580\times10^{-6}$ $A_{10}=8.474430\times10^{-8}$ 19th Surface $K=0$ $A_4=2.131920\times10^{-6}$ $A_8=1.263390\times10^{-6}$ $A_8=-3.663520\times10^{-8}$ $A_{10}=7.507270\times10^{-10}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 18

VARIABLE INTERVAL

|    | WIDE ANGLE END | INTERMEDIATE FOCAL LENGTH | TELEPHOTO END |
|----|----------------|---------------------------|---------------|
| f  | 5.10           | 16.28                     | 51.98         |
| DA | 0.64           | 7.70                      | 15.92         |
| DB | 8.79           | 1.56                      | 0.80          |
| DC | 5.75           | 2.99                      | 0.95          |
| DD | 2.70           | 4.35                      | 16.87         |

In this case, the focal length fl of the first lens group, the focal length fw of the entire system of the zoom lens at the wide angle end, and the focal length ft of the entire system at the telephoto end are as follows:

fl=29 fw=5.1 ft=51.97

The values of the conditions (1-1) to (1-5) are as follows:

$nd11=2.00330$ (1-1)

$vd11=28.3$ (1-2)

$\theta gF=0.598$ (1-3)

$fl/fw=5.69$ (1-4)

$ft/fw=10.19$ (1-5)

Accordingly, the conditions (1-1) to (1-5) are satisfied.

FIGS. 34, 35 and 36 show aberration curves of spherical aberration, astigmatism, distortion, and coma aberration at the wide angle end, the intermediate focal length position, and the telephoto end, respectively, in the zoom lens according to the example 9.

[Second Embodiment]

Hereinafter, a zoom lens and an information device according to a second embodiment of the present invention will be explained in detail with reference to accompanying drawings. At first, fundamental embodiments of the present invention will be explained.

The zoom lens according to one embodiment of the present invention includes a first lens group having a positive refractive power, a second lens group having a negative refractive power, a third lens group having a positive refractive power, and a fourth lens group having a positive refractive power, which are disposed in order from an object side, and an aperture stop disposed at an object side of the third lens group. In the zoom lens, in which when changing the magnification of the zoom lens from a wide angle end to a telephoto end, an interval between the first and second lens groups increases, an interval between the second and third lens groups decreases, and an interval between the third and fourth lens groups increases. The second lens group includes at least two negative lenses and the third lens group includes a most object side lens which has an object side surface having a curvature P3$f$ and an image side surface having a curvature P3$r$, the second negative lens of the second lens group from the object side has an object side surface having a curvature P2$f$, the second lens group includes a most image side glass surface having a curvature P2$r$, and the following conditions (2-1) to (2-3) are satisfied:

$0.06<1/Ft(P3f-P3r)<0.080$ (2-1)

$vd3>68$ (2-2)

$-0.2<1/Ft(P2f-P2r)<-0.1$ (2-3)

where Ft is a focal length of the zoom lens at the telephoto end and vd3 is an Abbe number of the lens of the third lens group for a d line.

Here, the condition (2-1) is for determining a ratio of a curvature of the lens of the third lens group to the focal length of the zoom lens at the telephoto end. If the value is less than the lower limit of the condition (2-1), there is advantage in correction of aberration and reduction in size, but a sensitivity to a manufacture error such as decentering is increased so that there is disadvantage in processability. If the value is more than the upper limit of the condition (2-1), there is advantage in the sensitivity to the manufacture error such as decentering, but burden of the other lenses is increased so that there is disadvantage not only in the correction of aberration but also reduction in size.

More preferably, the following condition is satisfied:

$0.068<1/Ft(P3f-P3r)<0.075$ (2-1')

Furthermore, the condition (2-2) is for determining an Abbe number of the lens of the third lens group. If the Abbe number is less than the lower limit of the condition (2-2), it is difficult to sufficiently correct color aberration.

The condition (2-3) is for determining a ratio of the curvature of the second lens of the second lens group and the most image side glass surface of the second lens group to the focal length of the zoom lens at the telephoto end. If the value is more than the upper limit of the condition (2-3), there is advantage in the correction of the aberration and reduction in size, but there is disadvantage in the sensitivity to the manufacture error such as decentering so that there is disadvantage in processability. If the value is less than the lower limit of the condition (2-3), there is advantage in the sensitivity to the manufacture error such as decentering. However, the burden of the other lenses is increased so that there is disadvantage not only in the correction of the aberration but also reduction in size.

Further preferably, the following condition is satisfied:

$-0.16<1/Ft(P2f-P2r)<-0.1$ (2-3')

In order to achieve high performance, it is preferable that the second lens group includes at least a negative lens, a positive lens, and a negative lens, in order from the object side and the above condition is satisfied. Further preferably, the second lens group consists of three lenses. In this embodiment of the present invention, two negative lenses are disposed in the second lens group to have a function of negative power of the second lens group so that aberration is easily suppressed. The lenses are disposed in order of negative-positive-negative lenses from the object side so that symmetry property of the lens configuration is improved to effectively correct the aberration by the second lens group.

In order to achieve higher performance, it is preferable that the third lens group includes at least a positive lens, a positive lens and a negative lens, in order from the object side. Further preferably, the third lens group consists of two positive lens and one negative lens.

In the above described zoom lens, the telephoto ratio Tpr, which is the value obtained by dividing the entire length of the zoom lens at the telephoto end by the focal length of the zoom lens at the telephoto end, satisfies the following condition $(2^{-4})$.

$$1.0 < Tpr < 1.5 \qquad (2\text{-}4)$$

Here, the condition (2-4) is a condition for controlling an extension amount of the first lens group, which is important to obtain a wide angle, telephoto and small size zoom lens, as well as for sufficiently correcting aberration. If the telephoto ratio is more than 1.5, the extension amount of the first lens group is increased so that there is disadvantage for reduction in size. Moreover, the size in radial directions is disadvantageously increased for ensuring sufficient amount of peripheral light at the telephoto end and image performance is easily degraded due to manufacture error such as a tilt of a lens barrel. If the telephoto ratio is less than 1.0, movement amount of the first lens group is reduced so that the second lens group less contributes to a magnification change and burden of the third lens group is increased or a large refractive index of the second lens group is required. Consequently the various aberrations are worsened.

In order to achieve further higher performance, at least one negative lens of the second lens group is preferably set to be a hybrid aspheric surface. Here, the hybrid aspheric lens is formed by applying a thin film made of a resin to a spherical glass lens to form an aspheric surface. By using the hybrid aspheric lens, not only the higher performance is achieved but also glass is freely selected so that low cost can be achieved.

In order to achieve further higher performance, it is preferable that the first lens group includes one negative lens and two positive lenses. Further preferably, the most image side surface of the first lens group is aspheric.

In order to achieve further higher performance, it is preferable that the most object side lens of the third lens group has an aspheric surface. Further, the most object side lens of the third lens group is preferably a double-aspheric lens. Such a configuration, it is possible to correct various aberrations so that higher performance is achieved.

In order to achieve further higher performance, it is preferable that the fourth lens group includes at least one positive lens and the most object side surface is aspheric. The aspheric lens is disposed at the most object side of the fourth lens group so that the light beams are away from the optical axis and therefore effect of the aspheric surface is largely obtained in correction on an image plane. Furthermore, the following condition is preferably satisfied:

$$\theta gF < 0.551 \qquad (2\text{-}5)$$

where $\theta_{gF}$ is a relative partial dispersion of the positive lens of the fourth lens group which is $(n_g - n_F)/(n_F - n_C)$ where $n_g$ is a refractive index of the positive lens of the fourth lens group for a g line, $n_F$ is a refractive index of the positive lens of the fourth lens group for a F line, and $n_C$ is a refractive index of the positive lens of the fourth lens group for a C line.

If the value is more than the upper limit of the condition (2-5), color aberration becomes large especially at the telephoto end so that there is disadvantage in aberration correction. Further preferably, plastic is used as a material so that low cost is achieved.

In the above described zoom lens, it is preferable that the condition (2-6) is satisfied:

$$Ft/Fw > 7 \qquad (2\text{-}6)$$

where Fw and Ft are focal lengths of the optical system at the wide angle end and the telephoto end, respectively.

The condition (2-6) is for controlling a zoom ratio and high performance compact zoom lens having high variable magnification ratio of 7 times or more can be obtained.

Furthermore, it is preferable that the following condition (2-7) is satisfied in the above described zoom lens:

$$0.78 < Y'/Fw \qquad (2\text{-}7)$$

where Y' is an image height.

The condition (2-7) is controlling angle of field and high performance compact zoom lens having high magnification ratio at the wide angle end with half angle of field of 38 degrees.

In the zoom lens, it is preferable that, when changing the magnification from the wide angle end to the telephoto end, all of the lens groups are moved such that the first and third lens groups are moved toward the object side, the second lens group is moved along a curve or a part thereof, which is convex toward the image side, the fourth lens group is moved along a curve or a part thereof, which is convex toward the object side, and an aperture stop is moved independently from the other lens groups. Such a configuration, movement amount of the first lens group can be effectively reduced and there is advantage in aberration correction.

In addition, when focusing on a finite distance, it is preferable that only the fourth lens group is moved so that a weight of elements to be moved is reduced.

It is preferable that an opening diameter of the aperture stop is constant independently the magnification because of the simple mechanism. However, the opening diameter at the telephoto end is set to be larger than that at the wide angle end so that variation of the F number can be reduced. If it is necessary that the light amount reaching the image plane is reduced, the opening of the aperture stop may be narrowed. However, it is more preferable to use an ND filter, or the like without largely changing diameter of the opening of the aperture stop to reduce light amount, because degrade of resolving power due to diffraction phenomenon is prevented.

An information device according to this embodiment of the present invention is an information device having a photographing function, which uses the above described zoom lens as a photographing optical system.

The information device may have an image pickup device having a light receiving surface on which a subject image through the zoom lens is imaged. As described above, the information device may be implemented as a digital camera, a video camera, a silver salt camera, and the like and also preferably implemented as a portable information terminal apparatus.

As described above, according to the configuration of the zoom lens of this embodiment of the present invention, the zoom lens has a sufficiently wide angle of field, that is, half angle of field of 38 degrees at the wide angle end and the magnification ratio of 7 times or more so that aberration is sufficiently corrected. Then, the small size zoom lens having a resolving power adapted to high resolution image pickup device is used as a photographing optical system so that a small information device having a high performance photographing function as well as wide angle and high magnification ratio can be provided.

In the conditions (2-1) to (2-7) of the above described zoom lens according to the first to sixth examples of the first embodiment, as shown in the following table 13, the parameters of the conditions (2-1) to (2-7) are within the ranges of the conditions and all of the first to sixth examples satisfies the conditions (2-1) to (2-7).

The following table 13 shows the value of each condition in each example.

TABLE 19

|  | EXAMPLE 1 | EXAMPLE 2 | EXAMPLE 3 | EXAMPLE 4 | EXAMPLE 5 | EXAMPLE 6 |
| --- | --- | --- | --- | --- | --- | --- |
| CONDITION (1) | 0.0687 | 0.0691 | 0.0733 | 0.0742 | 0.0723 | 0.0706 |
| CONDITION (2) | 70.400 | 70.500 | 70.240 | 70.440 | 70.500 | 70.440 |
| CONDITION (3) | −0.111 | −0.112 | −0.125 | −0.104 | −0.150 | −0.104 |
| CONDITION (4) | 1.198 | 1.217 | 1.215 | 1.222 | 1.185 | 1.218 |
| CONDITION (5) | 0.532 | 0.538 | 0.530 | 0.550 | 0.538 | 0.560 |
| CONDITION (6) | 10.303 | 10.298 | 10.298 | 10.285 | 10.298 | 10.298 |
| CONDITION (7) | 0.819 | 0.818 | 0.818 | 0.817 | 0.810 | 0.818 |

[Third Embodiment]

Hereinafter, a zoom lens and an information device according to a third embodiment of the present invention will be explained in detail with reference to accompanying drawings. At first, fundamental embodiments of the present invention will be explained.

The zoom lens according to the embodiment of the present invention includes a first lens group having a positive refractive power, a second lens group having a negative refractive power, a third lens group having a positive refractive power, and a fourth lens group having a positive refractive power, which are disposed in order from an object side, and an aperture stop disposed at an object side of the third lens group. In the zoom lens, when changing the magnification of the zoom lens from a wide angle end to a telephoto end, all of the lens groups are moved such that an interval between the first and second lens groups increases, an interval between the second and third lens groups decreases, and an interval between the third and fourth lens groups increases, the first lens group includes at least one negative lens and at least one positive lens, the second lens group includes at least a negative lens, a positive lens and a negative lens, in order from the object side, and the following conditions (3-1) and (3-2) are satisfied:

$$-1.1 < R_{12}/(R_{52} \times F_w) < -0.85 \quad (3\text{-}1)$$

$$-3 < (v_1 - v_2)/(v_6 - v_5) < -1.5 \quad (3\text{-}2)$$

where $R_{12}$ is a curvature radius of an image side surface of a first lens of the first lens group from the object side, that is, a lens which is disposed at first from the object side in the first lens group, $R_{52}$ is a curvature radius of an image side surface of a first positive lens of the second lens group from the object side, $F_w$ is a focal length of the zoom lens at the wide angle end, $v_1$ is an Abbe number of the first lens of the first lens group from the object side, $v_2$ is an Abbe number of a second lens of the first lens group from the object side, $v_5$ is an Abbe number of a second lens of the second lens group from the object side, that is, a lens which is disposed secondarily from the object side in the second lens group, and $v_6$ is an Abbe number of a third lens of the second lens group from the object side, that is, a lens which is disposed thirdly from the object side in the second lens group.

The condition (3-1) is for determining a range of a ratio of the curvature radius of the first lens of the first lens group to that of the second lens of the second lens group. If the value of (3-1) and (3-2) are more than the upper limit or less than the lower limit of the conditions (3-1) and (3-2), color aberrations are increased in each lens group so that there is disadvantage in aberration correction. Particularly, the zoom lens with high variable magnification, influence on chromatic aberration of magnification or MTF at the telephoto end is large so that it is difficult to correct the aberration. Further preferably, the following conditions (3-1') and (3-2') are satisfied:

$$-1.09 < R_{12}/(R_{52} \times F_w) < -0.87 \quad (3\text{-}1')$$

$$-2.7 < (v_1 - v_2)/(v_5 - v_5) < -1.9 \quad (3\text{-}2')$$

In addition, in this embodiment of the present invention, the second lens group includes two negative lenses and therefore has negative power so as to easily suppress the aberration. They are disposed in order of the negative lens, the positive lens, and the negative lens from the object side so that asymmetry property of the lens configuration is improved to effectively correct the aberration in the second lens group. By satisfying the above condition, influence on chromatic aberration of magnification or MTF at the telephoto end is large so that it is difficult to correct the aberration.

In order to effectively correct the color aberration, it is preferable that the second lens and third lens of the second lens group from the object side are cemented.

In order to effectively correct the color aberration, it is preferable that the first lens and second lens of the first lens group form the object side are cemented with each other.

It is preferable that the telephoto ratio Tpr, which is the entire length of the lens system at the telephoto end divided by the focal length of the lens system at the telephoto end satisfies the following condition (3-3):

$$1.0 < T_{pr} < 1.5 \quad (3\text{-}3)$$

Here, the condition (3-3) is for controlling an extension amount of the first lens group, which is important for a wide angle, telephoto, and small size zoom lens, to sufficiently correct the aberration. If the telephoto ratio is more than 1.5, the extension amount of the first lens group is increased so that not only there is disadvantage not only for reduction in size but also the size of the zoom lens is increased in a radial direction to ensure peripheral light at the telephoto end and an image performance due to manufacture error such as a tilt of the lens barrel is easily degraded. If the telephoto ratio is less than 1.0, movement amount of the first lens group is reduced so that the second lens group less contributes to a magnification change and burden of the third lens group is increased or a large refractive index of the second lens group is required. Consequently the various aberrations are worsened.

In order to achieve further higher performance, at least one negative lens of the second lens group is preferably set to be a hybrid aspheric surface. Here, the hybrid aspheric lens is formed by applying a thin film made of a resin to a spherical glass lens to form an aspheric surface. By using the hybrid aspheric lens, not only the higher performance is achieved but also glass is freely selected so that low cost can be achieved.

In order to achieve further higher performance, it is preferable that the first lens group includes one negative lens and two positive lenses. Further preferably, the most image side surface of the first lens group is aspheric.

In order to achieve further higher performance, it is preferable that the third lens group includes one negative lens and two positive lenses and the most object side lens of the third lens group has an aspheric surface. Further, the most object side lens of the third lens group is preferably a double-aspheric lens. Such a configuration, it is possible to correct various aberrations so that higher performance is achieved.

In order to achieve further higher performance, it is preferable that the fourth lens group includes at least one positive lens and the most object side surface is aspheric. The aspheric lens is disposed at the most object side of the fourth lens group so that the light beams are away from the optical axis and therefore large effect of the aspheric surface is obtained in correction on an image plane. Furthermore, the following condition is preferably satisfied:

$$\theta_{gF} < 0.551 \qquad (3\text{-}4)$$

where $\theta_{gF}$ is a relative partial dispersion of the positive lens of the fourth lens group which is $(n_g - n_F)/(n_g - n_C)$ where $n_g$ is a refractive index of the positive lens of the fourth lens group for a g line, $n_F$ is a refractive index of the positive lens of the fourth lens group for a F line, and $n_C$ is a refractive index of the positive lens of the fourth lens group for a C line.

If the value is more than the upper limit of the condition (3-4), color aberration becomes large especially at the telephoto end so that there is disadvantage in aberration correction. Further preferably, plastic is used as a material so that low cost is achieved.

In the above described zoom lens, it is preferable that the condition (3-5) is satisfied:

$$F_t/F_w > 9 \qquad (3\text{-}5)$$

where Fw and Ft are focal lengths of the optical system at the wide angle end and the telephoto end, respectively.

The condition (3-5) is for controlling a zoom ratio and high performance compact zoom lens having high variable magnification ratio of 10 times or more, more preferably 10 to 11 times can be obtained.

Furthermore, it is preferable that the following condition (3-6) is satisfied in the above described zoom lens:

$$0.78 < Y'/F_w \qquad (3\text{-}6)$$

where Y' is an image height.

The condition (3-6) is controlling angle of field and high performance compact zoom lens having high magnification ratio at the wide angle end with half angle of field of 38 degrees.

In the zoom lens, it is preferable that, when changing the magnification from the wide angle end to the telephoto end, all of the lens groups are moved such that the first and third lens groups are moved toward the object side, the second lens group is moved toward the image side, the fourth lens group is moved along a curve or a part thereof, which is convex toward the object side. Such a configuration, movement amount of the first lens group can be effectively reduced and there is advantage in aberration correction.

In addition, when focusing on a finite distance, it is preferable that only the fourth lens group is moved so that a weight of elements to be moved is reduced.

It is preferable that an opening diameter of the aperture stop is constant independently the magnification because of the simple mechanism. However, the opening diameter at the telephoto end is set to be larger than that at the wide angle end so that variation of the F number can be reduced. If it is necessary that the light amount reaching the image plane is reduced, the opening of the aperture stop may be narrowed. However, it is more preferable to use an ND filter, or the like without largely changing diameter of the opening of the aperture stop to reduce light amount, because degrade of resolving power due to diffraction phenomenon is prevented.

An information device according to this embodiment of the present invention is an information device having a photographing function, which uses the above described zoom lens as a photographing optical system. The information device may have an image pickup device having a light receiving surface on which a subject image through the zoom lens is imaged. As described above, the information device may be implemented as a digital camera, a video camera, a silver salt camera, and the like and also preferably implemented as a portable information terminal apparatus.

As described above, according to the configuration of the zoom lens of this embodiment of the present invention, the zoom lens has a sufficiently wide angle of field, that is, half angle of field of 38 degrees at the wide angle end and the magnification ratio of 9 times or more so that aberration is sufficiently corrected. Then, the small size zoom lens having a resolving power adapted to high resolution image pickup device is used as a photographing optical system so that a small information device having a high performance photographing function as well as wide angle and high magnification ratio can be provided.

Here, the above described zoom lens according to the embodiment of the present invention will be supplementarily explained.

As described above, in the zoom lens including the first lens group having the positive refractive power, the second lens group having the negative refractive power, the third lens group having the positive refractive power, and the fourth lens group having the positive refractive power, which are disposed in order from the object side, that is, positive-negative-positive-positive four lens groups, generally, the second lens group is configured as a "variator" which has a main magnification function. However, in the zoom lens according to an embodiment of the present invention, the third lens group also has a magnification function to reduce the burden of the second lens group so that degree of correction freedom for an aberration correction which is difficult in a wider angle- and higher magnification-zoom lens is ensured.

Furthermore, if the first lens group is configured to be moved toward the object side when changing the magnification of the zoom lens from the wide angle end to the telephoto end, a height of a light beam passing through the first lens group at the wide angle end is lowered. Accordingly, the zoom lens is configured such that the size of the first lens group is prevented from increasing in a wider angle zoom lens and a sufficient interval between the first and second lens groups is ensured to prevent the F number (F value) at the telephoto end from increasing.

According to such a configuration of the embodiment of the present invention, a new zoom lens and an information device can be provided. As shown in the following specific examples in detail, the zoom lens is capable of being applied to a light receiving element having more than 5 million to 10 million pixels due to the small size and the sufficient correction of aberration. In addition, if such a zoom lens is used as a photographing optical system, a small size and high performance information device including an imaging apparatus such as a digital camera can be achieved.

EXAMPLE 10

Next, the specific examples according to this embodiment of the present invention will be explained in detail. The following example 10 and the examples 1 to 4 of the first embodiments are specific configurations with specific numerical examples.

FIG. 38A to 38C are schematic views of lens configurations of the zoom lens according to the example 10 of the third embodiment of the present invention on a zooming trajectory when zooming from a wide angle end (Wide) to a telephoto end (Tele) via a predetermined intermediate focal length position (Mean), that is, FIG. 38A is a schematic sectional view of the zoom lens at the wide angle end, FIG. 38B is a schematic sectional view of the zoom lens at the predetermined intermediate focal length position, and FIG. 38C is a schematic sectional view of the zoom lens at the telephoto end. A left side of FIGS. 38A to 38C is an object side of the zoom lens.

The zoom lens shown in FIG. 38A to 38C includes a first lens group G1 having a positive refracting power, a second lens group G2 having a negative refracting power, a third lens group G3 having a positive refracting power, and a fourth lens group G4 having a positive refracting power, which are disposed in order from an object side along the optical axis, and an aperture stop AD disposed between the second lens group G2 and the third lens group G3. In this case, the first lens group G1 includes a first lens E1, a second lens E2, and a third lens E3, the second lens group G2 includes a fourth lens E4, a fifth lens E5, and a sixth lens E6, the third lens group G3 includes a seventh lens E7, an eighth lens E8, and a ninth lens E9, and the fourth lens group G4 includes a tenth lens E10.

Each of the first to fourth lens groups G1 to G4 is appropriately commonly supported by a common support frame or the like and when zooming, each lens group is integrally operated and the aperture stop AD is operated independently from each lens group. In FIGS. 38A to 38C, surface numbers (1st to 24th surfaces) of each optical surface are shown. In addition, the same reference numbers are independently used in each example for sake of simplicity and therefore the configuration indicated by the same reference number is not always the same configuration.

When changing the magnification of the zoom lens from the wide angle end (short focal end) to the telephoto end (long focal end), all of the first to fourth lens groups are moved such that an interval between the first lens group G1 and the second lens group G2 is increased, an interval between the second lens group G2 and the third lens group G3 is decreased and an interval between the third lens group G3 and the fourth lens group G4 is increased.

The first lens group G1 includes the first lens E1 provided with a negative meniscus lens having a convex surface directed toward the object side of the zoom lens, the second lens E2 provided with a positive meniscus lens having a convex surface directed toward the object side of the zoom lens, and the third lens E3 provided with a positive meniscus lens having a convex surface toward the object side of the zoom lens, in order from the object side. The first and second lenses E1, E2 are closely stuck and cemented together with each other to form a cemented lens formed by the two lenses.

The second lens group G2 includes the fourth lens E4 provided with a negative meniscus lens having a convex surface directed toward the object side, which is an aspheric lens (a so-called hybrid aspheric lens) having an aspheric surface formed by applying a resin layer at the object side, the fifth lens E5 provided with a double-convex positive lens having a stronger convex surface at the image side, and the sixth lens E6 provided with a negative meniscus lens having a convex surface directed toward the image side, which is a hybrid aspheric lens having an aspheric surface formed by applying a resin layer to an image side surface in order from the object side. The fifth and sixth lenses E5, E6 are closely stuck and cemented together with each other to form a cemented lens formed by the two lenses.

The aperture stop AD is disposed between the second lens group G2 and the third lens group G3.

The third lens group G3 includes the seventh lens E7 provided with a double-convex and -aspheric positive lens having a stronger convex surface at the object side, the eighth lens E8 provided with a double-convex positive lens having a stronger convex surface at the image side, and the ninth lens E9 provided with a double-concave negative lens having a stronger concave surface at the image side, in order from the object side. The eighth and ninth lenses E8, E9 are closely stuck and cemented together with each other to form a cemented lens formed by the two lenses.

The fourth lens group G4 includes only the tenth lens E10 provided with a positive meniscus lens having an aspheric surface at the object side, which is a convex surface directed toward the object side.

In this case, as shown in FIGS. 38A to 38C, the first and third lens groups G1 and G3 are monotonically moved from the image side to the object side, the second lens group G2 is moved along a trajectory curve which is convex toward the image side, and the fourth lens group G4 is moved along a trajectory curve which is convex toward the object side when changing the magnification of the zoom lens from the wide angle end (short focal end) to the telephoto end (long focal end).

In this example 10, the focal length f of an entire optical system of the zoom lens, the F number F, and the half field angle ω are changed within a range of f=5.10 to 52.51, F=3.59 to 6.03, and ω=39.3 to 4.54, respectively. An optical property of each optical element is as follows:

TABLE 20

OPTICAL PROPERTIES
f = 5.10~52.51, F = 3.59~6.03, ω = 39.3~4.54

| Surface No. | R | D | $n_d$ | $v_d$ | GLASS TYPE | | NOTE | |
|---|---|---|---|---|---|---|---|---|
| 1 | 52.54417 | 1.02 | | | | | | G1 |
| | | | 1.80809 | 22.76 | OHARA | SNPH1 | E1 | |
| 2 | 29.92198 | 3.26406 | | | | | | |
| | | | 1.603 | 65.44 | OHARA | SPHM53 | E2 | |
| 3 | 419.6592 | 0.1 | | | | | | |
| 4 | 22.70474 | 3.23 | | | | | | |
| | | | 1.5924 | 68.3 | SUMITA | KGFK68 | E3 | |
| 5* | 119.7987 | Variable DA | | | | | | |
| 6* | 118.8772 | 0.04 | 1.5202 | 52.02 | | | RESIN LAYER | E4 | G2 |
| 7 | 66.37434 | 0.8 | | | | | | |
| | | | 1.883 | 40.76 | OHARA | SLAH58 | | |
| 8 | 4.68736 | 2.07822 | | | | | | |

TABLE 20-continued

OPTICAL PROPERTIES
f = 5.10~52.51, F = 3.59~6.03, ω = 39.3~4.54

| Surface No. | R | D | $n_d$ | $\nu_d$ | GLASS TYPE | | NOTE | |
|---|---|---|---|---|---|---|---|---|
| 9 | 26.04446 | 2.85164 | | | | | | |
| | | | 1.74077 | 27.79 | OHARA | STIH13 | E5 | |
| 10 | −6.21987 | 0.7 | | | | | E6 | |
| | | | 1.7725 | 49.6 | OHARA | SLAH66 | | |
| 11 | −80.115 | 0.04 | | | | | | |
| 12* | 61.26797 | Variable DB | 1.5202 | 52.02 | | | RESIN LAYER | |
| 13 | ∞ | Variable DC | | | | | Aperture stop | AD |
| 14* | 6.73356 | 3 | | | | | | G3 |
| | | | 1.5067 | 70.5 | SUMITA | KPG325 | E7 | |
| 15* | −8.96576 | 0.1 | | | | | | |
| 16 | 13.45069 | 2.83749 | | | | | | |
| | | | 1.618 | 63.33 | OHARA | SPHM52 | E8 | |
| 17 | −8.34757 | 0.8 | | | | | | |
| | | | 1.6932 | 33.7 | SUMITA | KCD45 | E9 | |
| 18 | 5.40999 | Variable DD | | | | | | |
| 19* | 9.9406 | 2.14213 | | | | | | |
| | | | 1.5067 | 70.5 | SUMITA | KPG325 | E10 | G4 |
| 20 | 121.7852 | — | | | | | | |
| 21 | ∞ | 0.3 | | | | | FM | |
| | | | 1.5168 | 64.2 | | | | |
| 22 | ∞ | 0.1 | | | | | | |
| 23 | ∞ | 0.5 | | | | | | |
| | | | 1.5 | 64 | | | | |
| 24 | ∞ | — | | | | | | |

In Table 20, the lens surface indicated by adding "*" (asterisk) is aspheric surface. Before a glass type name, a name of a manufacture is abbreviated to HOYA (HOYA CORPORATION), OHARA (OHARA INC.), SUMITA (SUMITA OPTICAL GLASS INC.), and HIKARI (HIKARI GLASS LTD.), as used in other examples.

That is, in Table 20, each of 5th, 6th, 12th, 14th, 15th and 19th optical surfaces is aspheric and indicated by asterisk, and the parameters in the equation (1-6) for each aspheric surface are as follows:

In addition, the fourth lens E4 and the sixth lens E6 are hybrid aspheric lenses having an object side surface (6th surface) and an image side surface (12th surface), respectively, on each of which an aspheric thin layer made of a resin is formed.

Aspheric Surface Parameters:
5th Surface $K=0$ $A_4=1.962240\times10^{-6}$ $A_6=1.381990\times10^{-8}$ $A_8=-3.171600\times10^{-10}$ $A_{10}=3.195350\times10^{-12}$ $A_{12}=-1.530000\times10^{-14}$ $A_{14}=2.744480\times10^{-17}$ 6th Surface $K=0$ $A_4=2.162520\times10^{-4}$ $A_6=-8.498910\times10^{-6}$ $A_8=4.779120\times10^{-7}$ $A_{10}=-1.877320\times10^{-8}$ $A_{12}=3.620710\times10^{-10}$ $A_{14}=-2.763280\times10^{-12}$ 12th Surface $K=0$ $A_4=-7.229000\times10^{-04}$ $A_6=-1.053110\times10^{-06}$ $A_8=-9.181890\times10^{-07}$ $A_{10}=-2.550310\times10^{-08}$ 14th Surface $K=0$ $A_4=-7.617580\times10^{-4}$ $A_6=8.295900\times10^{-6}$ $A_8=-6.419730\times10^{-7}$ $A_{10}=3.580160\times10^{-8}$ 15th Surface $K=0$ $A_4=3.617470\times10^{-4}$ $A_6=-7.901070\times10^{-6}$ $A_8=-4.172960\times10^{-7}$ 19th Surface $K=0$ $A_4=-1.821200\times10^{-6}$ $A_6=7.827020\times10^{-7}$ $A_8=4.918500\times10^{-8}$ A variable interval DA between the first lens group G1 and the second lens group G2, a variable interval DB between the second lens group G2 and the aperture stop AD, a variable interval DC between the aperture stop AD and the third lens group G3, and a variable interval DD between the third lens group G3 and the fourth lens group G4 are respectively changed as shown in the following table when zooming.

TABLE 21

VARIABLE INTERVAL

|    | WIDE ANGLE END | INTERMEDIATE FOCAL LENGTH | TELEPHOTO END |
|----|----|----|----|
| f  | 5.05 | 16.36 | 51.98 |
| DA | 0.640 | 11.638 | 19.989 |
| DB | 9.000 | 2.35 | 0.800 |
| DC | 6.608 | 4.239 | 0.950 |
| DD | 5.682 | 8.435 | 15.503 |

The values corresponding to the conditions (3-1) to (3-6) are as follows:

$R_{12}/(R_{52}\times R_w)=-0.953$ (3-1)

$(v_1-v_2)/(v_6-v_5)=-1.957$ (3-2)

$T_{pr}=1.235$ (3-3)

$\theta_{gF}=0.538$ (3-4)

$F_t/F_w=10.298$ (3-5)

$Y'/F_w=0.818$ (3-6)

Accordingly, the conditions (3-1) to (3-6) are satisfied.

Figure 41:
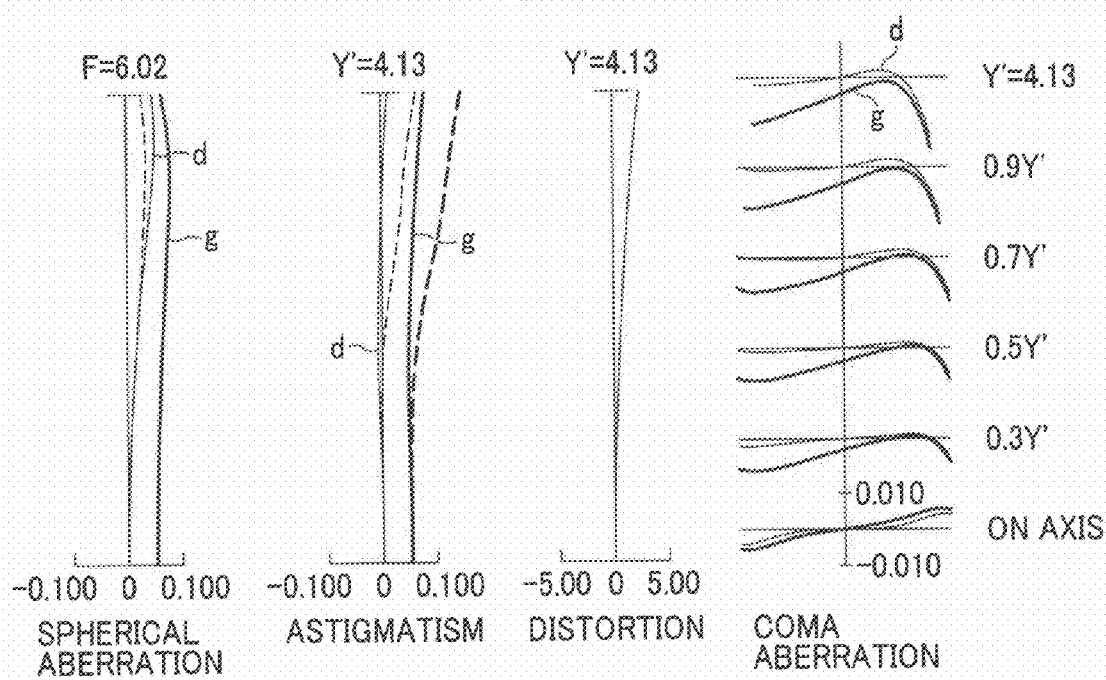
FIG. 41 is a view illustrating aberration curves of spherical aberration, astigmatism, distortion, and coma aberration in the zoom lens according to the example 10 at the telephoto end.

FIGS. 39, 40 and 41 show aberration curves of spherical aberration, astigmatism, distortion, and coma aberration at the wide angle end, the intermediate focal length position, and the telephoto end, respectively, in the zoom lens according to the example 10. In the spherical aberration curves in this example as well as the other examples, the broken line in the spherical aberration indicates a sine condition, and in astigmatism curves, the solid line indicates a sagittal image plane and the broken line indicates a meridional image plane. "g" and "d" in spherical aberration, astigmatism, distortion, and coma aberration curves indicate a d-line and a g-line.

The values of the examples 1 to 4 are shown as follows.

Example 1

In the example 1 of the first embodiment, the values of the conditions (3-1) to (3-6) are as follows:

$R_{12}/(R_{52}\times R_w)=-1.080$ (3-1)

$(v_1-v_2)/(v_6-v_5)=-2.624$ (3-2)

$T_{pr}=1.198$ (3-3)

$\theta_{gF}=0.532$ (3-4)

$F_t/F_w=10.298$ (3-5)

$Y'/F_w=0.818$ (3-6)

Accordingly, the conditions (3-1) to (3-6) are satisfied.

Example 2

In the example 2 of the first embodiment, the values of the conditions (3-1) to (3-6) are as follows:

$R_{12}/(R_{52}\times R_w)=-0.948$ (3-1)

$(v_1-v_2)/(v_6-v_5)=-2.355$ (3-2)

$T_{pr}=1.217$ (3-3)

$\theta_{gF}=0.538$ (3-4)

$F_t/F_w=10.298$ (3-5)

$Y'/F_w=0.818$ (3-6)

Accordingly, the conditions (3-1) to (3-6) are satisfied.

Example 3

In the example 3 of the first embodiment, the values of the conditions (3-1) to (3-6) are as follows:

$R_{12}/(R_{52}\times R_w)=-0.879$ (3-1)

$(v_1-v_2)/(v_6-v_5)=-2.355$ (3-2)

$T_{pr}=1.215$ (3-3)

$\theta_{gF}=0.530$ (3-4)

$F_t/F_w=10.298$ (3-5)

$Y'/F_w=0.818$ (3-6)

Accordingly, the conditions (3-1) to (3-6) are satisfied.

Example 4

In the example 4 of the first embodiment, the values of the conditions (3-1) to (3-6) are as follows:

$R_{12}/(R_{52}\times R_w)=-0.932$ (3-1)

$(v_1-v_2)/(v_6-v_5)=-2.112$ (3-2)

$T_{pr}=1.218$ (3-3)

$\theta_{gF}=0.550$ (3-4)

$F_t/F_w=10.285$ (3-5)

$Y'/F_w=0.817$ (3-6)

Accordingly, the conditions (3-1) to (3-6) are satisfied.

As described above, according to an embodiment of the present invention, a zoom lens capable of having resolving power adapted to an image pickup device having more than 5 million to 10 million pixels with high variable magnification ratio of 10 times or more, half angle of field of 38 degrees at the wide angle end, and small aberration and a small size information device having a high performance photographing function by use of the zoom lens as a photographing optical system.

That is, a zoom lens according to an embodiment of the present invention, includes a first lens group having a positive refractive power, a second lens group having a negative refractive power, a third lens group having a positive refractive power, and a fourth lens group having a positive refractive power, which are disposed in order from an object side to an image side, and an aperture stop disposed at an object side of the third lens group. When changing the magnification of the zoom lens from a wide angle end to a telephoto end, an interval between the first and second lens groups increases, an interval between the second and third lens groups decreases, and an interval between the third and fourth lens groups increases. The first lens group includes a negative lens, a positive lens, and a positive lens, which are disposed in order from the object side. The following conditions (1-1) to (1-3) are satisfied:

$$nd11 > 1.85 \quad (1\text{-}1)$$

$$vd11 > 25 \quad (1\text{-}2)$$

$$-1.6 \times 10^{-3} - vd11 + 0.642 < \theta_{gF} < -2.9 \times 10^{-3} - vd11 + 0.69 \quad (1\text{-}3)$$

where nd11 is a refractive index of the negative lens of the first lens group for a d line, vd11 is an Abbe number of the negative lens of the first lens group for the d line, and $\theta_{gF}$ is a relative partial dispersion of the negative lens of the first lens group which is $(n_g - n_F)/(n_F - n_C)$ where $n_g$ is a refractive index for a g line, $n_F$ is a refractive index for a F line, and $n_C$ is a refractive index of the negative lens of the first lens group for a C line.

Accordingly, a sufficiently-small size and high optical performance as well as wide angle of field and high magnification without color aberration can be achieved.

In the zoom lens according to an embodiment of the present invention, the second lens group includes a negative lens, a positive lens, and a negative lens, in order from the object side.

Accordingly, further high performance can be achieved.

In the zoom lens according to an embodiment of the present invention, the following condition is satisfied:

$$5 < fl/fw < 8, \quad (1\text{-}4)$$

where fl is a focal length of the first lens group and fw is a focal length of the zoom lens at the wide angle end.

Accordingly, further small size and high performance can be achieved.

In the zoom lens according to an embodiment of the present invention, the following condition is satisfied:

$$ft/fw > 7, \quad (1\text{-}5)$$

where ft is a focal length of the zoom lens at the telephoto end and fw is a focal length of the zoom lens at the wide angle end.

Accordingly, further high performance with large magnification ratio can be achieved.

In the zoom lens according to an embodiment of the present invention, the third lens group includes a positive lens, a positive lens and a negative lens, which are disposed in order from the object side.

Accordingly, further high performance with large magnification ratio can be achieved.

The zoom lens according to an embodiment of the present invention is used as a photographing optical system having a photographing function.

Accordingly, a sufficiently-small size and high optical performance photographing optical system as well as wide angle of field and high magnification without color aberration can be achieved.

The zoom lens according to an embodiment of the present invention includes an image pickup device having a light receiving surface, and an object image through the photographing optical system using the zoom lens is imaged on the light receiving surface of the image pickup device.

Accordingly, a high performance photographing function using an electronic image pickup device can be achieved.

The zoom lens according to an embodiment of the present invention is used in a portable information terminal apparatus having a photographing function.

Accordingly, a portable information terminal apparatus having a high performance photographing function can be provided.

According to an embodiment of the present invention, a small size zoom lens having a resolving power adapted to a high resolution image pickup device, which is capable of achieving a sufficiently wide angle of field of a half angle of field of 38 degrees or more at the wide angle end as well as a large magnification ratio of 7 times or more and sufficiently corrected aberration and a device using the zoom lens as a photographing optical system can be provided.

Accordingly, a small size information device having a high performance photographing function can be provided.

In the zoom lens according to an embodiment of the present invention, including a first lens group having a positive refractive power, a second lens group having a negative refractive power, a third lens group having a positive refractive power, a fourth lens group having a positive refractive power, and an aperture stop disposed at an object side of the third lens group. When changing the magnification of the zoom lens from a wide angle end to a telephoto end, all of the lens groups are moved such that an interval between the first and second lens groups is increased, an interval between the second lens group and the third lens group is decreased, and an interval between the third lens group and the fourth lens group is increased. The second lens group includes at least two negative lenses. The third lens group includes a most object side lens which has an object side surface having a curvature P3f and an image side surface having a curvature P3r, the second lens group includes a negative lens which has an object side surface having a curvature P2f, the second lens group includes a most image side glass surface having a curvature P2r, and the following conditions are satisfied:

$$0.06 < 1/\{Ft(P3f - P3r)\} < 0.080 \quad (2\text{-}1)$$

$$vd3 > 68 \quad (2\text{-}2)$$

$$-0.2 < 1/\{Ft(P2f - P2r)\} < -0.1, \quad (2\text{-}3)$$

where Ft is a focal length of the zoom lens at the telephoto end and vd3 is an Abbe number of the lens of the third lens group for a d line.

Accordingly, a sufficiently-small size and less aberration zoom lens as well as wide angle of field and high magnification can be achieved.

In the zoom lens according to an embodiment of the present invention, the second lens group includes at least a negative lens, a positive lens, and a positive lens, in order of the object side.

Accordingly, a zoom lens capable of having a further high performance can be provided.

In the zoom lens according to an embodiment of the present invention, the third lens group includes at least a positive lens, a positive lens, and a negative lens, in order from the object side.

Accordingly, a zoom lens capable of having a further high performance can be provided.

In the zoom lens according to an embodiment of the present invention, the following condition is satisfied:

$$1.0 < Tpr < 1.5, \quad (2\text{-}4)$$

where Tpr is a telephoto ratio, which is an entire length of the zoom lens divided by a focal length of the zoom lens at the telephoto end.

Accordingly, a highly-compact zoom lens can be provided.

In the zoom lens according to an embodiment of the present invention, at least one negative lens of the second lens group has a hybrid aspheric surface.

Accordingly, a zoom lens capable of achieving a high performance and low cost as well as freely selecting a glass material can be provided.

In the zoom lens according to an embodiment of the present invention, the first lens group includes one negative lens and two positive lenses.

Accordingly, a zoom lens capable of having a high performance can be provided.

In the zoom lens according to an embodiment of the present invention, the most object side lens of the third lens group has an aspheric surface.

Accordingly, a zoom lens capable of having a high performance can be provided.

In the zoom lens according to an embodiment of the present invention, the fourth lens group includes at least one positive lens and a most object-side surface which is an aspheric surface, and the following condition is satisfied:

$$\theta_{gF}<0.551, \tag{2-5}$$

where $\theta_{gF}$ is a relative partial dispersion of the positive lens of the fourth lens group which is $(n_g-n_F)/(n_F-n_C)$ where $n_g$ is a refractive index of the positive lens of the fourth lens group for a g line, $n_F$ is a refractive index of the positive lens of the fourth lens group for a F line, and $n_C$ is a refractive index of the positive lens of the fourth lens group for a C line.

Accordingly, a zoom lens capable of having a high performance can be provided.

In the zoom lens according to an embodiment of the present invention, following condition is satisfied:

$$ft/fw>7, \tag{2-6}$$

where ft is a focal length of the zoom lens at the telephoto end and fw is a focal length of the zoom lens at the wide angle end.

Accordingly, a zoom lens having a high variable magnification ratio of 7 times or more can be provided.

In the zoom lens according to an embodiment of the present invention, the following condition is satisfied:

$$0.78<Y'/Fw, \tag{2-7}$$

where Y' is a maximum image height of the zoom lens.

Accordingly, a zoom lens having a half angle of field of more than 38 degrees at a wide angle end can be provided.

In the zoom lens according to an embodiment of the present invention, when changing the magnification of the zoom lens from the wide angle end to the telephoto end, the first and third lens groups moves toward the object side, the second lens group moves on a trajectory in a curve or a part of the curve which is convex toward the image side, the fourth lens group moves on a trajectory in a curve or a part of the curve which is convex toward the object side, and the aperture stop moves independently from the lens groups.

Accordingly, a sufficiently-small size and highly corrected aberration zoom lens as well as wide angle of field and high magnification can be achieved.

The zoom lens according to an embodiment of the present invention is used as a photographing optical system.

Accordingly, a sufficiently-small size and less aberration zoom lens as well as wide angle of field and high magnification can be achieved.

The information device according to an embodiment of the present invention has an image pickup device having a light receiving surface on which an object image is imaged.

Accordingly, an information device having a function of converting a photographed image into digital information can be provided.

The information device is configured as a portable information terminal apparatus having a photographing function.

Accordingly, an information device having a high performance photographing function can be provided.

According to an embodiment of the present invention, a small size zoom lens having a resolving power adapted to a high resolution image pickup device, which is capable of achieving a sufficiently wide angle of field of a half angle of field of 38 degrees or more at the wide angle end as well as a large magnification ratio of 10 times or more and sufficiently corrected aberration and a device using the zoom lens as a photographing optical system can be provided.

Accordingly, a small size information device having a high performance photographing function can be provided.

That is, the zoom lens according to an embodiment of the present invention includes a first lens group having a positive refractive power, a second lens group having a negative refractive power, a third lens group having a positive refractive power, a fourth lens group having a positive refractive power, and an aperture stop disposed at an object side of the third lens group. When changing the magnification of the zoom lens from a wide angle end to a telephoto end, all of the lens groups are moved such that an interval between the first and second lens groups is increased, an interval between the second lens group and the third lens group is decreased, and an interval between the third lens group and the fourth lens group is increased.

Accordingly, a sufficiently-small size and less aberration zoom lens as well as wide angle of field and high magnification can be achieved.

In the zoom lens according to an embodiment of the present invention, the second and third lenses of the second lens group from the object side are cemented with each other.

Accordingly, a zoom lens capable of achieving further high performance can be provided.

In the zoom lens according to an embodiment of the present invention, the positive and negative lenses of the first lens group are cemented with each other.

Accordingly, a zoom lens capable of achieving further high performance can be provided.

In the zoom lens according to an embodiment of the present invention, the following condition is satisfied:

$$1.0<Tpr<1.5, \tag{3-3}$$

where Tpr is a telephoto ratio, which is an entire length of the zoom lens divided by a focal length of the zoom lens at the telephoto end.

Accordingly, a zoom lens capable of achieving further reduced size as well as aberration correction can be provided.

In the zoom lens according to an embodiment of the present invention, the second lens group includes at least one negative lens which is a hybrid aspheric lens.

Accordingly, a zoom lens capable of achieving further high performance and freely selecting glass materials to achieve low cost can be provided.

In the zoom lens according to an embodiment of the present invention, the first lens group has one negative lens and two positive lenses.

Accordingly, a zoom lens capable of achieving further high performance can be provided.

In the zoom lens according to an embodiment of the present invention, the third lens group includes one negative lens and two positive lenses and the most object side lens has an aspheric surface.

Accordingly, a zoom lens capable of achieving further high performance and correcting aberrations can be provided.

In the zoom lens according to an embodiment of the present invention, the fourth lens group includes at least one positive lens and a most object-side surface which is an aspheric surface, and the following condition is satisfied:

$$\theta_{gF} < 0.551, \quad (3\text{-}4)$$

where $\theta_{gF}$ is a relative partial dispersion of the positive lens of the fourth lens group which is $(n_g - n_F)/(n_F - n_C)$ where $n_g$ is a refractive index of the positive lens of the fourth lens group for a g line, $n_F$ is a refractive index of the positive lens of the fourth lens group for a F line, and $n_C$ is a refractive index of the positive lens of the fourth lens group for a C line.

Accordingly, a zoom lens capable of achieving further high performance can be provided.

In the zoom lens according to an embodiment of the present invention, the following condition is satisfied:

$$ft/fw > 9, \quad (3\text{-}5)$$

where ft is a focal length of the zoom lens at the telephoto end and fw is a focal length of the zoom lens at the wide angle end.

Accordingly, a high performance and compact zoom lens having high magnification ratio of 9 times or more can be provided.

In the zoom lens according to an embodiment of the present invention, the following condition is satisfied:

$$0.78 < Y'/Fw, \quad (3\text{-}6)$$

where Y' is a maximum image height of the zoom lens.

Accordingly, a high performance and compact zoom lens having a half angle of field of 38 degrees or more at the wide angle end and a high magnification ratio can be provided.

In the zoom lens according to an embodiment of the present invention, when changing the magnification from the wide angle end to the telephoto end, the first and third lens groups are moved toward the object side, the second lens group is moved toward image side, and the fourth lens group is moved along a curve or a part thereof which is convex toward the object side.

Accordingly, a sufficiently-small size and highly corrected aberration zoom lens as well as wide angle of field and high magnification can be achieved.

A camera device has the zoom lens according to an embodiment of the present invention used as a photographing optical system having a photographing function.

Accordingly, an information device using a camera device having a sufficiently-small size and less aberration zoom lens as well as wide angle of field and high magnification can be provided.

The zoom lens according to an embodiment of the present invention includes an image pickup device having a light receiving surface, and an object image through the photographing optical system using the zoom lens is imaged on the light receiving surface of the image pickup device.

Accordingly, the information device having a function of converting a photographed image into digital information can be provided.

The information device according to an embodiment of the present invention is configured as a portable information terminal apparatus.

Accordingly, the information device having high performance portable function as the portable information terminal apparatus can be provided.

Although the preferred embodiments of the present invention have been described, it should be understood that the present invention is not limited to these embodiments, various modifications and changes can be made to the embodiments.

What is claimed is:

1. A zoom lens comprising:
    a first lens group having a positive refractive power, a second lens group having a negative refractive power, a third lens group having a positive refractive power, and a fourth lens group having a positive refractive power, which are disposed in order from an object side to an image side; and
    an aperture stop disposed at an object side of the third lens group,
    wherein when changing the magnification of the zoom lens from a wide angle end to a telephoto end, an interval between the first and second lens groups increases, an interval between the second and third lens groups decreases, and an interval between the third and fourth lens groups increases;
    the first lens group includes at least a negative lens, a positive lens, and a positive lens, which are disposed in order from the object side; and
    the following conditions are satisfied:

$$nd11 > 1.85$$

$$vd11 > 25$$

$$-1.6 \times 10^{-3} \cdot vd11 + 0.642 < \theta_{gF} < -2.9 \times 10^{-3} \cdot vd11 + 0.69$$

where nd11 is a refractive index of the negative lens of the first lens group for a d line, vd11 is an Abbe number of the negative lens of the first lens group for the d line, and $\theta_{gF}$ is a relative partial dispersion of the negative lens of the first lens group which is $(n_g - n_F)/(n_F - n_C)$ where $n_g$ is a refractive index for a g line, $n_F$ is a refractive index for a F line, and $n_C$ is a refractive index of the negative lens of the first lens group for a C line.

2. The zoom lens according to claim 1, wherein the following condition is satisfied:

$$5 < f1/fw < 8,$$

where f1 is a focal length of the first lens group and fw is a focal length of the zoom lens at the wide angle end.

3. The zoom lens according to claim 1, wherein the following condition is satisfied:

$$ft/fw > 7,$$

where ft is a focal length of the zoom lens at the telephoto end and fw is a focal length of the zoom lens at the wide angle end.

4. The zoom lens according to claim 1, wherein the third lens group includes a positive lens, a positive lens and a negative lens, which are disposed in order from the object side.

5. The zoom lens according to claim 1, wherein
    the second lens group includes at least two negative lenses;
    the third lens group includes a most object side lens which has an object side surface having a curvature P3f and an image side surface having a curvature P3r,
    the second negative lens of the second lens group from the object side has an object side surface having a curvature P2f;
    the second lens group includes a most image side glass surface having a curvature P2r ; and
    the following conditions are satisfied:

$$0.06 < 1/\{Ft(P3f - P3r)\} < 0.080$$

$$vd3 > 68$$

$$-0.2 < 1/\{Ft(P2f - P2r)\} < -0.1,$$

where Ft is a focal length of the zoom lens at the telephoto end and vd3 is an Abbe number of the lens of the third lens group for a d line.

6. The zoom lens according to claim 1, wherein the following condition is satisfied:

$1.0 < Tpr < 1.5$, where Tpr is a telephoto ratio, which is an entire length of the zoom lens divided by a focal length of the zoom lens at the telephoto end.

7. The zoom lens according to claim 1, wherein the fourth lens group includes at least one positive lens and a most object-side surface which is an aspheric surface; and
the following condition is satisfied:

$\theta'_{gF} < 0.551$, where $\theta'_{gF}$ is a relative partial dispersion of the positive lens of the fourth lens group which is $(n'_g - n'_F)/(n'_F - n'_C)$ where $n'_g$ is a refractive index of the positive lens of the fourth lens group for a g line, $n'_F$ is a refractive index of the positive lens of the fourth lens group for a F line, and $n'_C$ is a refractive index of the positive lens of the fourth lens group for a C line.

8. The zoom lens according to claim 1, wherein the following condition is satisfied:

$0.78 < Y'/F_w$, where Y' is a maximum image height of the zoom lens and $F_w$ is a focal length of the zoom lens at the wide angle end.

9. The zoom lens according to claim 1, wherein when changing the magnification of the zoom lens from the wide angle end to the telephoto end, the first and third lens groups moves toward the object side, the second lens group moves on a trajectory in a curve or a part of the curve which is convex toward the image side, the fourth lens group moves on a trajectory in a curve or a part of the curve which is convex toward the object side, and the aperture stop moves independently from the lens groups.

10. The zoom lens according to claim 1, wherein the second lens group includes at least one negative lens which is a hybrid aspheric lens.

11. The zoom lens according to claim 1, wherein the third lens group has a most object-side surface which is an aspheric surface.

12. The zoom lens according to claim 1, wherein the second lens and the third lens of the second lens group from the object side are cemented with each other.

13. The zoom lens according to claim 1, wherein the positive lens and the negative lens of the first lens group are cemented with each other.

14. The zoom lens according to claim 1, wherein the second lens group includes at least a negative lens, a positive lens, and a negative lens, which are disposed in order from the object side.

15. The zoom lens according to claim 14, wherein the following conditions are satisfied:

$-1.1 < R_{12}/(R_{52} \times F_w) < -0.85$;

$-3 < (v_1 - v_2)/(v_6 - v_5) < -1.5$, where $R_{12}$ is a curvature radius of an image side surface of a first lens of the first lens group from the object side, $R_{52}$ is a curvature radius of an image side surface of a first positive lens of the second lens group from the object side, $F_w$ is a focal length of the zoom lens at the wide angle end, $v_1$ is an Abbe number of a first lens of the first lens group from the object side, $v_2$ is an Abbe number of a second lens of the first lens group from the object side, $v_5$ is an Abbe number of a second lens of the second lens group from the object side, and $v_6$ is an Abbe number of a third lens of the second lens group from the object side.

16. An information device having a photographing function, comprising
a photographing optical system using the zoom lens according to claim 1.

17. The information device according to claim 16, comprising
an image pickup device having a light receiving surface, wherein
an object image through the photographing optical system using the zoom lens is imaged on the light receiving surface of the image pickup device.

18. The information device according to claim 17, wherein the information device is configured as a portable information terminal apparatus.

* * * * *